(12) United States Patent
Kobayashi et al.

(10) Patent No.: US 6,411,359 B1
(45) Date of Patent: Jun. 25, 2002

(54) LIQUID CRYSTAL DISPLAY DEVICE HAVING SMALLER FRAME AREA

(75) Inventors: Kengo Kobayashi, Mobara; Kaoru Hasegawa, Chiba-ken; Katsuhiko Yarita, Mobara; Yoshio Toriyama, Chiba-ken, all of (JP)

(73) Assignees: Hitachi, Ltd., Tokyo; Hitachi Device Engineering Co., Ltd., Mobara, both of (JP)

( * ) Notice: Subject to any disclaimer, the term of this patent is extended or adjusted under 35 U.S.C. 154(b) by 0 days.

(21) Appl. No.: 09/290,185

(22) Filed: Apr. 13, 1999

(30) Foreign Application Priority Data

Apr. 24, 1998 (JP) .......................................... 10-114771

(51) Int. Cl.$^7$ ............................................ G02F 1/1345
(52) U.S. Cl. ........................ 349/149; 349/151; 349/152
(58) Field of Search ................................ 349/149, 150, 349/151, 152, 65; 345/98

(56) References Cited

U.S. PATENT DOCUMENTS

| | | | | |
|---|---|---|---|---|
| 5,640,216 A | * | 6/1997 | Hasegawa et al. | 349/58 |
| 5,701,167 A | * | 12/1997 | Yamazaki | 349/42 |
| 5,712,493 A | * | 1/1998 | Mori et al. | 257/59 |
| 5,717,476 A | * | 2/1998 | Kanezawa | 349/149 |
| 5,737,053 A | * | 4/1998 | Yomogihara et al. | 349/149 |
| 5,739,887 A | * | 4/1998 | Ueda et al. | 349/149 |
| 5,748,179 A | * | 5/1998 | Ito et al. | 349/152 |
| 5,838,412 A | * | 11/1998 | Ueda et al. | 349/150 |
| 6,005,652 A | * | 12/1999 | Matsuhira | 349/149 |
| 6,147,739 A | * | 11/2000 | Shibatani | 349/152 |
| 6,172,732 B1 | * | 1/2001 | Hayakawa et al. | 349/152 |

* cited by examiner

*Primary Examiner*—William L. Sikes
*Assistant Examiner*—Mike Qi
(74) *Attorney, Agent, or Firm*—Antonelli, Terry, Stout & Kraus, LLP

(57) ABSTRACT

A frame area of a liquid crystal display device is reduced by improving the layouts of extraction lines DTM of drain wiring of a TFT liquid crystal display device, a driving IC of the TFT liquid crystal display device and a flexible board FPC2 for a drain driving circuit of the TFT liquid crystal display device.

11 Claims, 42 Drawing Sheets

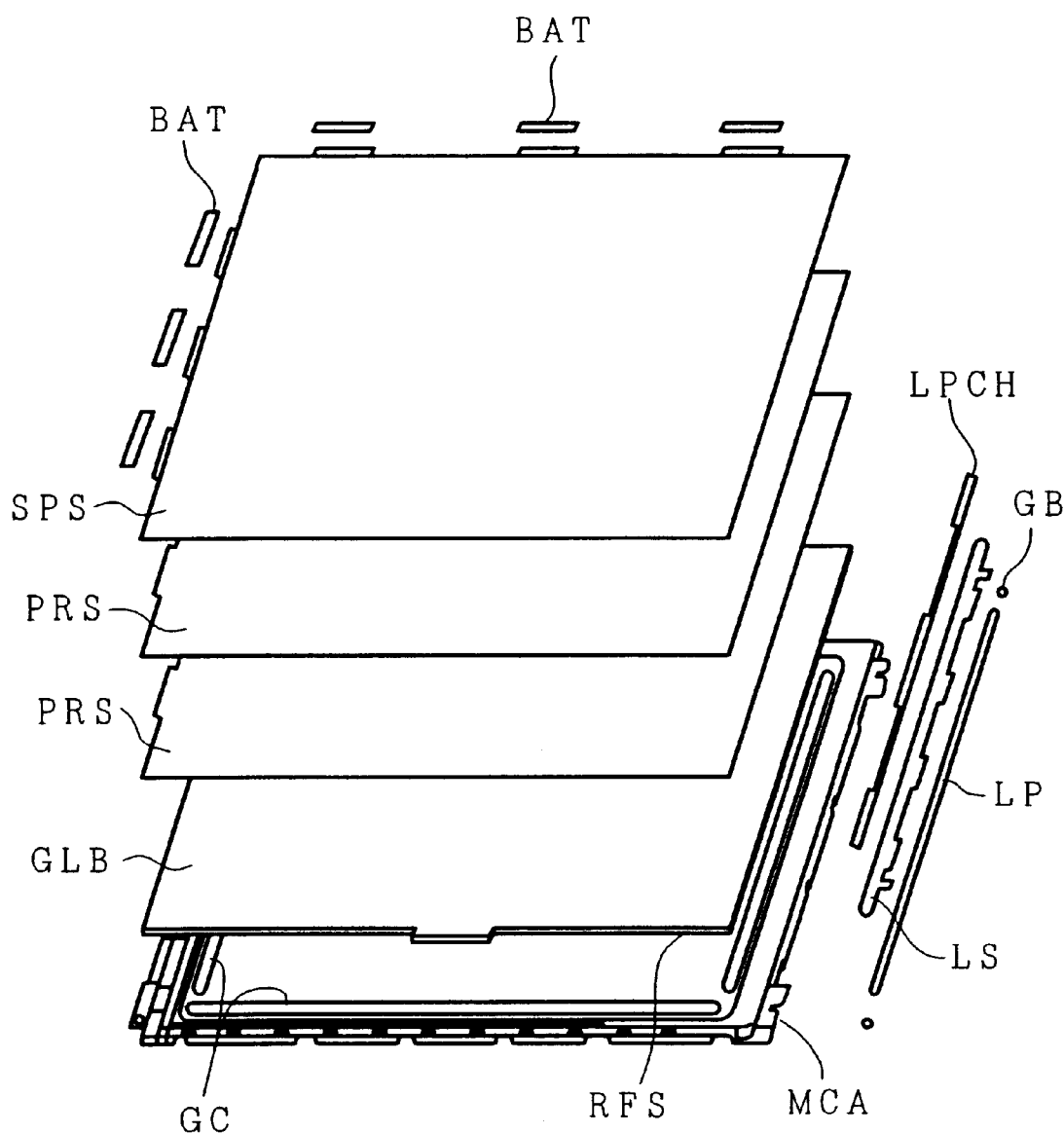

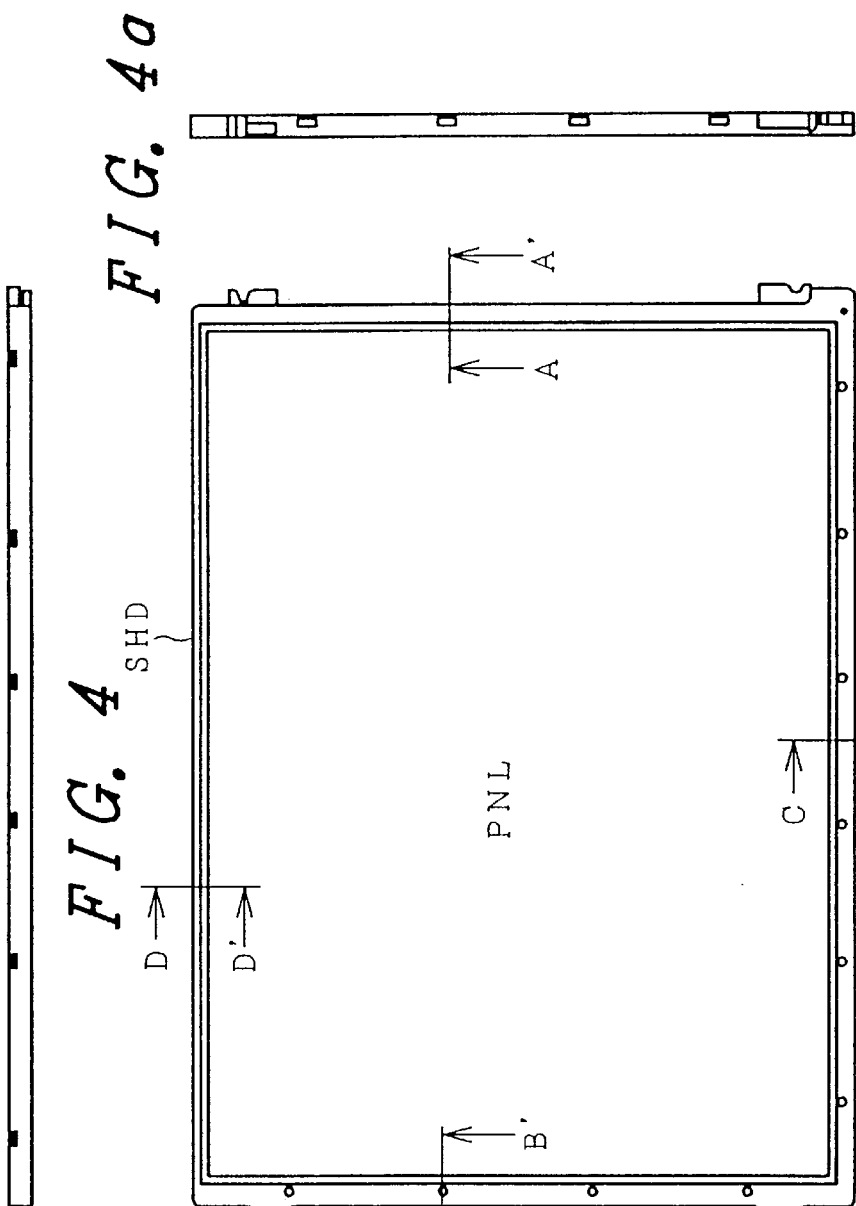

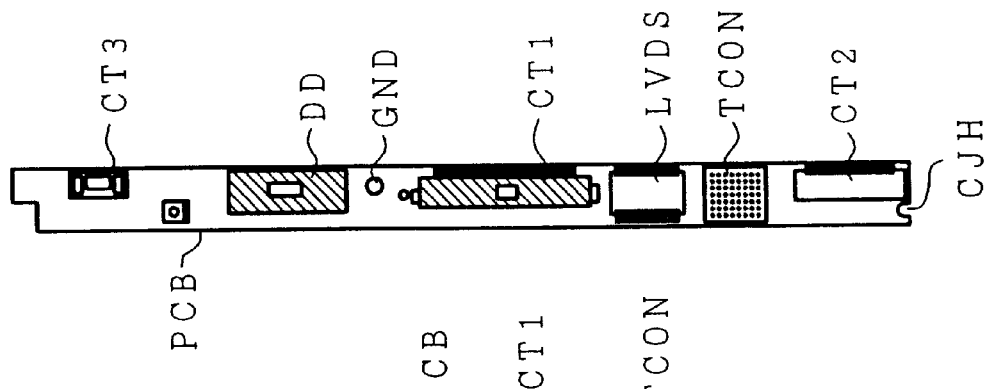
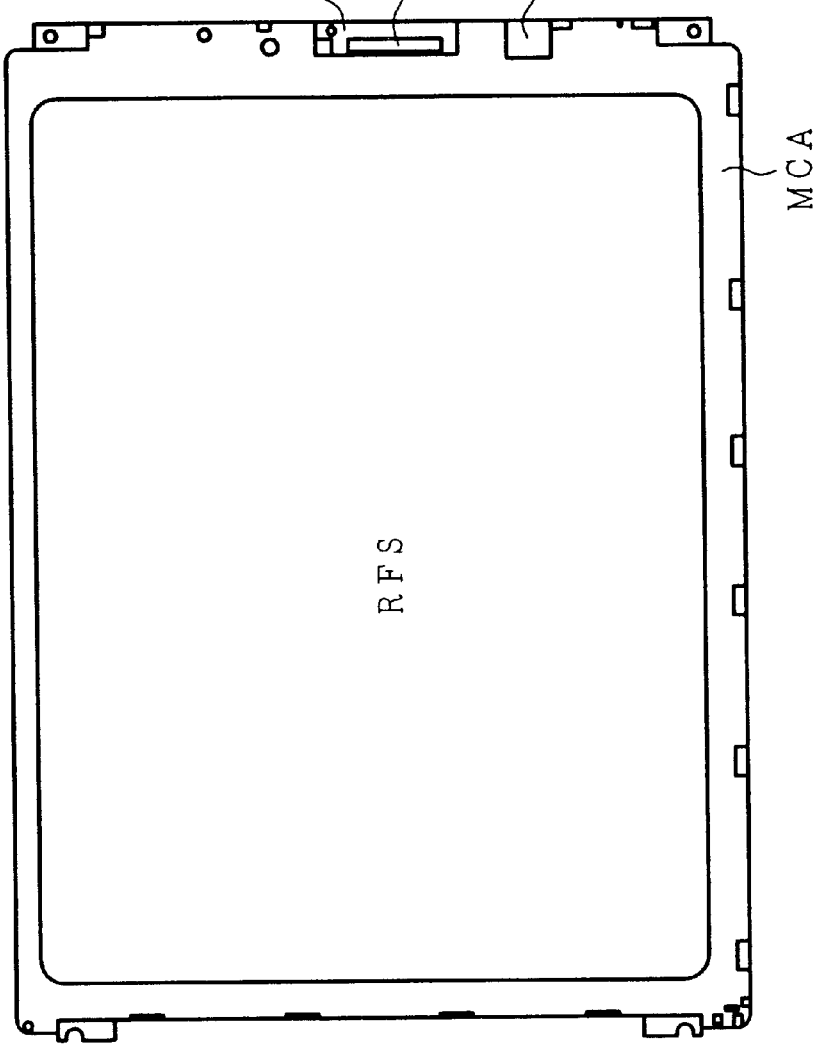

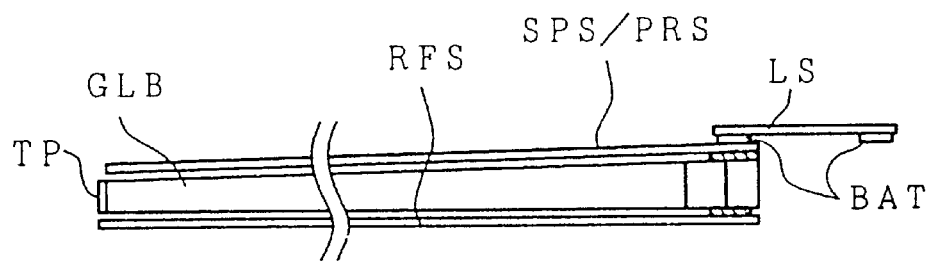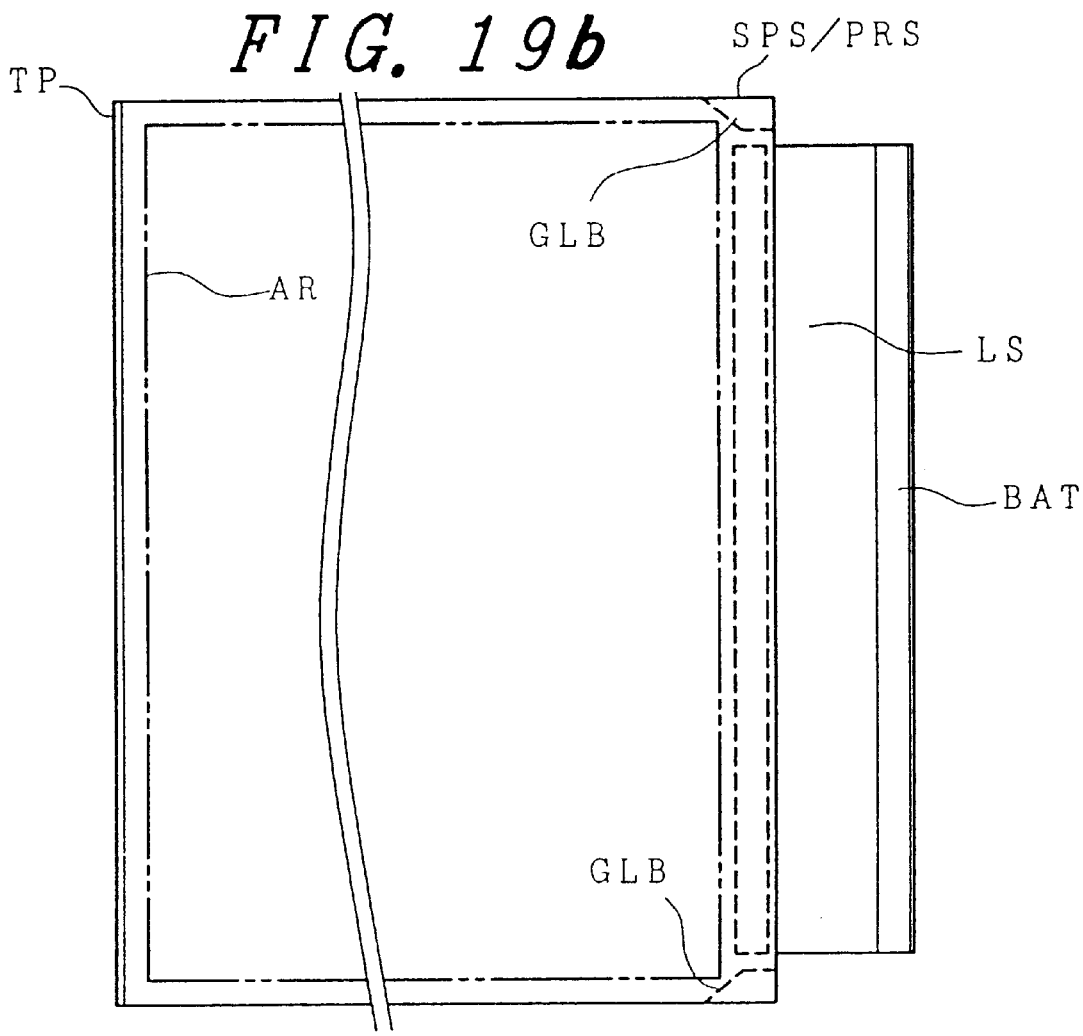

FIG. 40
Signals from HOST side
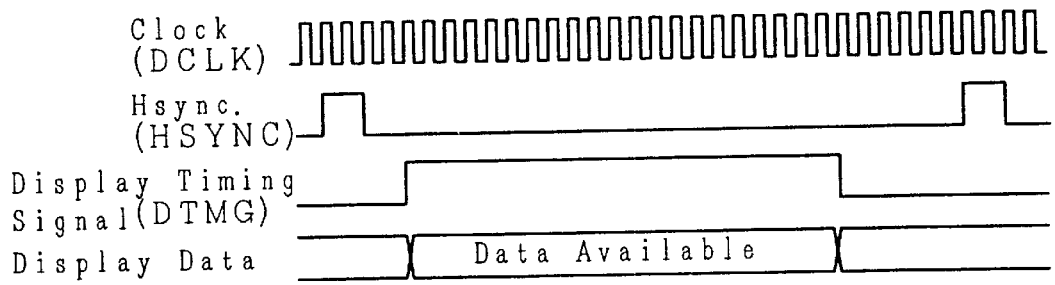
Input for Drain Drivers
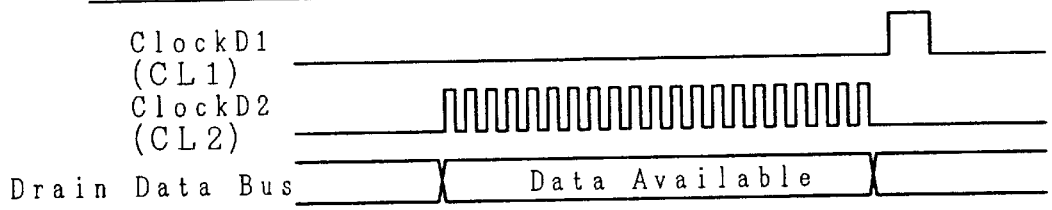
Signals from HOST side
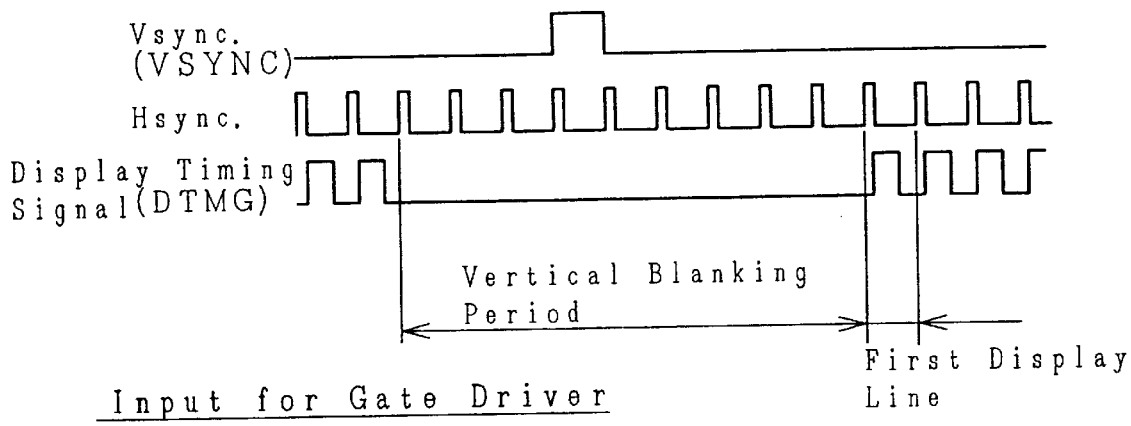
Input for Gate Driver
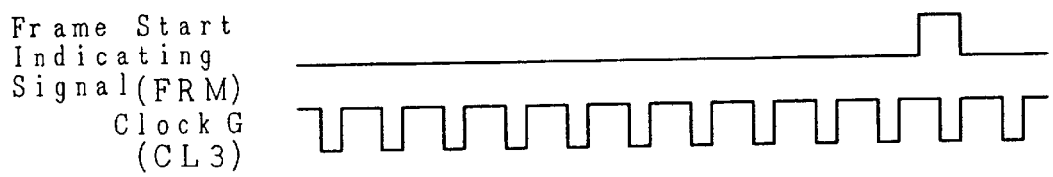

LIQUID CRYSTAL DISPLAY DEVICE HAVING SMALLER FRAME AREA

BACKGROUND OF THE INVENTION

1. Field of the Invention

The present invention relates to liquid crystal display devices and, more particularly, to a liquid crystal display device including a flexible circuit which is provided along one of short sides of a liquid crystal display element formed by sandwiching a liquid crystal layer with a first substrate having active elements formed thereon and a second substrate having a common electrode formed thereon and which is connected at one end thereof to an interface circuit board to supply a driving signal voltage for display to said active elements and a driving IC chip which is mounted such that it connected to extraction lines of the active elements at output terminals thereof and to a conductive layer portion of said flexible board at input terminals thereof.

2. Description of the Related Art

Liquid crystal display devices arc widely used as display devices capable of high definition color display for use in notebook type computers and display monitors.

Known liquid crystal display devices include liquid crystal display devices of the passive matrix type utilizing a liquid crystal panel sandwiched by a pair of substrates formed with parallel electrodes which are formed on the respective inner surfaces so as to cross each other and of the active matrix type utilizing a liquid crystal display element having switching elements for selection in pixels on one of a pair of substrates (hereinafter also referred to as liquid crystal panel).

Active matrix type liquid crystal display devices include the so-called vertical field type liquid crystal display devices, represented by the twisted nematic (TN) system, utilizing a liquid crystal panel having a group of electrodes for pixel selection formed on each of a pair of upper and lower substrates (generally referred to as TN system active matrix type liquid crystal display devices) and the so-called horizontal field type liquid crystal display devices utilizing a liquid crystal panel having a group of electrodes for pixel selection formed on only one of a pair of upper and lower substrates (generally referred to as IPS system liquid crystal display device).

In a liquid crystal panel forming a part of the former TN system active matrix type liquid crystal display device, liquid crystal is oriented at al twist of 90° within a pair of substrates (two sheets consisting of a first substrate (lower substrate) and a second substrate (upper substrate)), and two polarizing plates are formed on outer surfaces of the upper and lower substrates of the liquid crystal panel which are in the crossed Nicols configuration in the directions of absorption axes thereof and whose absorption axis at the entrance side is in parallel with or orthogonal to the rubbing direction.

In such a TN system active matrix type liquid crystal display device, incident light is tuned into linearly polarized light by the entrance side polarizing plate when no voltage is applied; the linearly polarized light propagates along the twist of the liquid crystal layer; and, when the transmission axis of the exit side polarizing plate coincides with the azimuth angle of said linearly polarized light, the linearly polarized light is entirely emitted to show white display (the so-called normally open mode).

When a voltage is applied, the direction of a unit vector (director) indicating an average direction of orientation of the molecular axes of the liquid crystal forming the liquid crystal layer is in a direction perpendicular to the plane of the substrates. The azimuth angle of the linearly polarized light at the entrance side is thus unchanged and therefore coincides with the absorption axis of the exit side polarizing plate, which results in black display (see Principles and Applications of Liquid Crystal issued by Institute for Industrial Research, 1991).

In an IPS system liquid crystal display in which a group of electrodes for pixel selection and a group of electrode wirings are formed only on one of a pair of substrates and in which a voltage is applied between adjoining electrodes on said substrate (between a pixel electrode and a counter electrode) to switch the liquid crystal layer in a direction parallel with the plane of the substrates, polarizing plates are provided to show black display when no voltage is applied (the so-called normally closed mode).

The liquid crystal layer of an IPS system liquid crystal display device is in a homogeneous orientation in parallel with the plane of the substrates in the initial state. The director of the liquid crystal layer is in parallel with or at some angle to the direction of the electrode wiring in a plane parallel with the substrates when no voltage is applied. During the application of a voltage, the direction of the director of the liquid crystal layer moves to the direction perpendicular to the direction of the electrode wiring as the voltage is applied. When the direction of the director of the liquid crystal layer is inclined toward the direction of the electrode wiring at 45° from the direction of the director under no application voltage, the liquid crystal layer under the application voltage causes the azimuth angle of the polarized light to rotate at 90° as if it is a ½ wavelength plate. As a result, the transmission axis of the exit side polarizing plate and the azimuth angle of the polarized light coincide with each other to show white display.

The IPS system liquid crystal display device is characterized in that it has less variation of hues and contrast associated with the field angle to allow a wider field angle (see Japanese unexamined patent publication No. H5-505247).

Color filter systems are the main stream of attempts to make full-color versions of the various liquid crystal display devices described above. This is achieved by separating a pixel corresponding to one dot in a color display into three parts and by providing color filters corresponding to three respective primary colors, e.g., red (R), green (G) and blue (B), at respective unit pixels.

While the present invention can be applied to the various liquid crystal display devices described above, it will now be briefly described with reference to a TN system active matrix type liquid crystal display device as an example.

As described above, in a liquid crystal display element (liquid crystal panel) forming apart of a TN system active matrix type liquid crystal display device (hereinafter simply referred to as active matrix type liquid crystal display device for simplicity), there is formed a group of gate lines which extend in an x-direction in parallel with a y-direction and a group of drain lines which are insulated from the group of gate lines and which extend in the y-direction in parallel with the x-direction, on the surface toward a liquid crystal layer, of one of two transparent insulated substrates made of glass or the like provided in a face-to-face relationship with each other with the liquid crystal layer interposed therebetween.

Each of regions surrounded by the group of gate lines and the group of drain lines serves as a pixel region and, for example, a thin film transistor (TFT) and a transparent pixel electrode are formed in such a pixel region as active elements (switching elements).

When a scan signal is supplied to a gate line, the thin film transistor is turned on, and an image signal from the drain line is supplied to the pixel electrode through the thin film transistor which has been turned on.

Each gate line among the group of gate lines, not to mention each drain line among the group of drain lines, is also extended to the periphery of the substrate to form an external terminal, and an image driving circuit and a gate scan driving circuit connected to each of the external terminals, i.e., a plurality of driving IC chips (semiconductor integrated circuits which are hereinafter also, simply referred to as driving ICs or ICs) forming the sane arc externally mounted on the periphery of the substrate. That is, a plurality of tape carrier packages (TCPs) carrying those driving ICs are externally mounted on the periphery of the substrate.

However, since such a substrate is configured to allow TCPs carrying driving ICs to be externally mounted on the periphery thereof, the region between the contour of a display area formed by the regions where the group of gate lines and the group of drain lines cross on the substrate and the outer frame of the substrate (normally referred to as frame) occupies a large area, which goes against a need for reducing the external dimensions of a liquid crystal display module obtained by integrating a liquid crystal display element with an illuminating light source (back light) and other optical elements.

Therefore, in order to mitigate such a problem as much as possible, i.e., in consideration to a need for mounting liquid crystal display elements with high density and for reducing the external dimensions of liquid crystal display modules, the so-called flip-chip system or chip-on-glass (COG) system has been proposed in which image driving ICs and scan driving ICs are loaded directly on one of substrates (lower substrate) instead of using TCP components.

Japanese patent application No. H6-256426 by the same applicant relates to a liquid crystal display device based on such a flip-chip system.

SUMMARY OF THE INVENTION

For example, a liquid crystal display device of this type is formed by laminating a first substrate having on its periphery driving ICs for supplying driving signals to switching elements such as thin film transistors for driving pixels formed at intersections between a group of gate lines and a group of drain lines and a second substrate formed with a common electrode in a face-to-face relationship with each other, providing a liquid crystal display device by sandwiching a liquid crystal layer in the gap of the lamination, overlaying an illuminating light source for illuminating the liquid crystal display element, and securing them with an upper case and a lower case.

FIG. 43 is a schematic plan view of major parts for explaining the arrangement of a drain-driving IC for a liquid crystal display element and a drain-side flexible board forming a part of a conventional liquid crystal display device. SUB1 represents a first substrate (lower substrate) on which thin film transistors are formed; SUB2 represents a second substrate (upper substrate) on which color filters are formed; DTM represents drain extraction lines formed on the lower substrate; Td represents terminal wiring for connecting a protrusion (conductive layer portion) FSL of a drain-side flexible board FPC2 and a driving IC; COM represents a common electrode wiring for supplying power to a common electrode on the upper substrate SUB2; COMT represents a common electrode wiring terminal portion for electrically connecting the common electrode wiring COM to said common electrode through conductive paste or the like; ALC represents an alignment mark on the lower substrate SUB1; FHL represents a locating hole of the drain-side flexible board FPC2; AR represents a display area on a liquid crystal display panel; ARR represents a group of drain lines connected to one driving IC; CHD represents a chip capacitor for reducing noises on a power supply line of the flexible board FPC2; and a, b and c represent lines indicating the center of ARR, the center of the driving IC and the center of FSL, respectively.

Since the common electrode wiring COM for supplying power to the common electrode on the upper substrate SUB2 and the alignment mark ALC for defining the position of the liquid crystal display element during assembly are provided on the corner of the lower substrate which is furthest from an interface circuit board PCB of the liquid crystal display element, the driving IC and the conductor portion FSL, i.e., protrusion, of the flexible board FPC2 located in this region have been offset toward the interface circuit board PCB.

Specifically, as shown in FIG. 43, the center b of the driving IC in the direction parallel with the direction in which the extraction lines DTMP of active elements are arranged has been offset from the center a of the active elements driven by the driving IC in the direction in which the extraction lines DTM are arranged toward the interface board PCB ($\theta_1<\theta_2$), and the center c of the protrusion FSL of the flexible board connected to the input terminals Td of the driving IC chip in the direction parallel with the direction in which the extraction lines DTM are arranged has been matched with the center b of the driving IC chip ($\theta_3=\theta_4$).

The wiring density of the extraction lines DTM of the active elements is higher than that of the input terminals Td, and the angle $\theta_1$ of the diagonal wiring thereof is limited when consideration is paid to the difference in the wiring resistance between one end of the group of drain lines ARR connected to one driving IC and another end thereof.

In the above-described conventional configuration the angle θ1 of the diagonal wiring of the extraction lines DTM closer to the corner of the lower substrate SUB1 is considerably acute, and such a diagonal wiring portion DTMS must be made small when the difference in wiring resistance is considered, which results in an increase in the length of a normal wiring portion DTMP.

This leads to an increase in the width D of the mounting area of the driving IC on the lower substrate SUB1, which has resulted in a problem in that it hinders efforts toward so-called smaller frames to discourage the promotion of smaller frames.

It is an object of the present invention to solve the above-described problem and to improve the arrangement of extraction lines DTM of drain wiring, a driving IC for the same and a drain-side flexible board FPC2, thereby providing a liquid crystal display device in which the dimensions of the frame area can be reduced.

In order to achieve the above-described object, according to the present invention, a driving IC is mounted such that extraction lines DTM of drain wiring are inclined at angles to achieve symmetry about the center thereof ($\theta_1=\theta_2$) and the angles of inclination of terminal wiring Td for connecting a protrusion (conductive layer portion) FSL of a flexible board FPC2 having a relatively low wiring density and the driving IC at both ends thereof are different from each other ($\theta_3>\theta_4$). That is, the present invention is characterized in that it has a configuration as described below.

(1) There is provided a liquid crystal display element formed by sandwiching a liquid crystal layer with a first substrate having active elements formed thereon and a second substrate having a common electrode formed thereon, an interface circuit board provided along one of short sides of said liquid crystal display element, a flexible board connected to said interface circuit board at one end thereof and provided at least along one long side of said first substrate for supplying a driving signal voltage for display to said active elements and a driving IC chip mounted such that it is connected to extraction lines of said active elements at output terminals thereof and to a conductor layer portion of said flexible board at input terminals thereof.

The center of the extraction lines of said active elements driven by said one driving IC chip in the direction of the arrangement thereof is matched with the center of said driving IC chip in the direction parallel with the direction of the arrangement of the extraction lines of said active elements, and the center of the conductive layer portion of said flexible board connected to the input terminals of said one driving IC chip in the direction parallel with the direction of the arrangement of the extraction lines of said active elements is offset from the center of said driving IC chip toward said interface circuit board.

In this configuration, the angle of inclination of the extraction lines DTM of the drain wiring having a high wiring density is moderated as a whole to eliminate the need for increasing the normal wiring portion DTMP and to thereby promote the trend towards smaller frame areas.

(2) Said one driving IC chip per (1) is mounted on said flexible board in the position furthest from said interface circuit board.

This configuration satisfies the need for offsetting the conductive layer portion of the flexible board toward the interface circuit board PCB in the region where the common electrode wiring COM and the lie are provided to increase the flexibility in designing the pattern of the lower substrate SUB1 in addition to the effect as mentioned in the above (1 1).

The present invention is not limited to active matrix type liquid crystal display devices as described above and may be applied similarly to liquid crystal display devices of other types or other electronic apparatuses which require similar conductor patterns.

BRIEF DESCRIPTION OF THE DRAWINGS

FIG. 3 is an exploded perspective view showing a state before the upper case shown in FIG. 2 is secured to a lower case containing an illuminating light source (back light) and various optical films formed on a lower surface of the liquid crystal display element.

FIG. 4 is views of a liquid crystal display device (liquid crystal display module) which has been completely assembled and shows a front view thereof viewed from the front side of the liquid crystal display element PNL (that is, the side of the liquid crystal display element PNL) and a view of each side thereof.

FIG. 5 illustrates the rear side of the liquid crystal display module of FIG. 4 and an interface board mounted on a side thereof.

FIG. 19 illustrates a state of mounting of a reflecting sheet for a linear light source.

FIG. 21a is an enlarged view of a region J of the multi-layer flexible board PC2 shown in FIG. 20a.

FIG. 40 is a timing chart showing display data input from a main computer (host) to a display controller and signals output from the display controller to drain drivers and gate drivers.

DESCRIPTION OF THE PREFERRED EMBODIMENT

Modes of carrying out the invention will now be described in detail with reference to drawings of embodiments.

Figure 1:
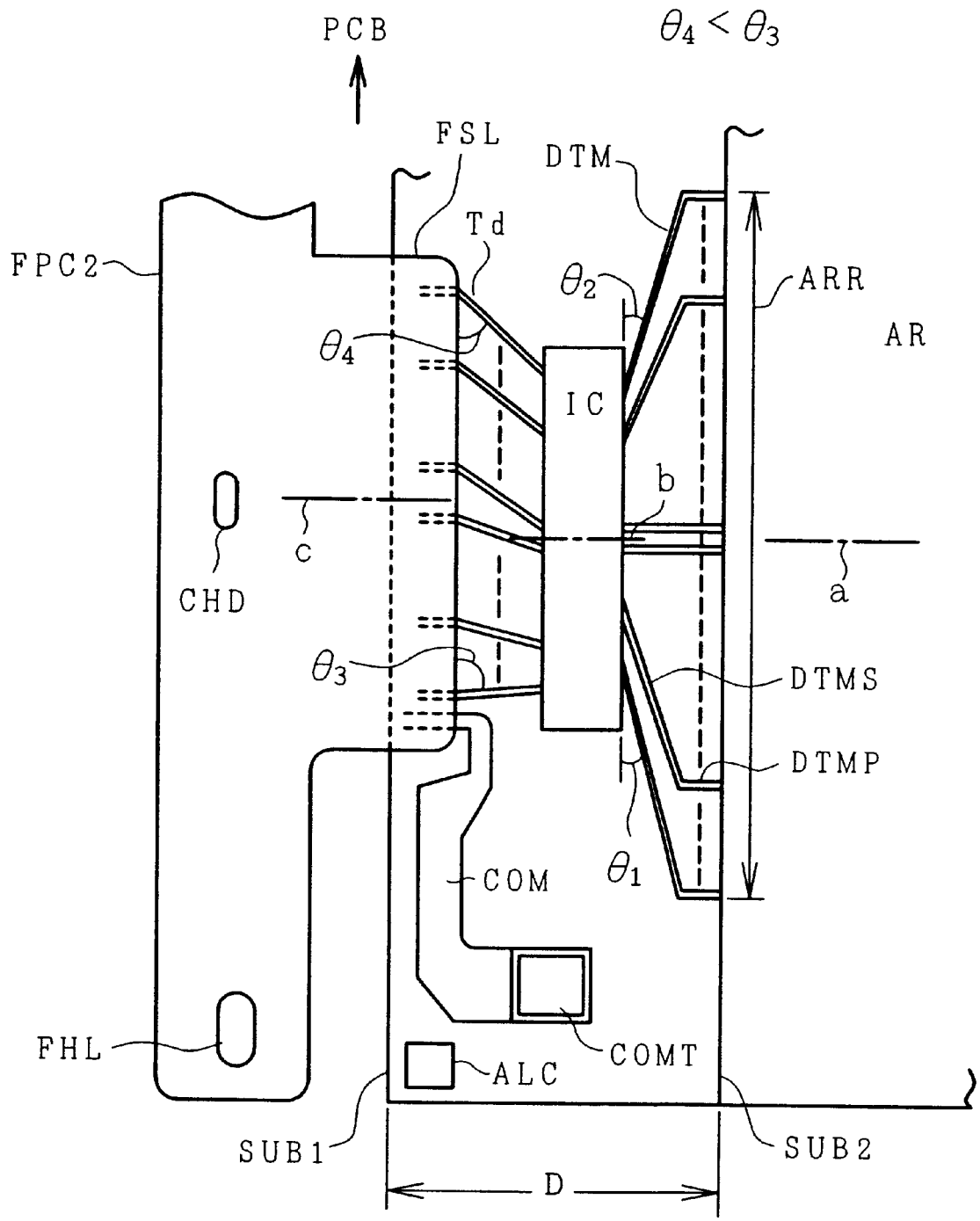
FIG. 1 is a schematic plan view of major parts of one embodiment of a liquid crystal display device according to the present invention to explain the arrangement of a drain driving IC and a drain-side flexible board thereof.
Figure 43:
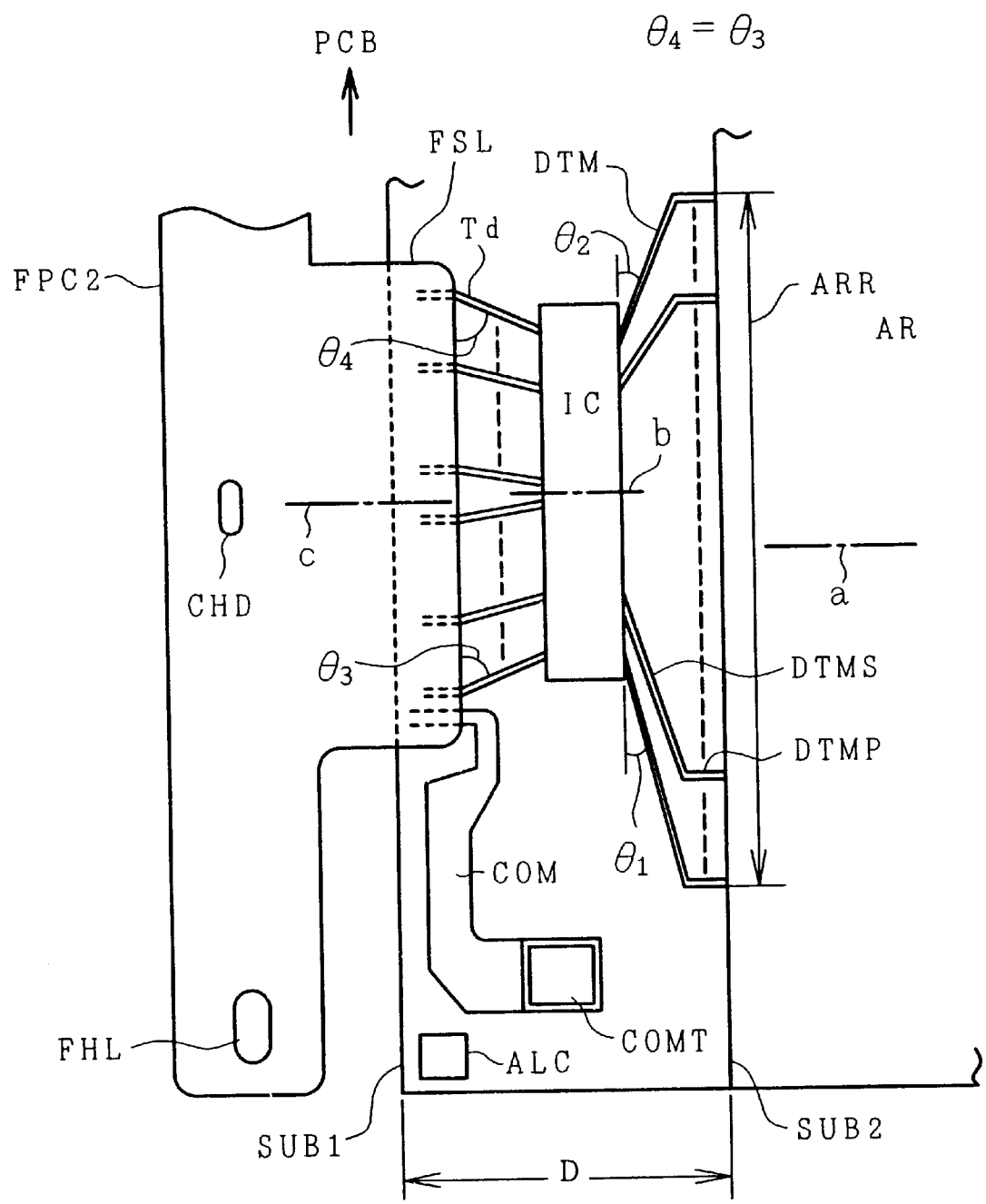
FIG. 43 is a schematic plan view of major parts showing an arrangement of a drain driving IC and a drain-side flexible board of a liquid crystal display element forming a part of a conventional liquid crystal display device.

FIG. 1 is a schematic plan view of major parts of one embodiment of a liquid crystal display device according to the present invention for explaining an arrangement of a drain driving IC and a drain-side flexible board thereof. Similarly to the description on FIG. 43, SUB1 represents a lower substrate on which thin film transistors are formed; SUB2 represents an upper substrate on which color filters are formed; DTM represents drain extraction lines formed on the lower substrate; Td represents terminal wiring for connecting a protrusion (conductive layer portion) FSL of a drain-side flexible board FPC2 and a driving IC; COM represents common electrode wiring for supplying power to a common electrode on the upper substrate SUB2; COMT represents a common electrode wiring terminal portion for electrically connecting the common electrode wiring COM to said common electrode through conductive paste or the like; ALC represents an alignment mark on the lower substrate SUB1; FHL represents a locating hole of the drain-side flexible board FPC2; AR represents a display area on a liquid crystal display panel; ARR represents a group of drain lines connected to one driving IC; and a, b and c represent lines indicating the center of ARR, the center of the driving IC and the center of FSL respectively.

The driving IC is provided in a position where the center b thereof coincides with the center a of the group of drain lines ARR connected to said driving IC. Therefore, the drain extraction lines DTM formed on the lower substrate are provided symmetrically about the center a to satisfy $\theta_1=\theta_2$. As a result, the angle of inclination $\theta_2$ at the end opposite to the interface circuit board PCB becomes less steeper than the angle of inclination $\theta_2$ shown in FIG. 43, and there will be no need for extending the diagonal wiring portion DTMS and extending the normal wiring portion DTMP taking any difference in resistance.

Meanwhile, the center c of the protrusion (conductive layer portion) FSL of the drain-side flexible board FPC2 is offset from the center b of the driving IC toward the interface circuit board PCB. This is an arrangement which is inevitably chosen because the formation of the wiring COM for supplying power to the common electrode and the alignment mark at a corner portion of the lower substrate SUB1 places a limit on the arrangement of said protrusion FSL toward the corner portion.

Therefore, the wiring Td at the protrusion FSL of the drain-side flexible board FPC2 is formed such that it has a steeper inclination at the side toward the interface circuit board PCB and a less steeper inclination at the opposite side ($\theta_3>\theta_4$). However, since the wiring Td has a low wiring density and a large wiring width, the increase in resistance at the region thereof where the angle of inclination is $\theta_4$ can be ignored.

According to the present embodiment, the angle of inclination of the extraction lines DTM of the drain wiring having a high wiring density is moderated as a whole, and a need for expanding the normal wiring portion DTMP is eliminated to promote the trend toward smaller frame areas, which effect is especially significant in mounting the driving IC in the position furthest from the interface circuit board.

Next, a detailed description will be made on a specific example of a liquid crystal display device in which each of the above-described embodiments is applied. In the drawings described below, components having like functions will be indicated by like reference numbers and will not be described to avoid repetition.

Figure 2:
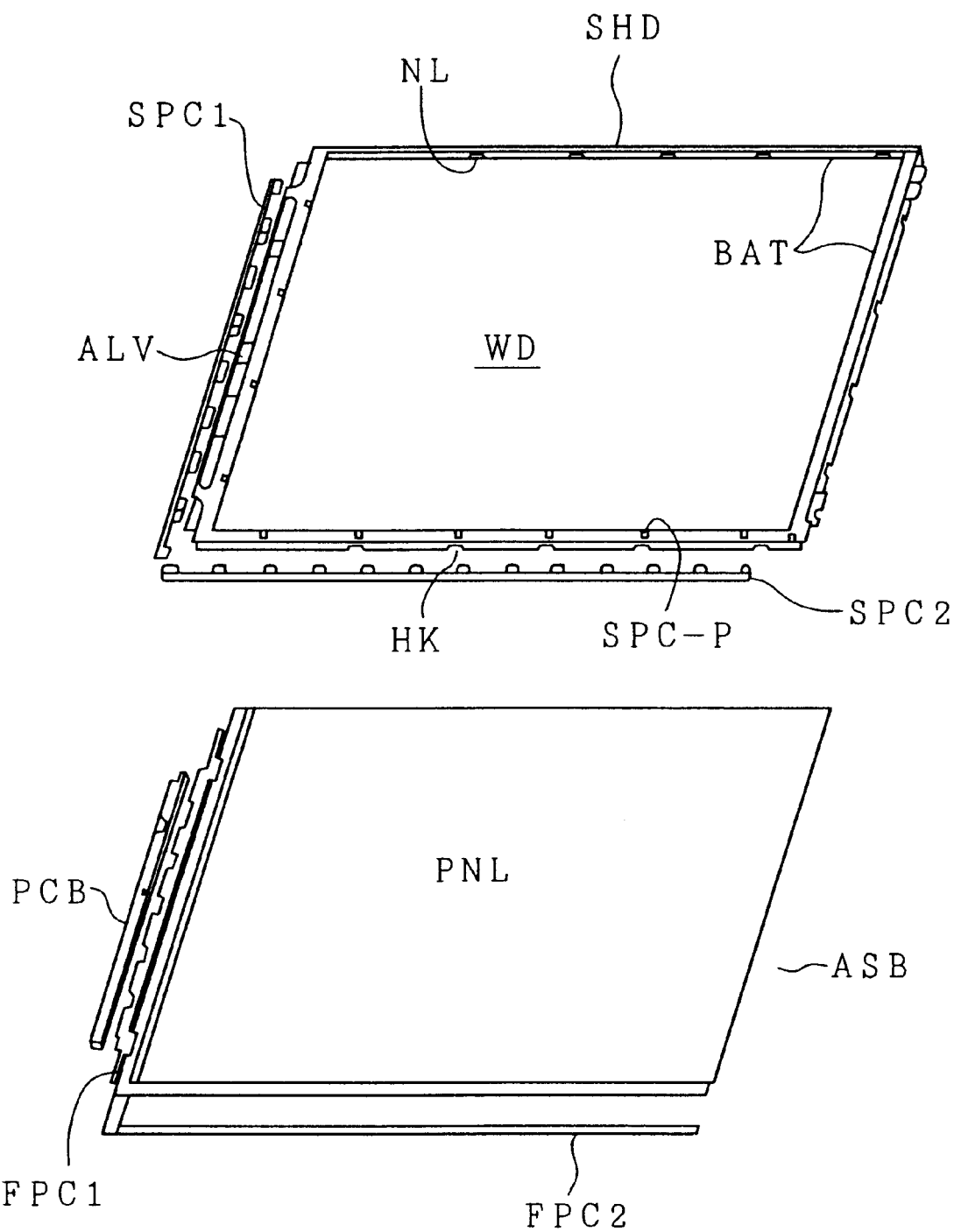
FIG. 2 is an exploded perspective view of the liquid crystal display device showing a state of the same before a liquid crystal display element thereof is covered with an upper case that forms a part of a housing of the same.

FIGS. 2 and 3 are exploded perspective views for explaining an example of a configuration of a liquid crystal display device according to the present invention as a whole. FIG. 2 is an exploded perspective view of the liquid crystal display device showing a state of the same before a liquid crystal display element thereof is covered with an upper case that forms a part of a housing of the same. FIG. 3 is an exploded perspective view showing a state before the upper case shown in FIG. 2 is secured to a lower case containing an illuminating light source (back light) and various optical films formed on a lower surface of the liquid crystal display element.

In FIGS. 2 and 3, SHD represents an upper case (shield case); PNL represents a liquid crystal display element; SPC (SPC1 SPC2) represents an insulated spacer; SCP-P represents a protrusion of a spacer SPC (which is fitted into an opening formed on the upper case SHD); BAT represents a double-sided adhesive tape; FPC1, FPC2 represent multi-layer flexible boards (FPC1 represents a gate-side board and FPC2 represents a drain-side board); PCB represents an interface board; SPS represents a spreading sheet; PRS represents a prism sheet; GLB represents a light guide body; RFS represents a reflecting sheet; G represents a rubber cushion; MCA represents a lower case (molded frame); LP represents a cold-cathode fluorescent tube (CFL); LS represents a light source reflecting sheet; and LPCH represents a cable holder for the cold-cathode fluorescent tube.

The shield case SHD shown in FIG. 2 is fabricated by punching and bending a metal sheet using a press processing technique. WD represents an aperture to expose the liquid crystal display element PNL to a field of view. ALV represents recesses provided to hold the interface circuit board as will be described later. The liquid crystal display element PNL is two substrates sandwiching a liquid crystal layer. A plurality of gate lines and drain lines are provided on the lower substrate such that they cross each other, and thin film transistors are provided at the intersections of the gate lines and drain lines. A pixel electro(de driven by such a thin film transistor forms one pixel.

A driving IC for driving gates is mounted on the edge of the lower substrate closer to the interface board PCB of the liquid crystal display element PNL, and a drive signal is supplied by the flexible board FCP1 to the driving IC for driving gates. A driving IC for driving drains is mounted on the side of the lower substrate adjacent to side where the interface board is provided, and a drive signal is supplied by the flexible board FCP2 to the driving IC for driving drains.

The liquid crystal display elements having the above-described driving ICs, flexible boards FCP1 and FCP2 and interface board PCB mounted thereon are hereinafter referred to as liquid crystal display element with peripheral circuits ASB.

The light guide body GLB is provided on the inner circumference of the lower case MCA with the rubber cushion GC interposed. The reflecting sheet RFS is formed on the rear surface of the light guide body GLB. The two prism sheets PRS (PRS1, PRS2) and the spreading sheet SPS are formed on the upper surface of the light guide body GLB; the liquid crystal display element with peripheral circuits ASB shown in FIG. 3 is placed thereon and is covered by the upper case SHD; and fixing nails NL formed on the periphery of the upper case SHD are engaged with the recesses for fixing formed on the lower case MCA to fix them together, thereby assembling the liquid crystal display device (also referred to as liquid crystal display module).

Further examples of a liquid crystal display device according to the present invention will now be described in detail with reference to FIG. 4 and other drawings. There are some differences between configurations in those drawings, which is to be understood to mean that the present invention can be applied to plural kinds of liquid crystal display devices.

FIG. 4 is views of a liquid crystal display device (liquid crystal display module) which has been completely assembled and shows a front view thereof viewed from the front side of the liquid crystal display element PNL (that is, the side of the liquid crystal display element PNL) and a view of each side thereof. FIG. 5 illustrates the rear side of the liquid crystal display module in FIG. 4 and an interface board mounted on a side thereof.

A liquid crystal module MDL has two kinds of containing and holding members, i.e., a lower case (molded frame) MCA and an upper case (shield frame SHD). HLD represents four mounting holes provided for mounting said module MDL, as a display portion, to an information processing apparatus such as a personal computer, word processor or the like. The mounting holes HLD on the shield frame SHD are formed in positions corresponding to mounting holes MH (shown in FIG. 17 in an enlarged form) on the molded case MCA (FIGS. 4 and 8), and screws or the like are inserted through both mounting holes to secure and mount them to the information processing apparatus. An inverter for a back light is provided in a region MI (FIG. 8) of said module MDL, and power is supplied to the hack light BL through a connection connector LCT and a lamp cable LPC.

Signals from a main computer (host) and required power are supplied to a controller portion and a power supply portion of the liquid crystal display module MDL through an interface connector CT1 on an interface board located on the rear side of said module.

FIG. 5(b) illustrates an example of a configuration of the interface board PCB. Mounted on the interface board PCB are the connector CT1 for receiving signals from the main computer and required power, a low voltage differential reception circuit chip LVDS for converting a low voltage differential signal received from the main computer into an original parallel signal, a control circuit chip TCON, a digital-to-digital conversion circuit chip DD for generating various DC voltages, and connectors CT3, CT2 for connecting a gate-side flexible board FPC1 and a drain-side flexible board FPC2 to be described later.

Figure 6:
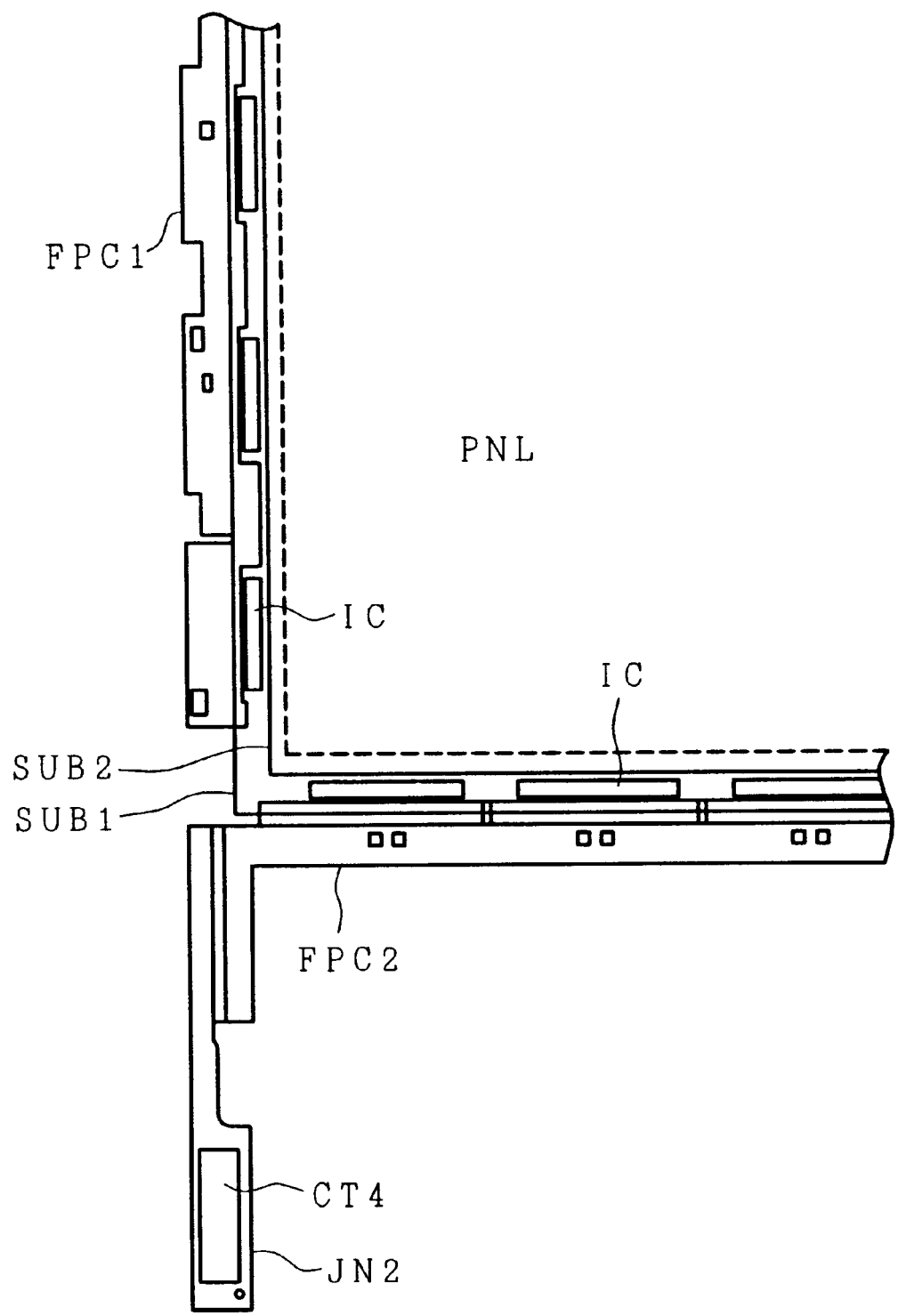
FIG. 6 is a plan view of major parts showing the arrangement of a gate-side flexible board FPC1 and a drain-side flexible board FPC2.

FIG. 6 is a plan view of major parts for explaining the arrangement of the gate-side flexible board FPC1 and drain-side flexible board FPC2. A driving IC for driving gates is mounted on the upper surface of the interface board of the liquid crystal display element PNL, and the gate-side flexible board FPC1 is provided in connection to this driving IC. A driving IC for driving drains is mounted on the lower side of the liquid crystal display element PNL adjacent to the flexible board FPC1, and the flexible board FPC2 is provided in connection to this driving IC.

A protrusion JN4 is formed at the end of the flexible board FPC2 toward the gate-side flexible board FPC1, and a connector (flat connector) CT4 for connecting to the connector CT2 of the interface board PCB is provided at the end thereof. The flexible board FPC2 is folded on to the rear side of the liquid crystal display element PNL to connect said connector CT4 to the connector CT2 of the interface board.

In this embodiment, the connecting portion between the interface board PCB and the drain-side flexible board FPC2 is substantially flush with said flexible board FPC2. Therefore, there is no overlap of the drain-side flexible board FPC2 as described with reference to the prior art, which reduces the thickness of the liquid crystal display device as a whole in a corresponding amount to promote the trend toward smaller thicknesses.

Figure 7:
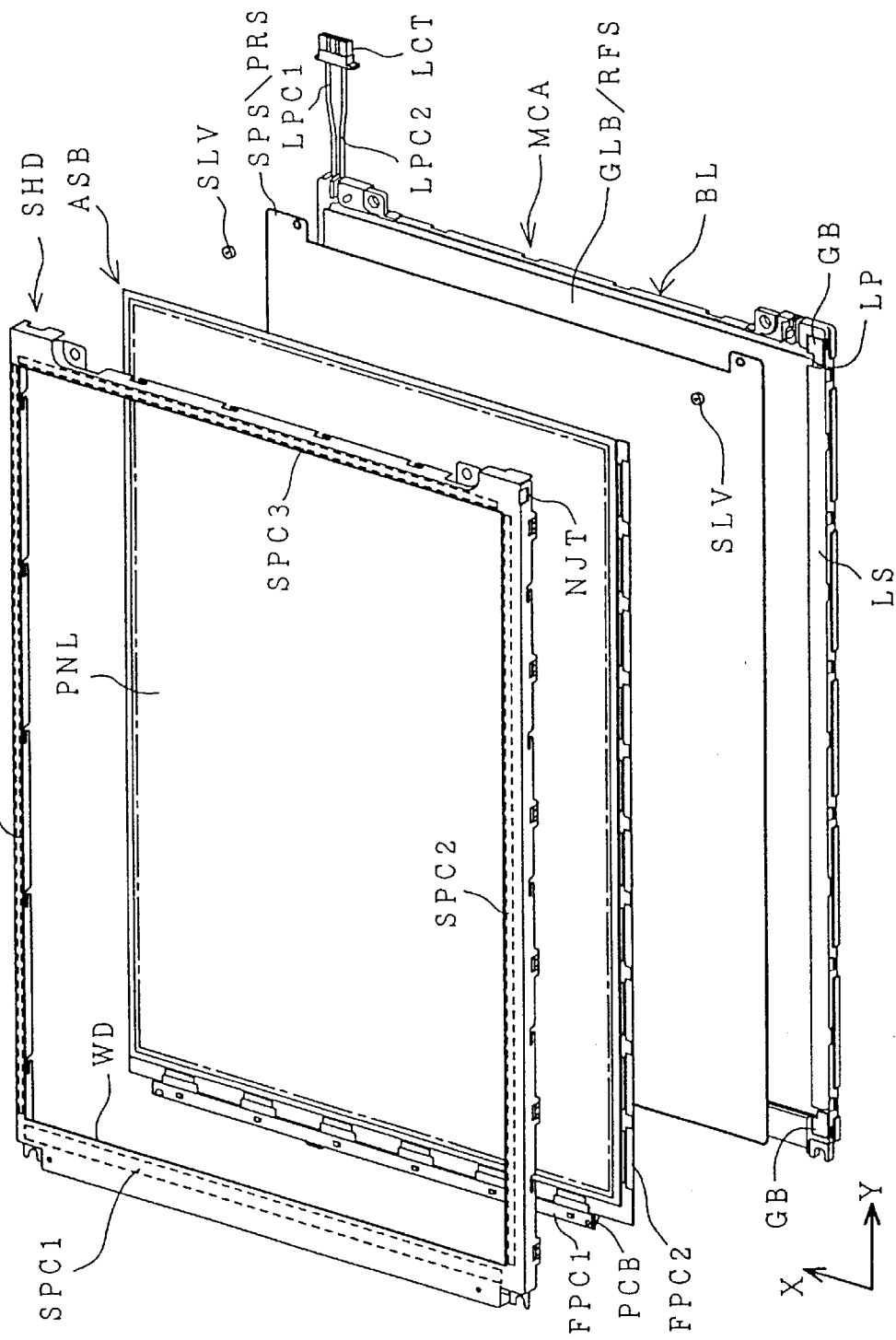
FIG. 7 is an exploded perspective view for explaining a general configuration of another example of a liquid crystal display device according to the present invention.

FIG. 7 is an exploded perspective view for explaining a general configuration of another example of a liquid crystal display device according to the present invention. SHD represents an upper case (shield case); WD represents a display window (hereinafter also simply referred to as window); SPC (SPC1 SPC4) represents insulated spacers; FPC1, FPC2 represent folded multi-layer flexible circuit boards (FPC1 represents a gate-side circuit board and FPC2 represents a drain-side circuit board); PCB represents an interface circuit board; ASB represents an assembled liquid crystal display element with a driving circuit; PNL represents a liquid crystal display element formed by mounting driving ICs on one of two transparent insulated substrates in an overlapping relationship; PRS represents prism sheets (two sheets); SPS represents a spreading sheet; GLB represents a light guide body; RFS represents a reflecting sheet; MCA represents a lower case formed using integral molding (hereinafter also referred to as molded case); LP represents a linear light source (cold-cathode fluorescent tube); LPC1, LPC2 represent lamp cables; LCT represents a connection connector for an inverter; and GB represents a rubber bush for supporting the cold-cathode fluorescent tube. They are stacked in the illustrated vertical relationship of arrangement and fixed by the upper case SHD and lower case MCA to be assembled into a liquid crystal display device (liquid crystal display module) MDL. Further details of the configuration will be described below.

Figure 8:
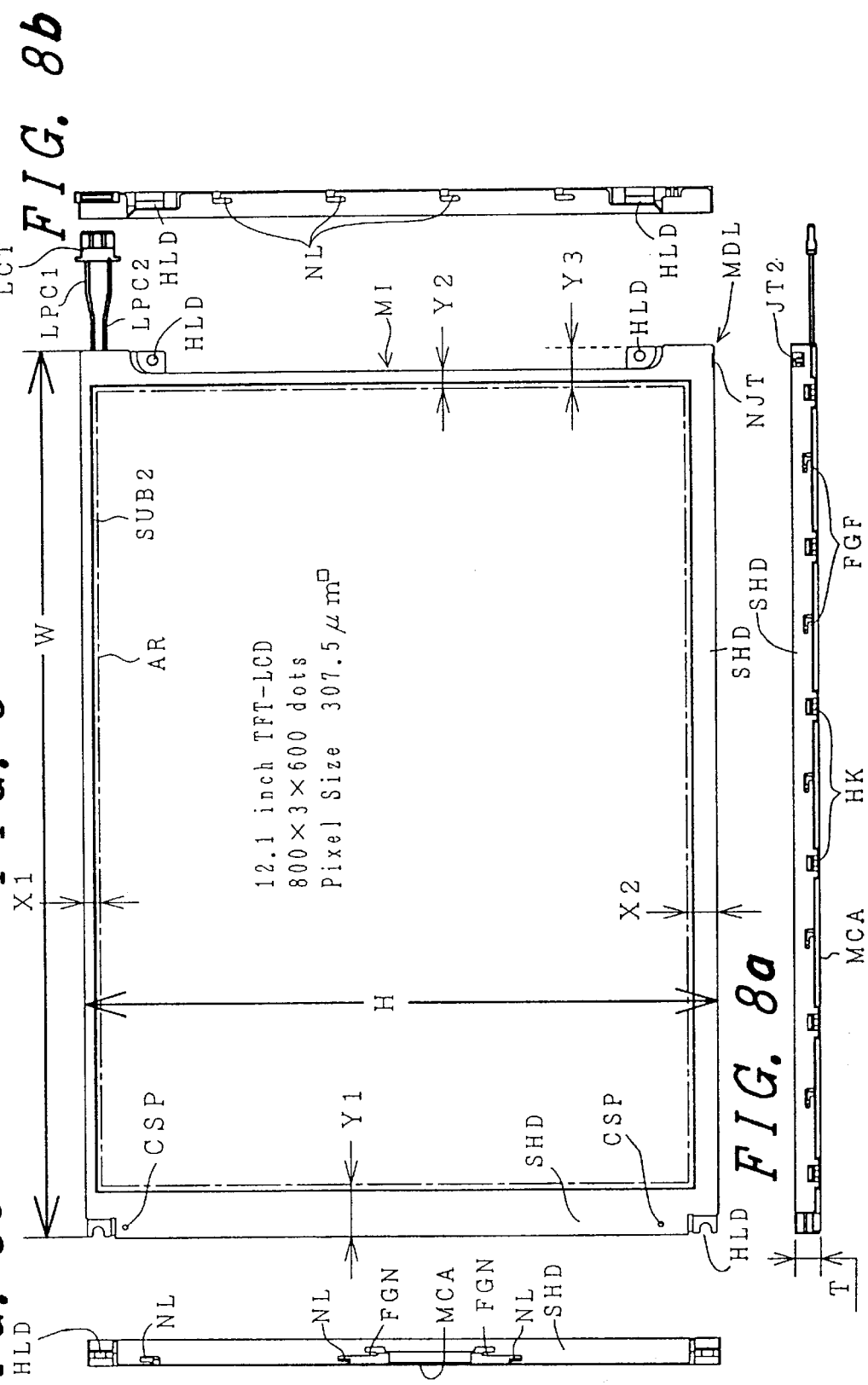
FIG. 8 is a view of the liquid crystal display module which has been completely assembled and shows a front view as viewed from the front side of the liquid crystal display element, a front side view, a right side view and a left side view.

FIG. 8 is a view of the liquid crystal display module which has been completely assembled and shows a front view as viewed from the front side (i.e., from the upper side or display side) of the liquid crystal display element PNL, a front side view, a right side view and a left side view.

Figure 9:
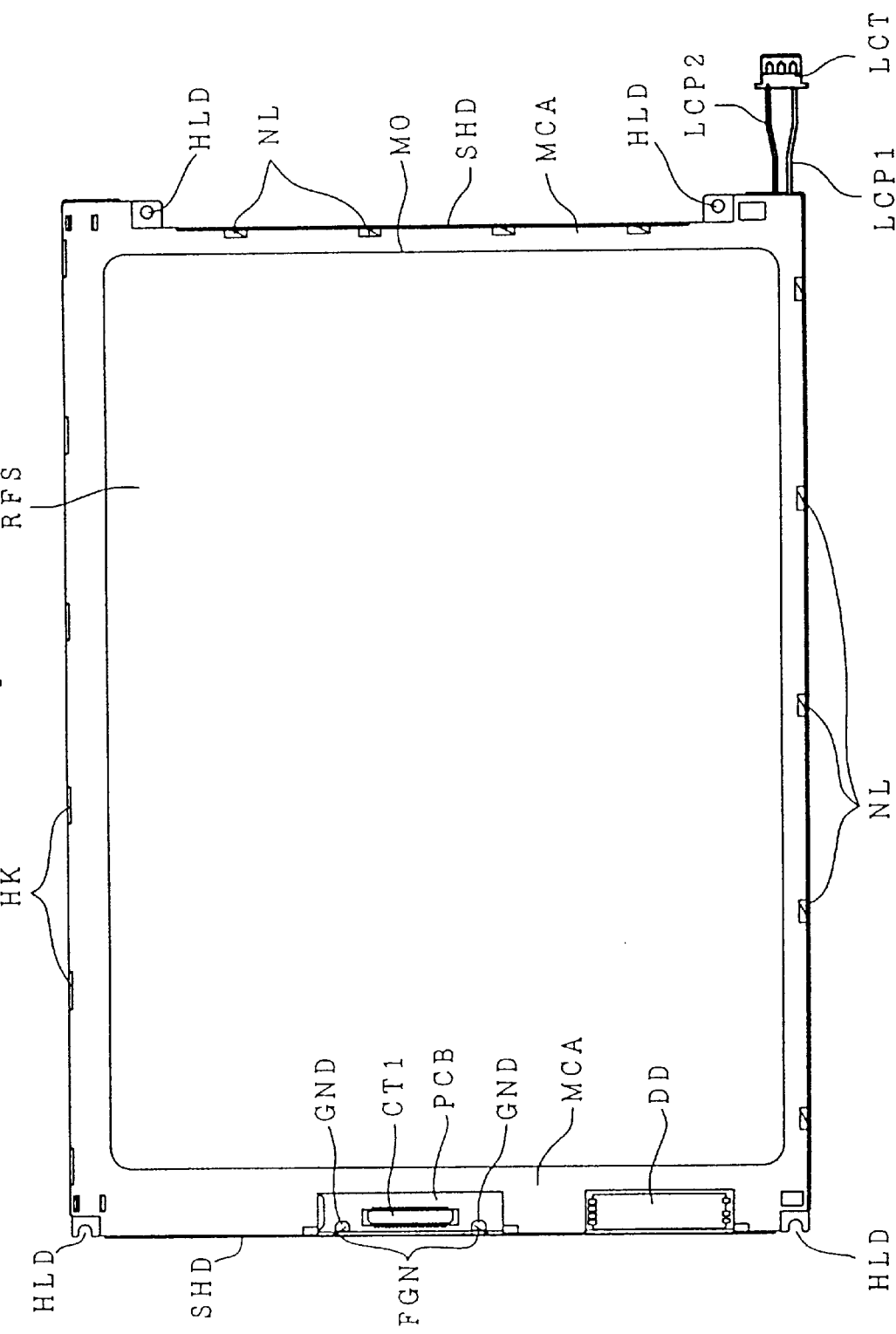
FIG. 9 is a view of the liquid crystal display module which has been completely assembled and shows a rear view as viewed from the rear side of the liquid crystal display element.

FIG. 9 is a view of the liquid crystal display module which has been completely assembled and shows a rear view as viewed from the rear side (i.e., the bottom side) of the liquid crystal display element PNL.

The liquid crystal display module MDL has two kinds of containing and holding members, i.e., the molded case MCA and the shield case SHD. HLD represents four mounting holes provided for mounting said module MDL, as a display portion, to an information processing apparatus such as a personal computer, word processor or the like. The mounting holes HLD on the shield case SHD are formed in positions corresponding to mounting holes MH (FIGS. 16 and 17 to be described later) on the molded case MCA (see FIG. 7), and screws or the like are inserted through both mounting holes to secure and mount them to the information processing apparatus. An inverter for a back light is provided in a region MI of said module MDL, and power is supplied to the back light BL through the connection connector LCT and the lamp cables LPC.

Signals from a main computer (host) and required power are supplied to a controller portion and a power supply portion of the liquid crystal display module MDL through an interface connector CT1 located on the rear side of said module.

Figure 35:
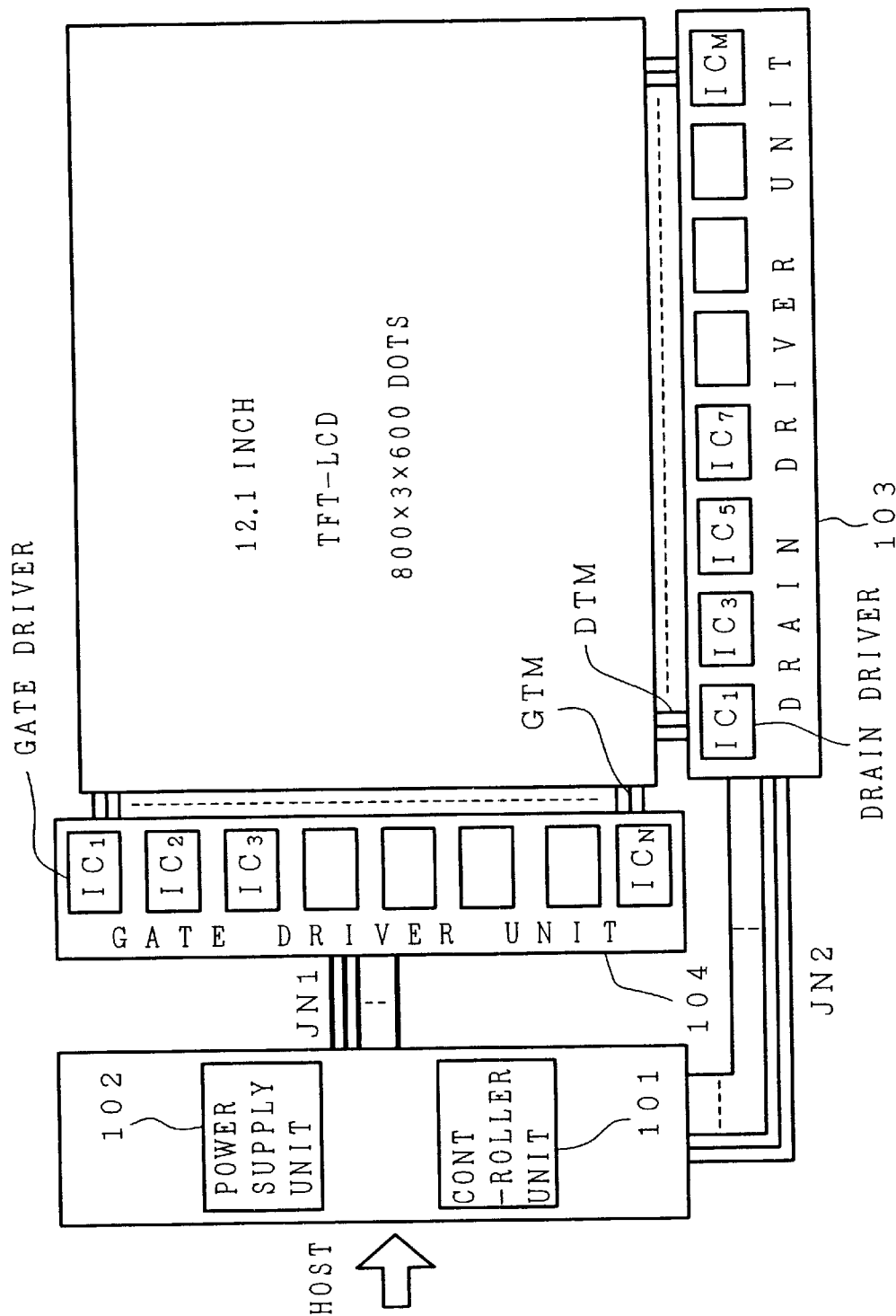
FIG. 35 is a block diagram for explaining a circuit configuration of a liquid crystal display element PNL and driving circuits and the like disposed on the periphery thereof.

FIG. 35 is a block diagram showing the TFT liquid crystal display element of the liquid crystal display module shown in FIG. 2 and the circuits provided around the same. Although not shown, in the present embodiment, drain drivers $IC_I$ $IC_M$ are mounted on a chip-on-glass basis (COG mounting) together with drain-side extraction lines DTM and gate-side extraction lines GTM formed on one of the substrates of the liquid crystal display device using an anisotropic conductive film or ultraviolet hardening resin.

In this example of configuration, M drain driver ICs and N gate driver ICs are COG-mounted to accommodate 800× 3×600 effective dots in accordance with the XGA specification. A drain driver portion 103 is provided on the underside of the liquid crystal display element; a gate driver portion 104 is provided on the left side surface thereof; and a controller portion 101 and a power supply portion 102 are provided on the left side surface thereof. The controller portion 101, power supply portion 102, drain driver portion 103 and gate driver portion 104 are interconnected through respective electrical connecting means JN1, JN2. The controller portion 101 and power supply portion 102 are provided on the rear side of the gate driver portion 104.

A configuration of each of the components will be described in detail with reference to FIGS. 8 to 34.

<Metal Shield Case>

FIG. 8 shows the upper surface, front side surface, right side surface and left side surface of the shield ease SHD, and FIG. 2 is a perspective view of the shield case SHD as viewed from diagonally above. The shield case (upper case or metal frame) SHD is fabricated by punching and folding a metal sheet using a press processing technique. WD represents an aperture for exposing the liquid crystal display element PNL to a field of view which will be hereinafter referred to as display window.

NL represents nails for fixing the shield case SHD and molded case MCA together and, for example, 12 nails are provided. HK represents hooks which are also used for fixing and, for example, 6 hooks are provided and are each provided integrally with the shield case SHD. The liquid crystal display element with driving circuits ABS is placed in the shield case SHD with the spacers SPC interposed and with fixing nails NL shown in FIGS. 7 and 8 unfolded and, thereafter, each of the nails is folded inward to be inserted into a square fixing recess NR (see each side view in FIG. 16) provided on the molded case MCA (see FIG. 9 for the folded state).

Each of the fixing hooks HK is engaged with a fixing protrusion HP (see the side views in FIG. 16) provided on the molded case MCA. As a result, the shield case SHD that holds and contains the liquid crystal display element with driving circuits ABS and the molded case MCA that holds and contains the light guide body GLB, cold-cathode fluorescent tube LP and the like are rigidly fixed together. Further, a thin elongate rectangular rubber cushion is provided at four peripheral edges of the lower surface of the light guide body GLB (the rear surface of the reflecting sheet) (see FIGS. 31 34 to be described later). FIGS. 31 to 34 show sections of respective sides of the liquid crystal display device shown in FIG. 4, and the respective sides of the liquid crystal display device of FIG. 8 have substantially similar sections with slight differences.

Since the fixing nails NL and fixing hooks HK can be easily removed only through an operation of unfolding the fixing nails NL to release the fixing hooks HK, repair is easy and the cold-cathode fluorescent tube of the back light BL can be easily replaced. In this example of configuration, since one side is fixed primarily with the fixing hooks HK and another side opposite thereto is fixed with the fixing nails NL, as shown in FIG. 8 the device can be disassembled only by removing a part of the fixing nails NL instead of removing all of the fixing nails NL. This facilitates repair and replacement of the back light.

CSP represents through holes for setting the relative positions of the shield case SHD and other components accurately by mounting the shield case SHD such that fixedly erected pins are inserted in the through holes CSP during manufacture. The insulated spacers SPC1 SPC4 are insulators applied with adhesive on the surface thereof, and the shield case SHD and liquid crystal display device with driving circuits ABS can be reliably secured at an interval maintained by the insulated spacers. When said module MDL is mounted on a product such as a personal computer as an application, the through holes CSP can be a reference to positioning.

<Insulated Spacer>

Figure 31:
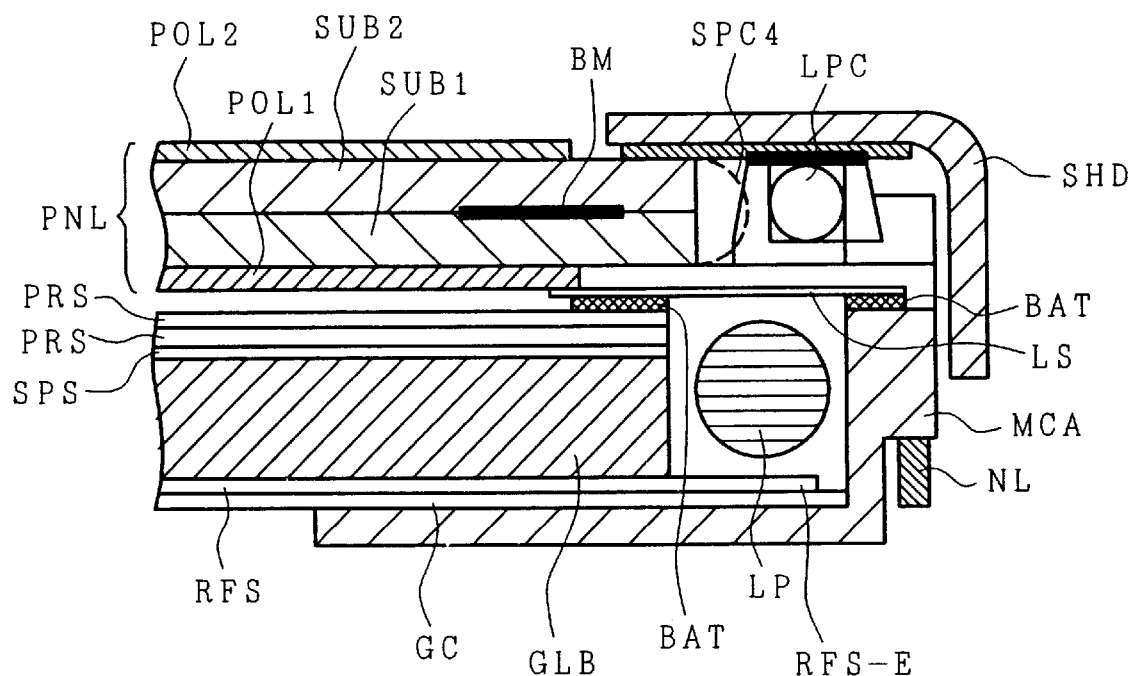
FIG. 31 is a sectional view taken along the line A—A in FIG. 4.
Figure 33:
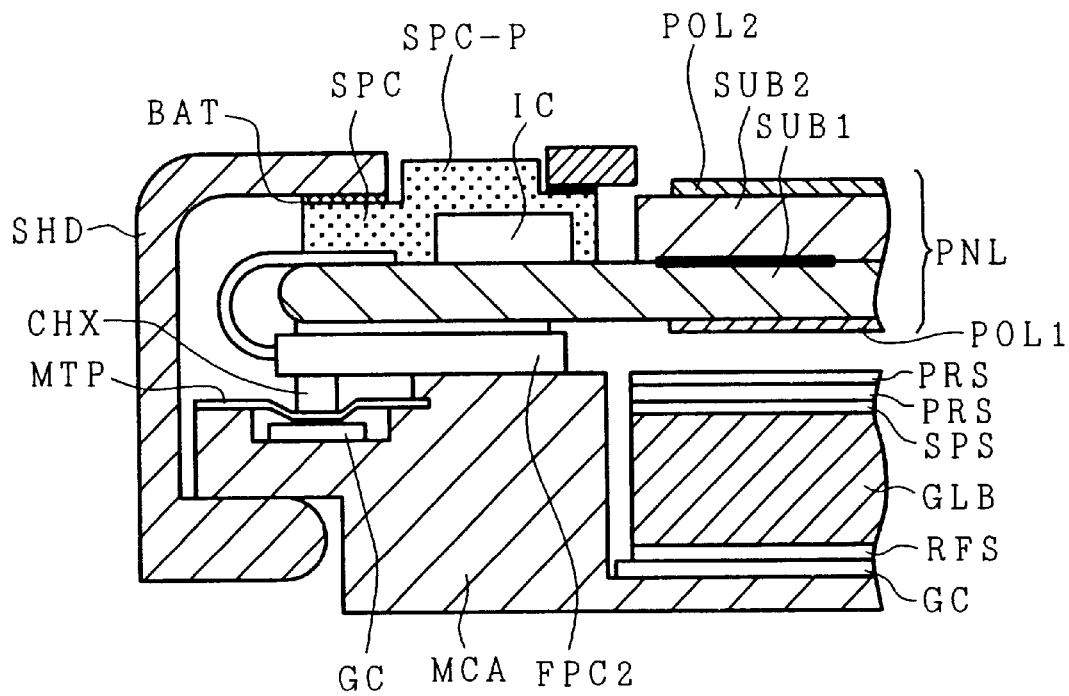
FIG. 33 is a sectional view taken along the line C—C in FIG. 4.

As shown in FIG. 7 and FIGS. 31 33, the insulated spacers SPC (SPC1 SPC4) not only maintain insulation between the shield case SHD,and the liquid crystal display element with driving circuits ABS but also maintain the positional accuracy of the shield case SHD and secure the liquid crystal display element with driving circuits ABS and the shield case SHD with the double-sided adhesive tape BAT.

<Multi-Layer Flexible Board FPC1, FPC2>

Figure 10:
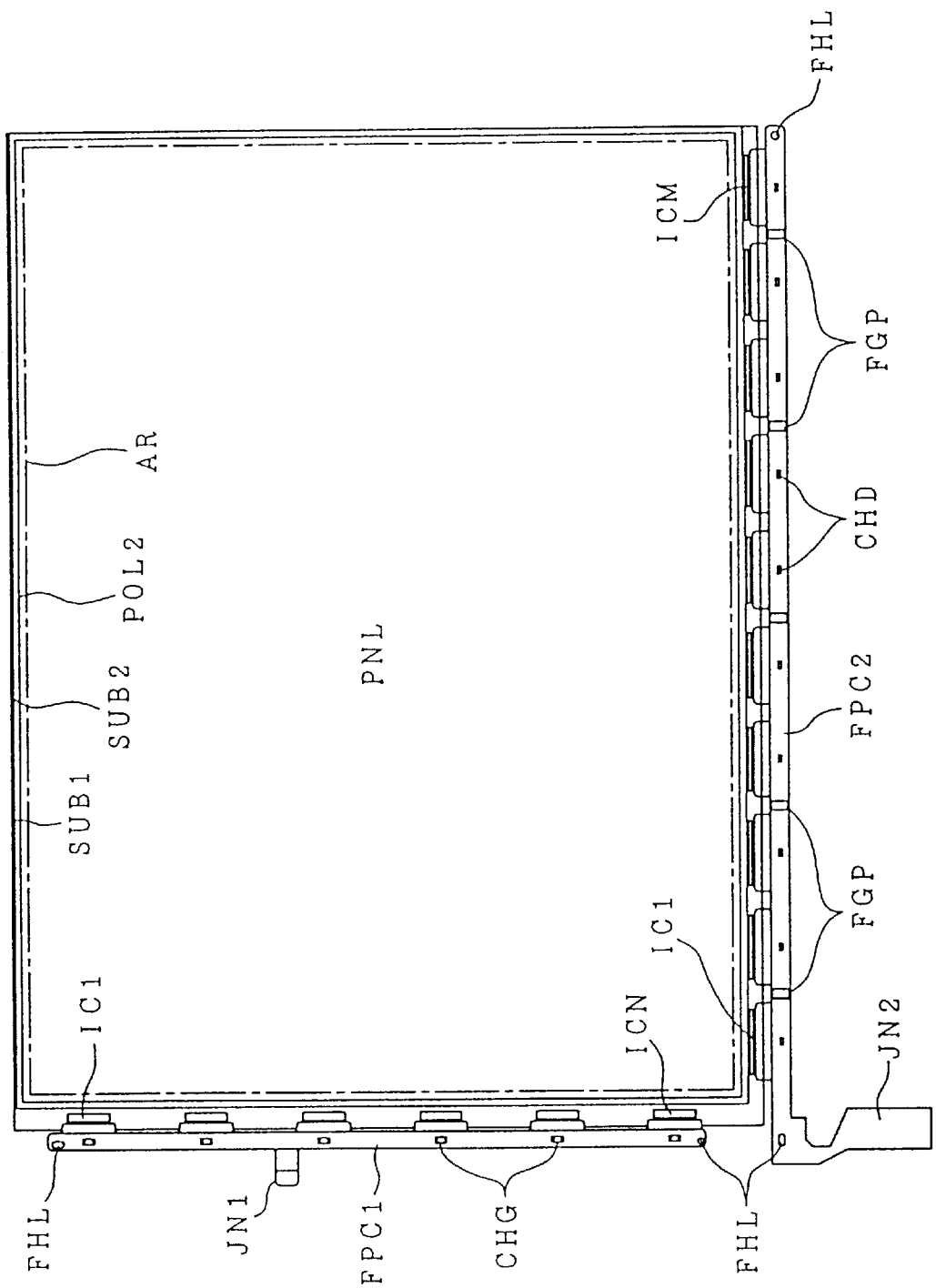
FIG. 10 is a front view of a liquid crystal display element with driving circuit boards which is a liquid crystal display element having a gate-side flexible board and an unfolded drain-side flexible board mounted on the periphery thereof.

FIG. 10 is a front view of a liquid crystal display element with driving circuit boards which is a liquid crystal display element PNL having a gate-side flexible board FPC1 and an unfolded drain-side flexible board FPC2 mounted on the periphery thereof.

Figure 11:
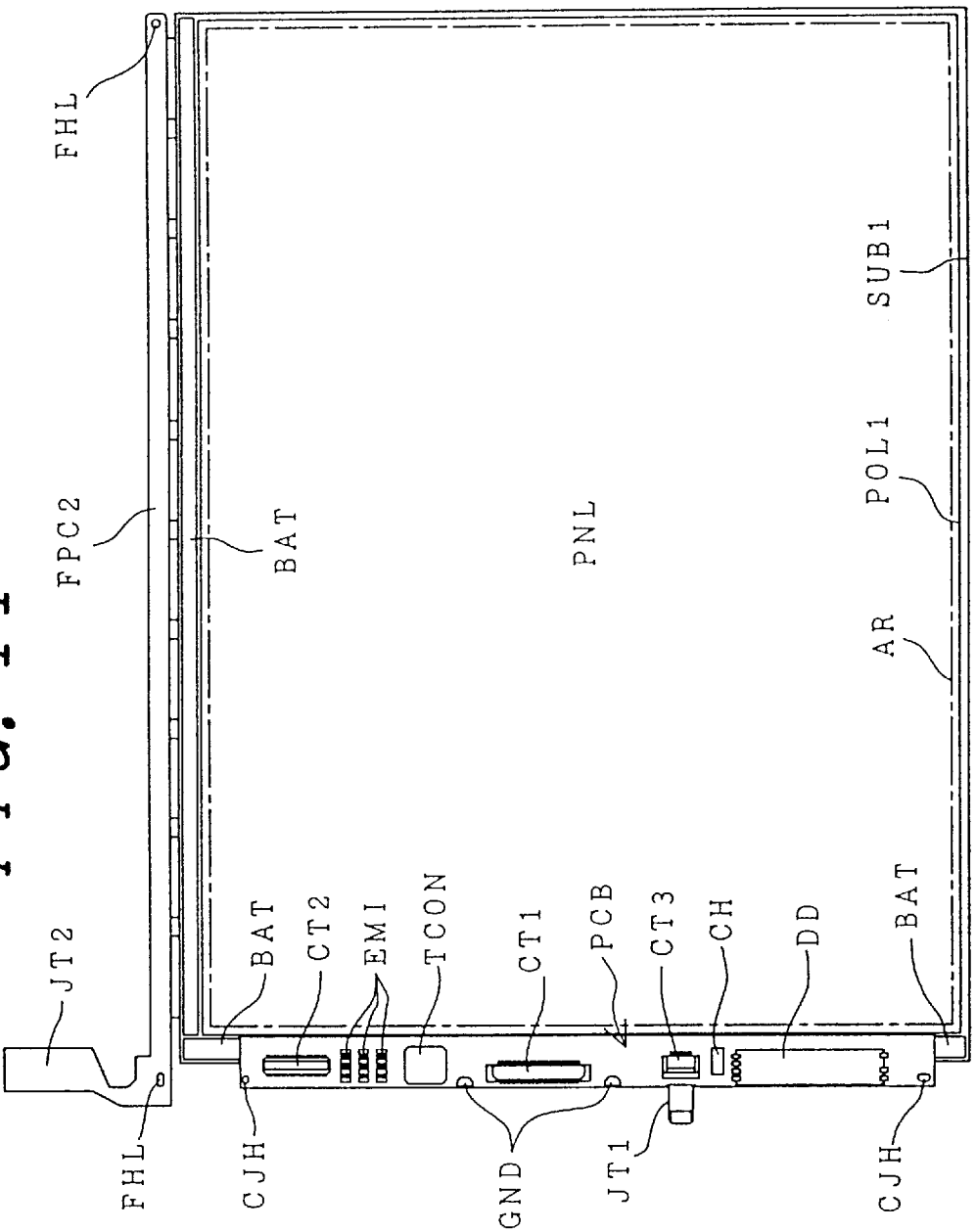
FIG. 11 is a rear view of the liquid crystal display element with driving circuit boards shown in FIG. 10 on which an interface circuit board is mounted.

FIG. 11 is a rear view of the liquid crystal display element with driving circuit boards shown in FIG. 10 on which an interface circuit board PCB is mounted.

Figure 12:
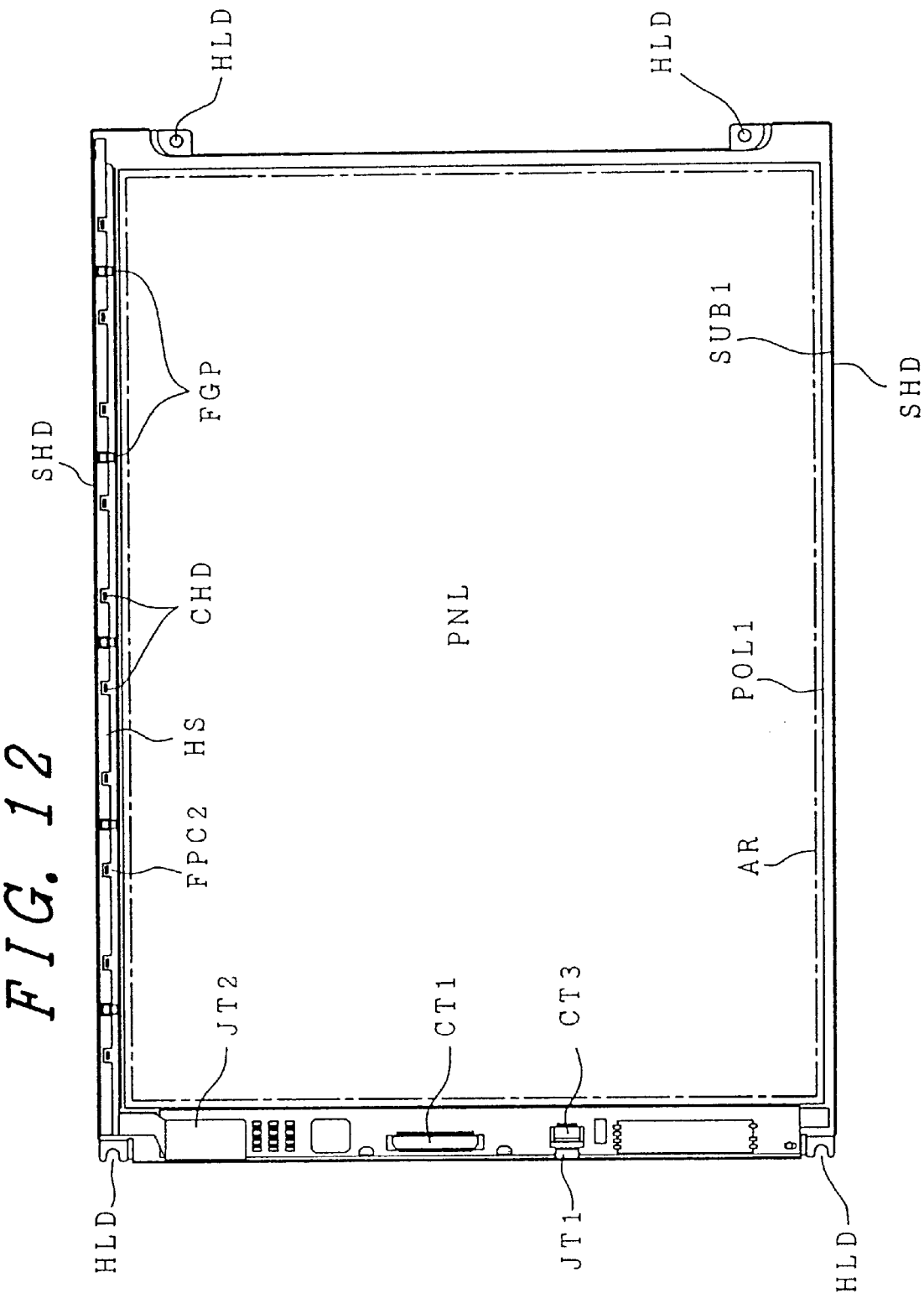
FIG. 12 is a rear view showing a state in which the flexible board has been folded to contain the liquid crystal display element in a shield SHD case after mounting the flexible boards and the interface circuit board with the shield case SHD placed thereunder.

FIG. 12 is a rear view showing a state in which the flexible board FPC2 has been folded to contain the liquid crystal display element PNL in a shield case SHD after mounting the flexible boards FPC1, FPC2 and the interface circuit board PCB with the shield case SHD placed thereunder.

The IC chip shown on the left side of FIG. 10 is a driving IC chip for a vertical scan circuit, and the lower IC chip is a driving IC chip for an image signal driving circuit. They are COG-mounted on the substrate using an anisotropic conductive film (ACF2 in FIG. 29), ultraviolet hardening agent or the like.

According to conventional methods, a tape carrier package (TCP) having driving IC chips mounted thereon using tape-automated bonding (TAB) has been connected to a liquid crystal display element PNL using an anisotropic conductive film. COG mounting reduces fabrication steps because driving ICs are directly used to eliminate the above-described TAB step and also provides an effect of reducing cost because the tape carrier is not required. In addition, COG mounting is a mounting technique suitable for liquid crystal display elements with high definition and high density.

Here, drain drivers (driving ICs) are arranged in a row along one of the longer sides of a liquid crystal display element PNL, and drain lines are extracted at the one longer side. While gate lines are also extracted at one of the shorter sides, the gate lines may be extracted at the two opposite short sides for higher definition.

The driving ICs are mounted such that the center thereof coincides with the center a of the drain lines driven by said driving ICs in a display area AR, as illustrated in FIG. 1, and the center c of a conductor layer portion (protrusion) FSL of the drain-side flexible board FPC2 for connecting to terminal wiring Td of said driving ICs is offset from the center b of the driving ICs toward the interface circuit board PCB.

In a system in which drain lines or gate lines are alternatively extracted, although the drain lines DTM or gate lines GTM can be easily connected to bumps BUMP at the output side of driving ICs, peripheral circuit boards must be provided at the periphery on the two opposite long sides of the liquid crystal display element PNL. This results in a problem in that the external dimensions become greater than those in the case of extraction at only one side. Especially, when the number of displayed colors is increased, the external dimensions of an information processing apparatus become large because of an increase in the number of data lines. In the present example of configuration, therefore, a multi-layer flexible board is used to extract drain lines at only one side.

Figure 22A:
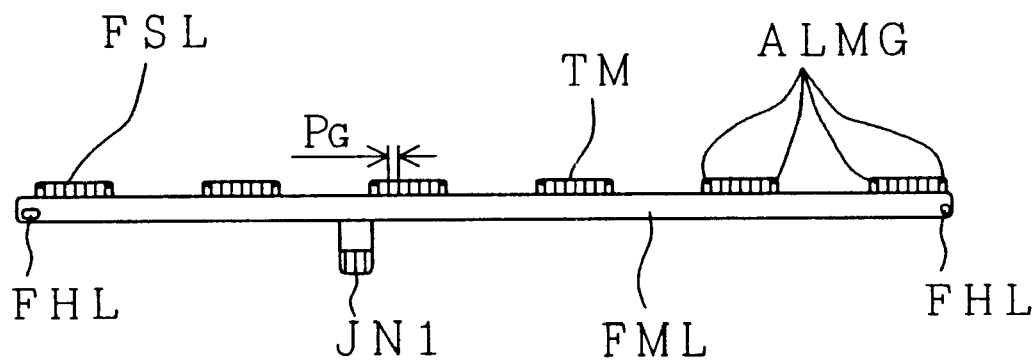
FIG. 22a is a front view of a multi-layer flexible board for driving gate drivers.
Figure 22B:
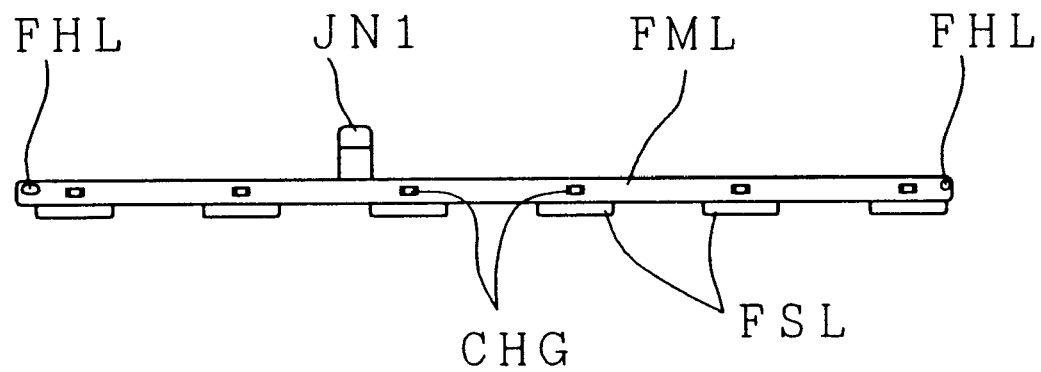
FIG. 22b is a rear view of the multi-layer flexible board for driving gate drivers.

FIG. 20 is an illustration of a multi-layer flexible board FPC2 for driving drain drivers; (a) is a rear (bottom) view; and (b) is a front (plane) view. FIG. 22 is an illustration of a multi-layer flexible board FPC1 for driving gate drivers; (a) is a rear (bottom) view; and (b) is a front (plan) view.

Figures 20A, 20B:
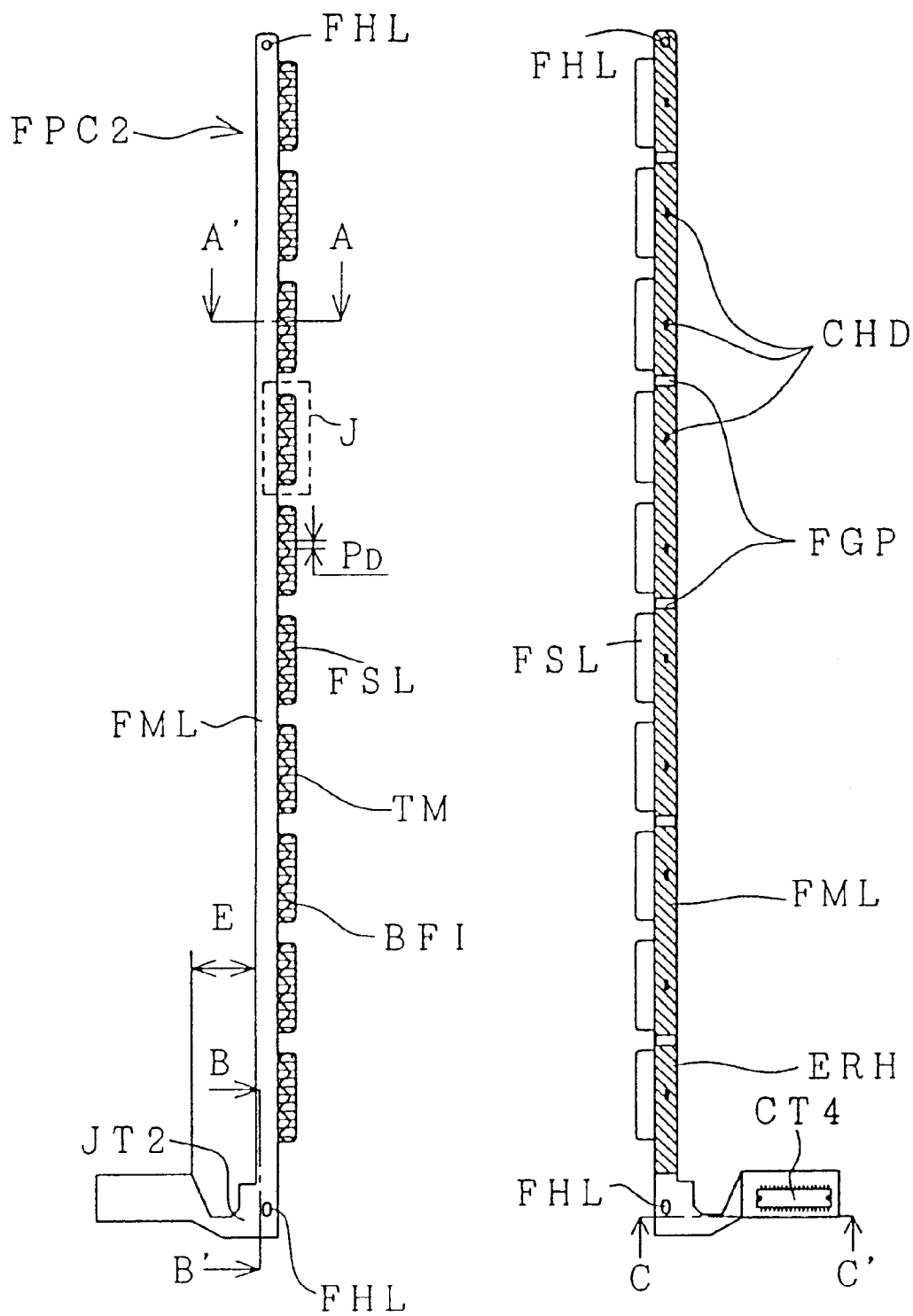
FIG. 20a is a front view of a multi-layer flexible board FPC2 for driving drain drivers.
FIG. 20b is a rear view of the multi-layer flexible board FPC2 for driving drain drivers.
Figure 26:
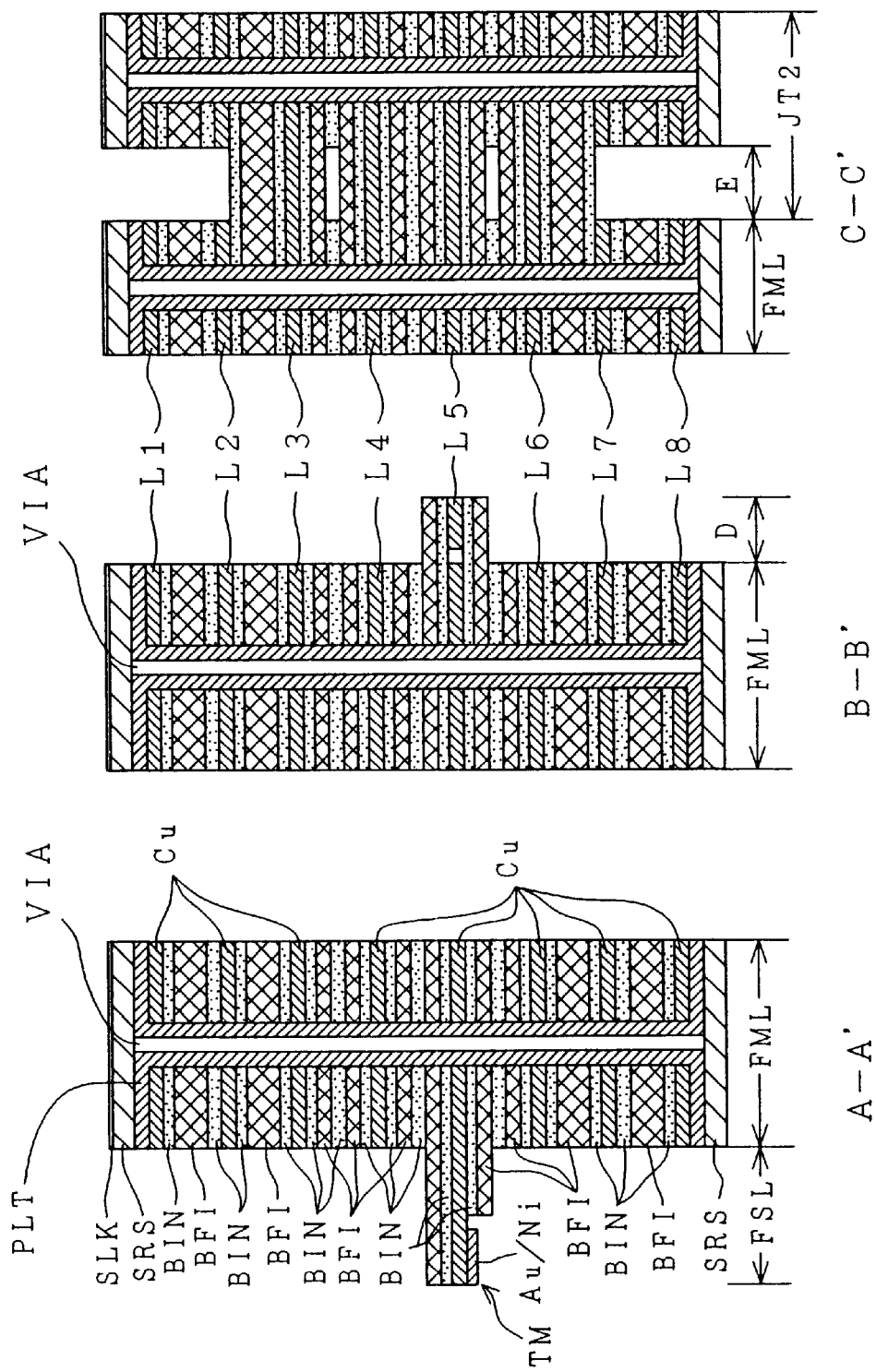
FIG. 26a is a sectional view taken along the line A—A in FIG. 20.
FIG. 26b is a sectional view taken along the line B—B in FIG. 20.
FIG. 26c is a sectional view taken along the line C—C in FIG. 20.

FIG. 26 illustrates a structure of the multi-layer flexible board FPC2 shown in FIG. 20; (a) is a sectional view taken along the line A—A in FIG. 20(a); (b) is a sectional view taken along the line B—B in the same; and (c) is a sectional view taken along the line C—C in the same. For the purpose of description, the ratio between the dimensions in the direction of thickness and the direction of the plane of FIG. 26 is different from that of actual dimensions and is shown in an exaggerated form.

Figure 23:
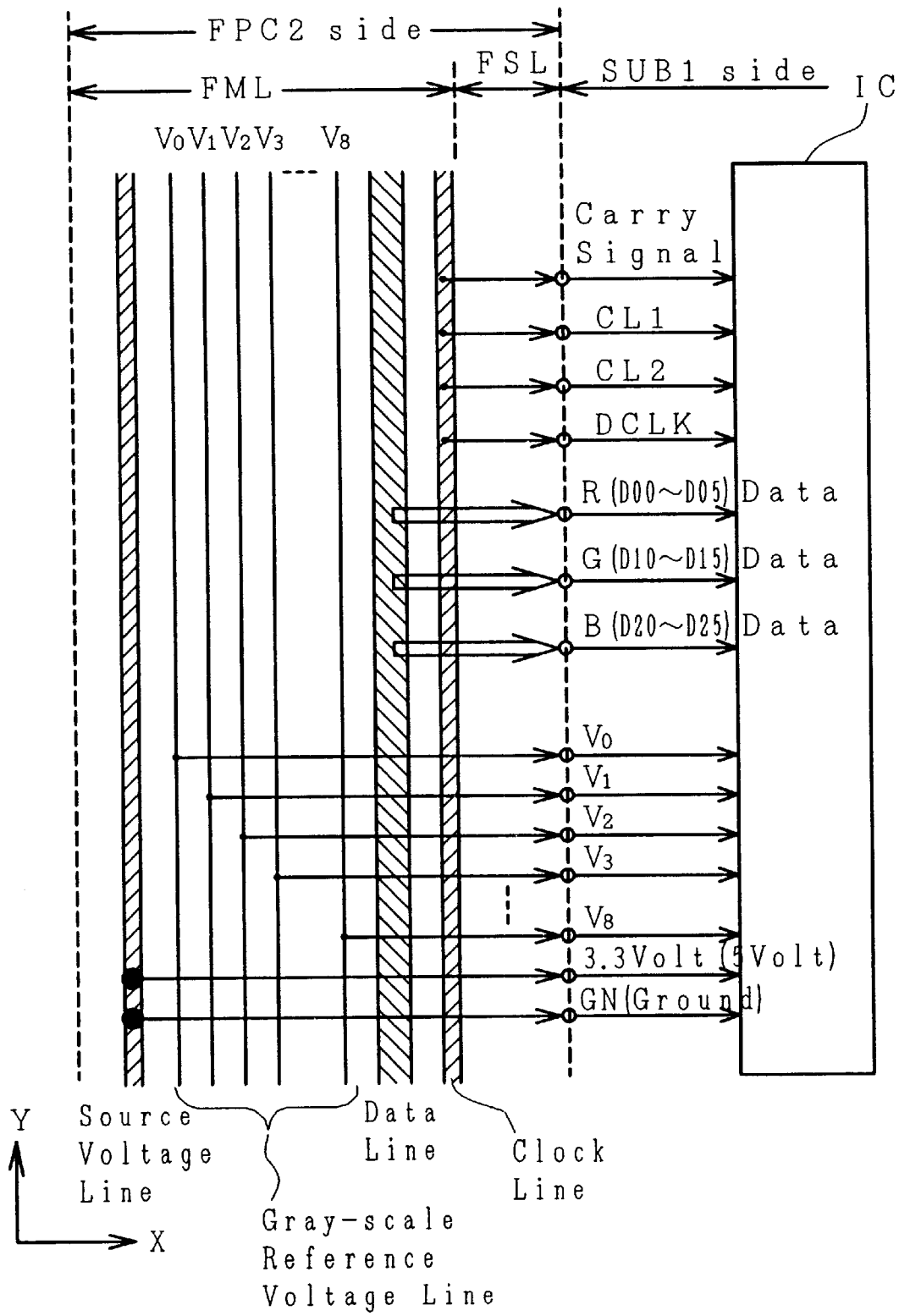
FIG. 23 is a wiring diagram showing signal wiring in a multi-layer flexible board and connection of an input signal to a driving IC on a lower substrate.

FIG. 23 is a wiring diagram showing signal wiring in the multi-layer flexible board FPC and connection of an input signal to a driving IC on the substrate SUB1. The signal wiring in the multi-layer flexible board FPC consists of a first group of lines in parallel with one side of the substrate SUB1 and a second group of lines perpendicular thereto. The first group of lines is a group of common lines for supplying a signal common to driving ICs, and the second group of lines is a group of lines for supplying a signal required for each of the driving ICs. Therefore, the portion FSL is formed by at least one conductive layer. The portion FML is formed by at least two conductive layers, and the first group of lines and the second group of lines must be electrically connected by a through hole. In this example of configuration, the length of the short sides of the portion FML must be reduced to a length such that it does not touch the lower polarizing sheet when folded.

Specifically, as shown in FIG. 26, the portions FML of three or more conductive layers, e.g., eight conductive layers L1 L8 in this example of configuration, are provided in parallel with one side of the liquid crystal display element PNL, and peripheral circuit wiring and electronic components are mounted on such portions. It is thus possible to increase the number of layers with the external dimensions of the substrate kept unchanged even when the number of the data lines is increased.

The conductive layer L1 is used for component pads and ground; L2 is used for a power supply for a tone reference voltage Vref of 5 V (or 3.3 V); L3 is used as the ground; L4 is used for data signals and clocks CL2 and CL1; L5 is used for extraction lines as the second group of Lines; L6 is used for the tone reference voltage Vref; L7 is used for data signals; and L8 is used for a power supply of 5 V (3.3 V).

Connection between the conductive layers is electrically made via a through hole VIA (see FIG. 26(a)). While the conductive layers L1 L8 are formed by copper (Cu) wiring, the region of the conductive layer L5 connected to the input terminal wiring Td to the driving IC of the liquid crystal display element PNL (see FIGS. 24 and 25) is further plated with gold (Au) on a nickel (Ni) underlying layer on the copper (Cu). This reduces connection resistance between the output terminal TM and input terminal wiring Td.

Intermediate layers formed by polyimide films BFI as insulation layers are interposed between the conductive layers L1 L8, and the conductive layers are bonded together by adhesive layers BIN. While the conductive layers other than the output terminal TM are coated with an insulation layer, solder resist SRS is applied to the uppermost and lowermost layers at the multi-layer wiring portion FML to maintain insulation. Further, an insulating silk material SLK is applied to the uppermost surface.

The multi-layer flexible board is advantageous in that the conductive layer L5 including the connection terminal portion TM required for COG-mounting can be configured integrally with the other conductive layers to reduce the number of components.

In addition, the portion FML can be a rigid portion having less deformation when it is formed by three or more conductive layers and, as a result, a locating hole FHL can be provided in this portion. No deformation occurs in this portion when the multi-layer flexible board is bent, which allows the board to be bent with high reliability and accuracy. Furthermore, as described later, a solid or meshed conductor pattern ERH having a multiplicity of small holes ESH with a diameter of, for example, about 200 Mm (see FIG. 28($a$)) can be provided on the surface layer L1, and conductor patterns for mounting components and for peripheral wiring can be provided on two or more of the remaining conductive layers.

The protrusion FSL does not need to be a single conductive layer, and the protrusion FSL may be formed by two conductive layers. Such a configuration using two conductive layers is advantageous when the pitch of the input terminal wiring Td to the driving IC is small in that the patterns of the terminal wiring Td and connection terminal portion (extraction lines) TM are formed as a group of lines in the form of a plurality of staggered rows to electrically connect each lines with an anisotropic conductive film or the like, to connect the group of line in one of the rows to be connected to the second conductive layer through the through hole VIA while the connection terminal portion TM on the first conductive layer is extracted and to allow a part of the peripheral wiring to be provided on the second conductive layer in the protrusion FSL.

By forming the protrusion FSL with two or less conductive layers, it is possible to achieve high thermal conduction during thermal pressure bonding using a heat seal and to allow the application of a uniform pressure, thereby improving the reliability of electrical connection between the connection terminal portion TM and the terminal wiring Td. Further, the multi-layer flexible board can be bent with high accuracy without applying a bending stress to the connection terminal portion TM. In addition, since the protrusion FSL is semitransparent, patterns on the conductive layers can be seen from the upper surface of the multi-layer flexible board, which is advantageous in that pattern inspections such as on the state of connection can be carried out from the upper surface. JT2 in FIG. 20 represents a recess for electrically connecting the drain-side flexible board FPC2 and the interface circuit board PCB, and CT4 represents a flat type connector provided at the end of the convex portion JT for electrically connecting the flexible board FPC2 and the interface circuit board PCB.

Figure 21A:
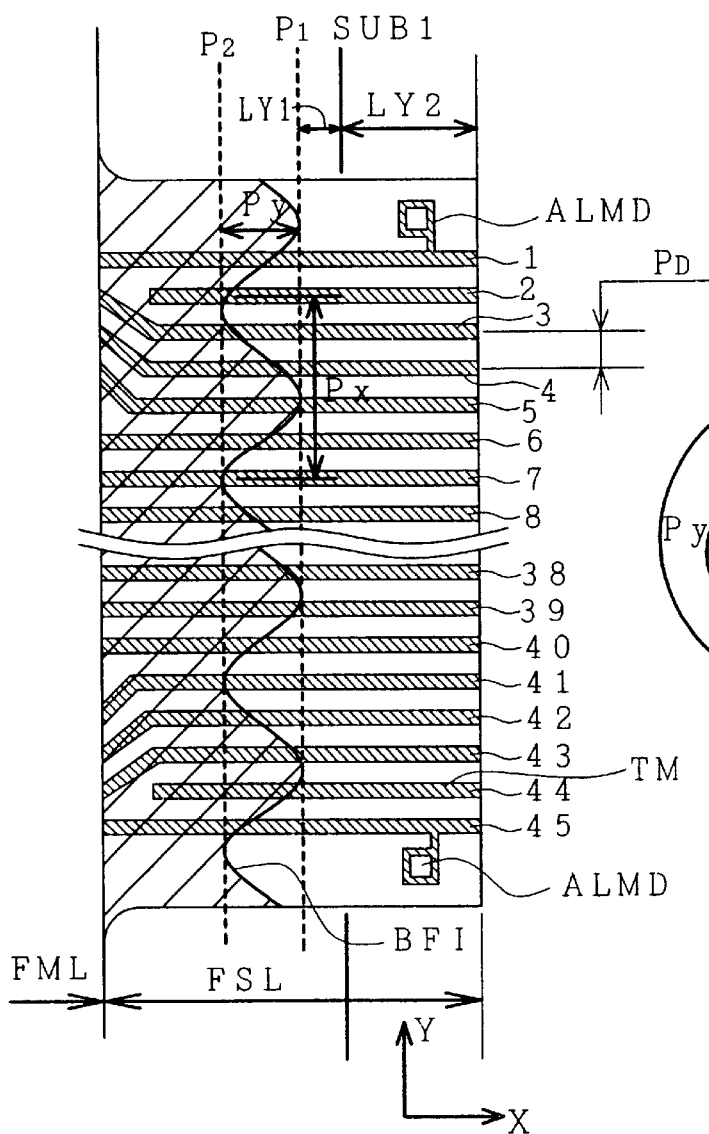
Figure 21B:
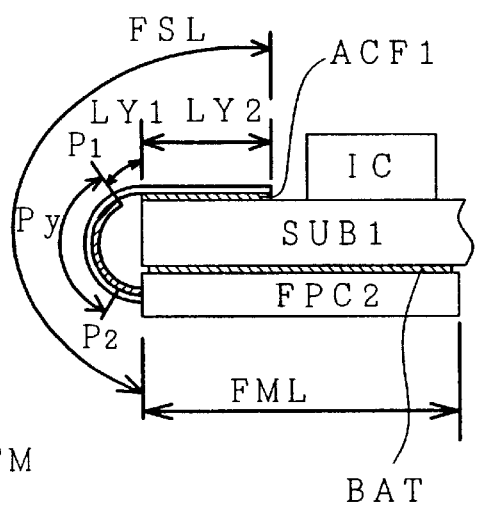
FIG. 21b is a side view of the multi-layer flexible board PC2 in a state in which it is connected to a lower substrate SUB1 of a liquid crystal display panel.

FIG. 21 illustrates major parts of the multi-layer flexible board FPC2; (a) is an enlarged detailed view of the portion J in FIGS. 20($a$); and ($b$) is a side view showing the mounting and folding of the multi-layer flexible FPC2.

In FIG. 21($a$), $P_X$ represents the wavelength of an wavy configuration at an end of the polyimide film BFI; $P_Y$ represents the height of the wave (the amplitude of the wave ×2); $P_1$ represents a straight line connecting peaks of the wave (referred to as peak line of the wave); and $P_2$ represents a straight line connecting bottoms of the wave (referred to as bottom line of the wave). LY2 represents the length of the connecting portion between the multi-layer flexible board FPC2 and the substrate SUB1 (referred to as connection length), and LY1 represents the length between the connecting portion between the multi-layer flexible board FPC2 and substrate SUB1 and the peak line $P_1$ of the wave.

As shown in FIG. 21($b$), the drain-side flexible board FPC2 is connected to the terminals of the drain lines (terminals Td in FIGS. 24 and 25) at the end of the SUB1 of the liquid crystal display element PNL at one end thereof through the anisotropic conductive film ACF and is folded at an intermediate portion of the wave height $P_Y$ outside the edge thereof. The multi-layer wiring portion FML at the other end is disposed on the lower side of SUB1 and is applied to the lower side of SUB1 with the double-sided adhesive tape BAT. The numbers 1 45 assigned to the output terminals TM in FIG. 16($b$) correspond to the numbers 1 45 assigned to the terminals Td in FIGS. 24 and 25. They are electrically connected through an anisotropic conductive film ACF1.

As described above, according to this configuration, in the flexible board FPC2 for signal input connected to the end of the substrate SUB1 of the liquid crystal display element at one end thereof and folded upon the lower side (or upper side) of said substrate SUB1 at the other end thereof, the end of the polyimide film BFI of the protrusion FSL thereof is molded in a wavy configuration (or a configuration having peaks and bottoms such as a comb-like configuration) along the direction of a folding line. This makes it possible to disperse a concentration of stress at the end of the polyimide film BFI in the folded region, to provide the folded region with a preferable curve (R) and to prevent the occurrence of wire breakage, thereby improving reliability.

In this example of configuration, the gate-side multi-layer flexible board FPC1 has three conductive layers, i.e., L1 for $V_{dg}$ (10 V), $V_{sg}$ (5 V) and $V_{ss}$ (ground), L2 for extraction lines, a clock CL3, FLM and $V_{dg}$ (10 V), for $V_{EG}$ (–10 to 7 V), $V_{EE}$ (–14 V), $V_{SG}$ (5 V) and a common voltage $V_{com}$.

A description will now be made on alignment marks ALMG (FIG. 22($a$)) and ALMD (FIG. 21($a$)) on the multi-layer flexible board.

In the multi-layer flexible boards FPC1 and FPC2 shown in FIGS. 20 22, the length of the output terminals TM is normally designed at about 2 mm in order to maintain reliability of connection. However, since the long sides of the flexible boards FPC1 and FPC2 are long, a positional shift including a slight rotation in the direction of the long axis can cause a positional shift between the input terminal wiring Td and output terminals TM, which can lead to poor connection. The alignment between the liquid crystal display element PNL and the flexible boards FPC1 and FPC2 is carried out by aligning the input terminal wiring Td and output terminals TM in several points after inserting the fixed pins into the holes FHL formed on both sides of each board. Two each alignment marks ALMG and ALMD are provided at each protrusion FSL in order to improve accuracy further.

In this example of configuration, in order to improve reliability of connection, dummy lines NC are provided in positions adjacent to a predetermined number of input terminals TM; further, the square alignment marks ALMG are connected to the dummy lines by patterns; and square solid patterns on the substrate SUB1 in a face-to-face relationship thereto (see ALC shown in FIGS. 24 and 25 on the drain side) are positioned such that they are located within the squares.

The common voltage is supplied to the common transparent pixel electrode on the substrate SUB2 through the pattern COM of the terminal wiring Td on the substrate SUB1 via conductive beads or paste.

Figure 25:
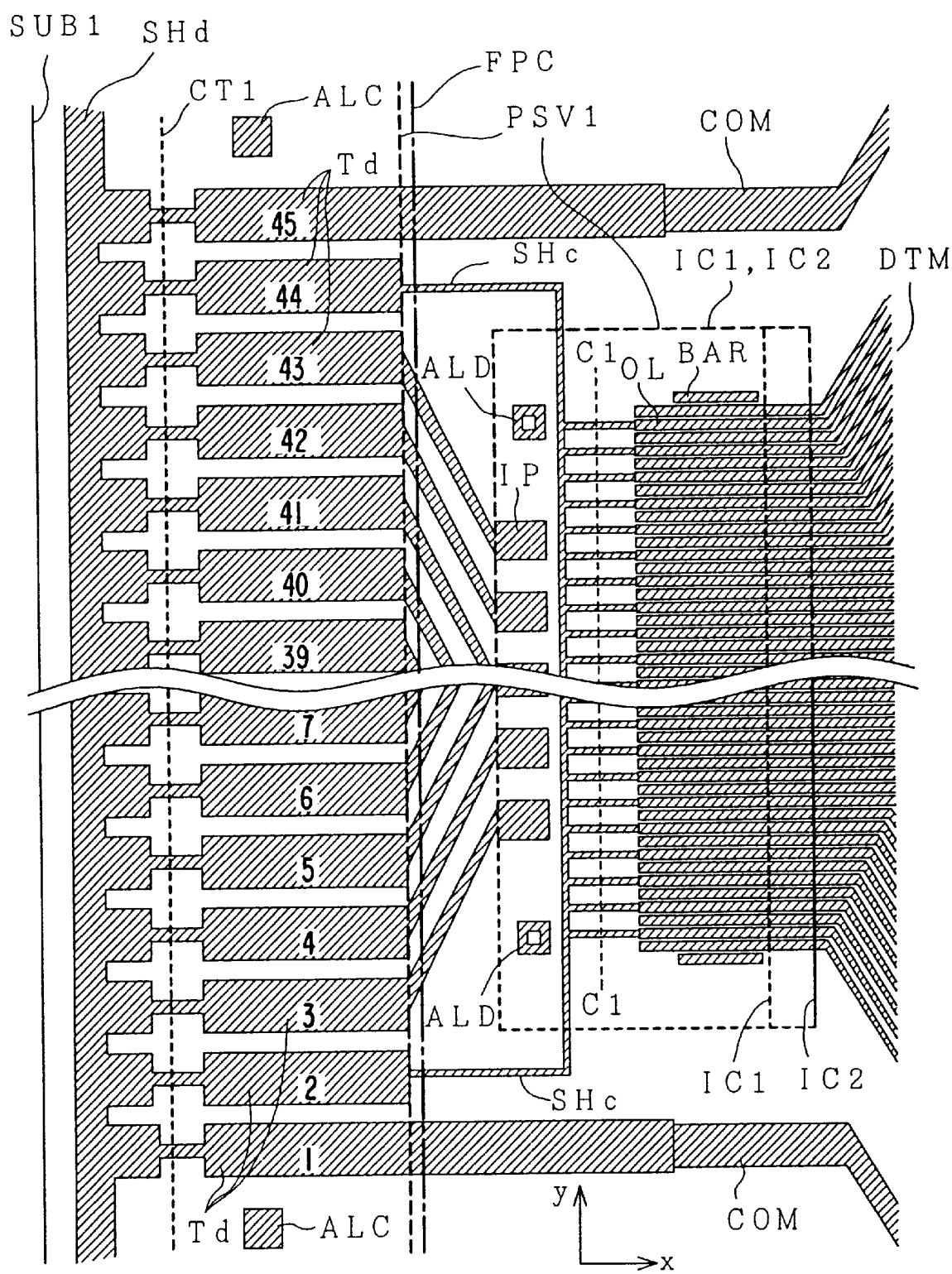
FIG. 25 is a plan view of major parts around the region of the lower substrate of the liquid crystal display element where the drain-driving IC is mounted and around a cutting line CT1 through said substrate.

The alignment marks ALMG are provided such that they are connected to the terminal COMT electrically connected to the common transparent pixel electrode COM through patterns and are aligned with square solid patterns ALD on the substrate SUB1 (see FIG. 25). Further, in this example of configuration, there is provided a joint pattern (not shown) for connecting to the flexible board FPC1 for the gate drivers at the lower end of the flexible board FPC2 for the drain drivers in FIG. 20(a).

A description will now be made on the configuration of the conductor layer portion FSL having two layers or less.

The protruding configuration FSL formed by one or two layers of conductor wiring is separated into a convex configuration for each driving IC. Therefore, the multi-layer flexible boards thermally expand in the direction of the longer axes thereof during thermal pressure bonding using a heat tool. This causes changes in pitches $P_G$ and $P_D$ of the terminals TM to prevent it from coming off the connection terminals Td or to prevent poor connection. Specifically, the separate convex configuration for each driving IC makes it possible to provide an amount of thermal expansion such that even the maximum shifts of the pitches $P_G$ and $P_D$ of the terminals TM are still in accordance with the length of the period of each driving IC. In this example of configuration, there is provided ten convex configurations divided in the longitudinal direction of the multi-layer flexible board, which allows the amount of thermal expansion to be reduced to about one-tenth, also contributes to relaxing application to the terminals TM and makes it possible to improve the reliability of the liquid crystal display module MDL against heat.

As described above, by providing the alignment marks ALMG and ALMD and forming the protruding configuration of the portion FSL into a separate convex configuration for each driving IC, peripheral driving circuits can be made smaller with accuracy and reliability of connection maintained even when the number of connection lines and the number of display data lines are increased.

A description will now be made on conductor layer portions FML having three or more layers.

Chip capacitors CHG and CHD are mounted on the conductor layer portions FML of FPC1 and FPC2. Specifically, a chip capacitor CHG is soldered between the ground potential $V_{ss}$ (0 V) and the power supply $V_{dg}$ (10 V) or between the power supply $V_{sg}$ (5 V) and the power supply $V_{dg}$ on the gate-side multi-layer flexible board FPC1. Further, a chip capacitor CHD is soldered between the ground potential $V_{SS}$ and the power supply $V_{dd}$ (5 V or 3.3 V) or between the ground potential $V_{SS}$ and the power supply $V_{dd}$ on the multi-layer flexible board FPC2 on the drain side B. Those capacitors CHG and CHD are for reducing noises superimposed on the power supply lines.

This example of configuration is designed such that the above-described chip capacitor CHD is soldered only to the surface conductive layer L1 on one side and such that it is entirely located under the substrate SUB1 after the folding. It is therefore possible to mount the capacitors for smoothing power supply noises on the flexible boards FPC1 and FPC2 with the thickness of the liquid crystal display module MDL kept unchanged.

A description will now be made on a method for reducing RF noises generated by an information processing apparatus incorporating the liquid crystal display device.

Since the shield case SHD is on the front side of the liquid crystal display module MDL and on the front side of the information processing apparatus, the generation of EMI (electromagnetic interference) noises at the surface thereof creates a significant problem in the environment in which external devices are used. For this reason, in this example of configuration, the surface layer L1 of the conductor portion FML is coated with the solid or meshed pattern ERH of a DC power supply as much as possible.

Figure 28A:
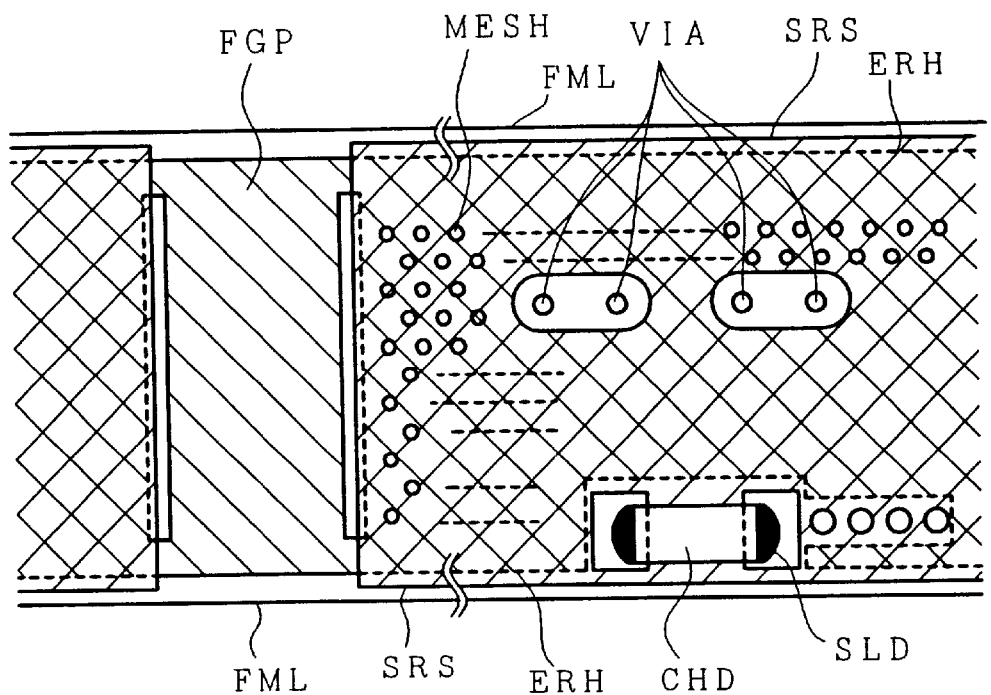
FIG. 28a is a plan view showing a pattern of a conductive layer on the surface of the multi-layer wiring portion FML shown in FIG. 20b.
Figure 28B:
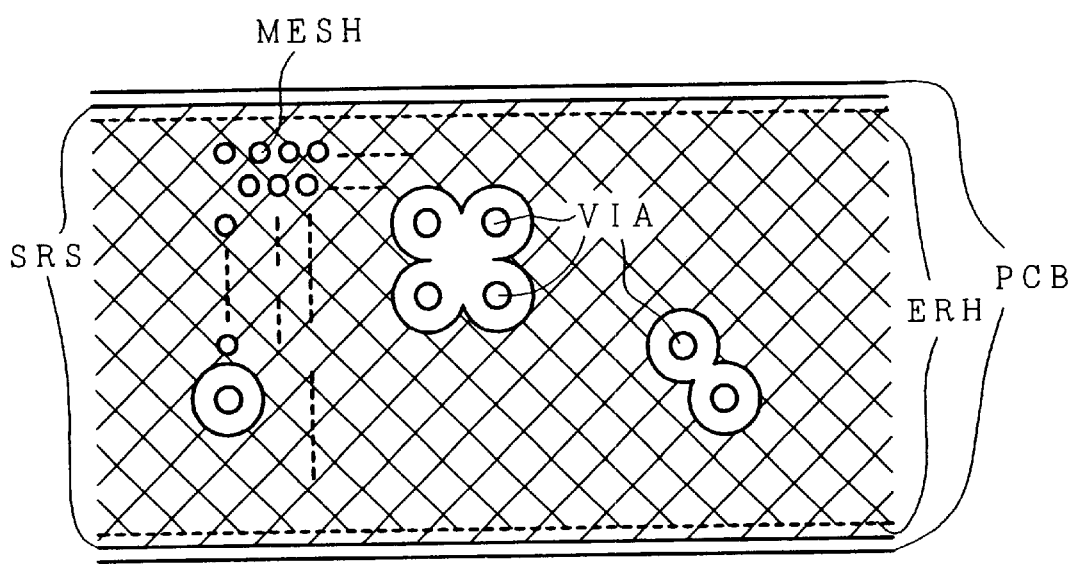
FIG. 28b is a partial enlarged view of the interface circuit board shown in FIG. 30.

FIG. 28 illustrates a conductor pattern of the multi-layer wiring portion; (a) is a plan view showing a configuration of a pattern of a conductive layer on the surface of the multi-layer wiring portion FML in a part of FIG. 20b; and (b) is a partial enlarged view of the interface circuit board PCB shown in FIG. 30(c).

A mesh MESH is formed by a multiplicity of holes of about 300 $\mu$m formed in the surface conductor layer L1, and the meshed pattern ERH substantially covers the entire surface excluding the regions of the through holes VIA and the capacitor CHD component.

<Interface Circuit Board PCB>

FIG. 30 illustrates an interface circuit board having a controller portion and a power supply portion; (a) is a rear (bottom) view; (b) is a partial front side view of a hybrid integrated circuit HI mounted thereon; and (c) is a front (plan) view.

In this example of configuration, a multi-layer printed board made of a glass epoxy material is used as the interface circuit board PCB (hereinafter also simply referred to as board PCB). While a multi-layer flexible board can be also used, a multi-layer printed board which is relatively inexpensive is used because no folded structure is employed in this region.

All electronic components are mounted on the lower side of the board PCB which is the rear side as viewed from the information processing apparatus. One integrated circuit element TCON is provided on said board to be used as a display controller. This integrated circuit element TCON is directly mounted on the circuit board PCB on a ball grid array basis instead of being contained in a package.

An interface connector CT1 is located substantially in the center of the board PCB, and a plurality of resistors, capacitors and circuit components EMI for eliminating RF noises are also mounted.

The hybrid integrated circuit HI is formed by integrating a part of the circuit on a hybrid basis and mounting a plurality of integrated circuits and electronic components for primarily establishing a supply voltage on the upper and lower surfaces of a small circuit board, and one such circuit is mounted on the interface circuit board PCB.

In this configuration, a connector CT3 is used for electrical connection through electrical connection means JN1 between a flexible board FPC1 which is a gate driver board and the interface circuit board PCB.

Figure 32:
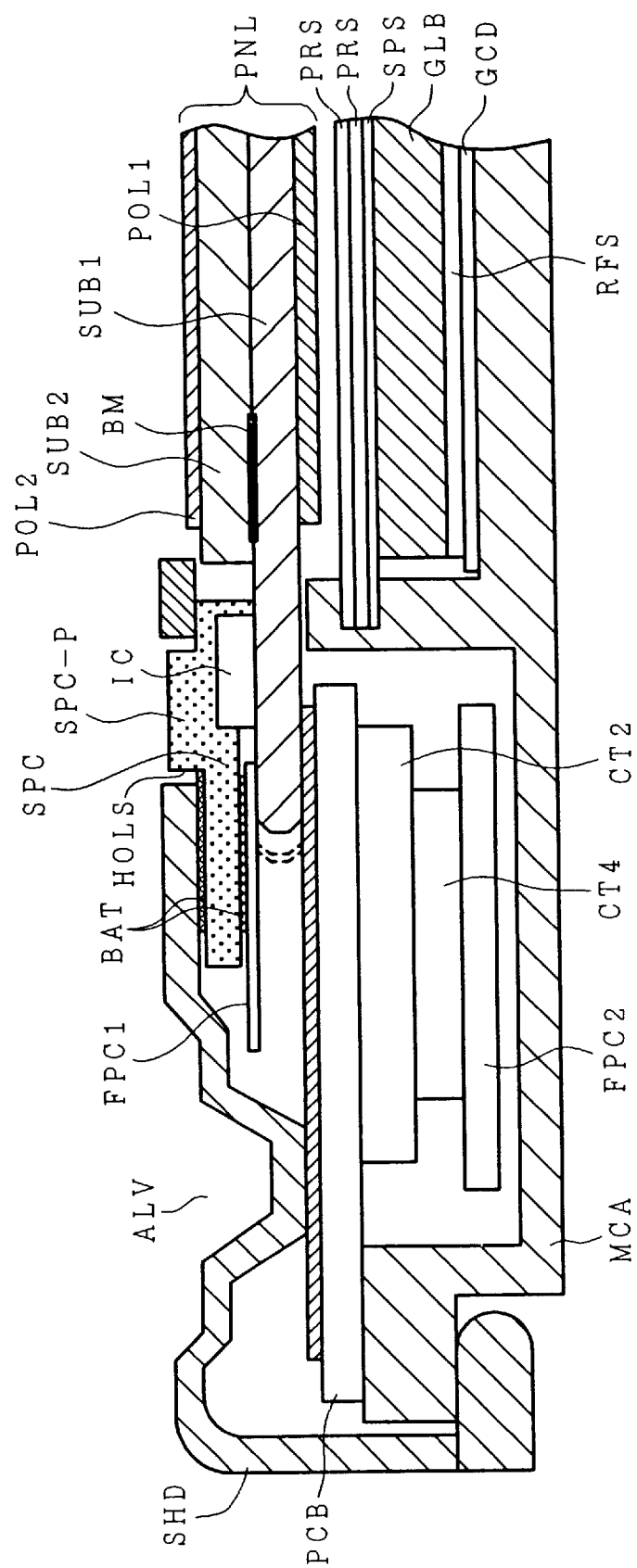
FIG. 32 is a sectional view taken along the line B—B in FIG. 4.
Figure 34:
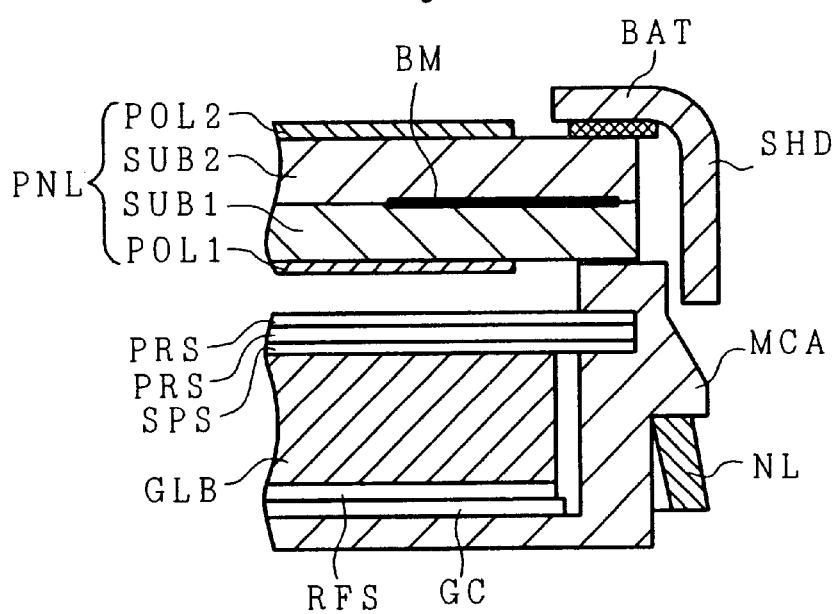
FIG. 34 is a sectional view taken along the line D—D in FIG. 4.

FIG. 31 is a sectional view taken along the line A—A in FIG. 4; FIG. 32 is a sectional view taken along the line B—B in the same; FIG. 33 is a sectional view taken along the line C—C in the same; and FIG. 34 is a sectional view taken along the line D—D in the same.

As shown in FIG. 31, when viewed in the direction perpendicular to the substrates SUB1 and SUB2 forming a part of the liquid crystal display element PNL, the interface circuit board PCB is overlapped with the liquid crystal display element PNL and is provided under the lower side of SUB1. Further, the flexible board FPC1 for gate drivers is in direct electrical and mechanical connection to the substrate SUB1 of the liquid crystal display element PNL at one end thereof and is overlapped with the interface circuit board PCB throughout the width thereof without being folded unlike the drain-side thereof.

By overlapping a part of the interface circuit board PCB with the substrate SUB1 of the liquid crystal display element PNL and further providing the circuit board FPC1 for gate drivers in an overlapping relationship with the, interface circuit board PCB as described above, it is possible to reduce the width and surface area of the frame portion and to reduce the external dimensions of a liquid crystal display element and an information processing apparatus such as a personal computer or word processor incorporating such a liquid crystal display element as a display portion.

The liquid crystal display element PNL and the shield case SHD are fixed together with spacers SPC such as resin provided in the gap between the liquid crystal display element PNL and the substrate SUB1 thereunder and double-sided adhesive tapes BAT interposed above and under the same.

A plurality of holes HOLS are formed in the longitudinal direction of the shield case SHD and are engaged with protrusions SPC2-P formed on said spacers SPC to prevent any shift of the spacers SPC.

<Liquid Crystal Display Element with Driving Circuit Boards ABS>

As shown in FIG. 33, a flexible board FPC2 for drain drivers is folded upon and bonded to the surface of the substrate SUB1 opposite to the surface formed with patterns. Polarizing plates POL1 and POL2 are provided slightly externally (about 1 mm) to an effective display area AR, and the end of FPC) is located at a distance of about 1 2 mm therefrom.

The distance from the end of the substrate SUB1 to the end of the protrusion at the folded portion of FPC2 is as very small as about 1 mm which allows compact packaging. In the present example of configuration, therefore, the distance from the effective display area AR to the end of the protrusion at the folded portion of FPC2 is about 7.5 mm.

Figure 27:
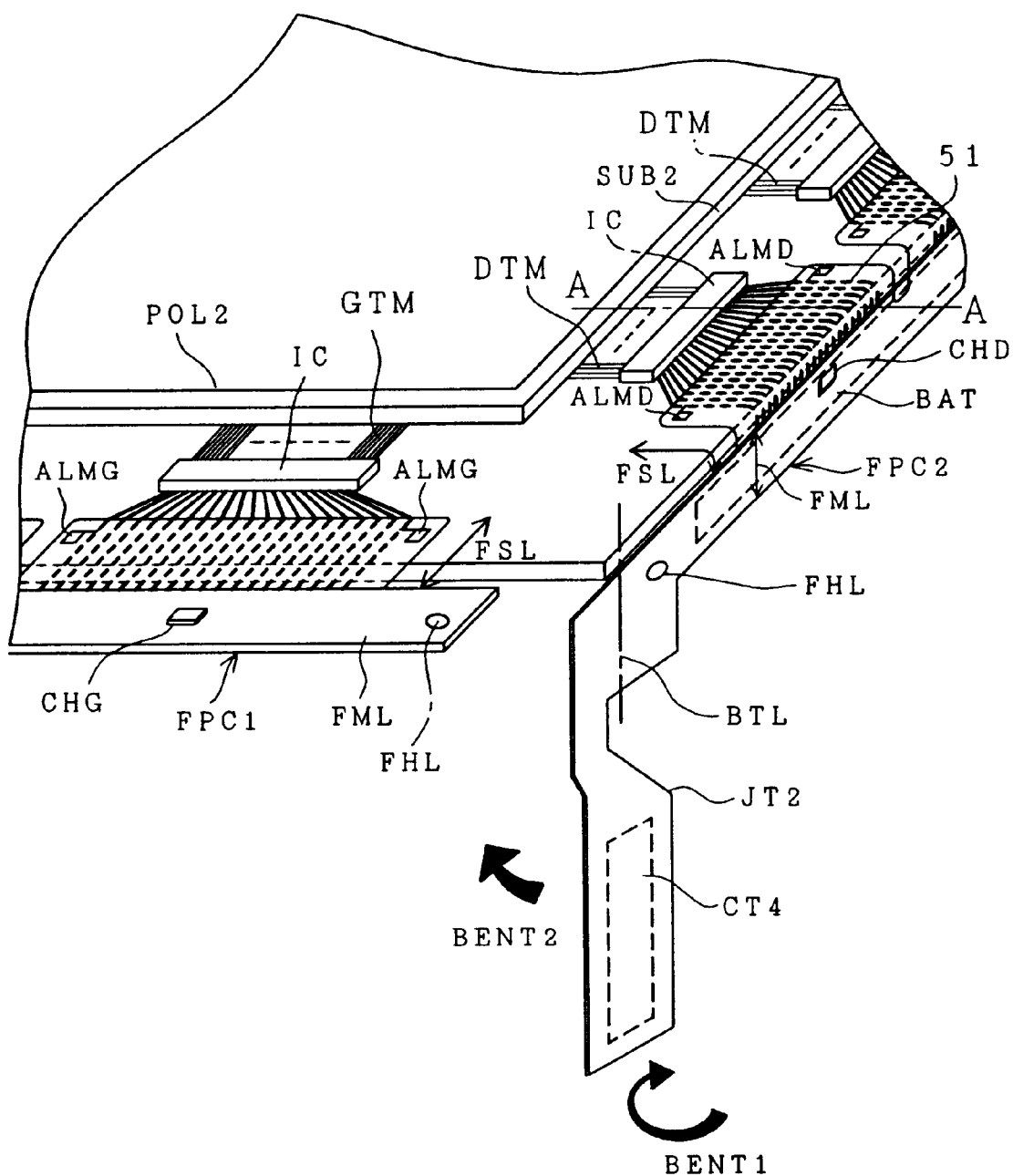
FIG. 27 is a perspective view sowing a method for folding and mounting a multi-layer flexible board and showing a portion thereof connected to another multi-layer flexible board.

FIG. 27 is a perspective view for explaining a method for folding and mounting the multi-layer flexible boards. A flat connector CT4 as a joiner provided at the end of a convex portion JT2 constituted by a flexible board integral with FPC2 is used to connect the flexible board FPC2 for drain drivers and the flexible board FPC1 for gate drivers.

The flat connector CT4 is provided on the front surface of the convex portion JT2 and is coupled to a connector CT2 on the interface board PCB by first bending in a direction BENT1 about a line BTL and then bending in a direction BENT2 (see FIG. 32). FPC2 and the substrate SUB1 are fixed together by interposing a double-sided adhesive tape between said FPC2 and the substrate SUB1.

<Rubber Cushion GC>

As shown in FIG. 3 and FIGS. 31 34 the rubber cushion GC is interposed between the reflecting sheet provided on the lower side of the light guide body GLB and the molded case MCA, and the light guide body GLB and the liquid crystal display element PNL are secured between the shield case SHD and the molded case MCA utilizing elasticity of the same. While the rubber cushion GC is provided around the light guide body GLB, it may be interposed only at the region where the nail NL formed on the shield case SHD is engaged with the molded case MCA An adhesive material or double-sided adhesive tape is applied to at least one side of the rubber cushion GC which is then attached to either the light guide body GLB or molded case MCA to secure the other.

<Back Light BL>

As shown in FIG. 31, the backlight BL is formed by the light guide body GLB, a spreading sheet SPS provided on the upper surface thereof an optical sheet member constituted by a prism sheet PRS, a reflecting sheet RFS provided on the lower surface of the light guide body GLB, a linear light source (cold-cathode fluorescent tube) LP provided along one end face of the light guide body GLB and a light source reflecting plate LS. Each of those members is contained in the recess of the molded case MCA.

The Light source reflecting plate LS is provided above the linear light source LP in the longitudinal direction of the same and is secured to an edge of the light guide body GLB(above the prism sheet PRS) and an edge of the molded case MCA by the double-sided adhesive tape BAT.

In the example of configuration, the reflecting sheet RFS provided on the lower surface of the fight guide body GLB is extended to a position under the linear light source LP, and the extended portion RFS-E is used as a lower light source reflecting plate. However, this lower light source reflecting plate is not essential if the inner surface of the molded case MCA has a property of reflecting light (it is a mirror surface or white surface). While there is no need for providing a reflecting plate on the inner wall of the linear light source LP opposite to the light guide body GLB because the reflection of the light from the linear light source LP is almost blocked by the linear light source and is therefore not used, utilization of light can be increased by providing the inner wall (including the bottom) of the molded case MCA with a light-reflecting property (mirror or white surface) if the gap between the linear light source LP and the reflecting plate LS or the lower surface of the molded case MCA increases.

Figure 13:
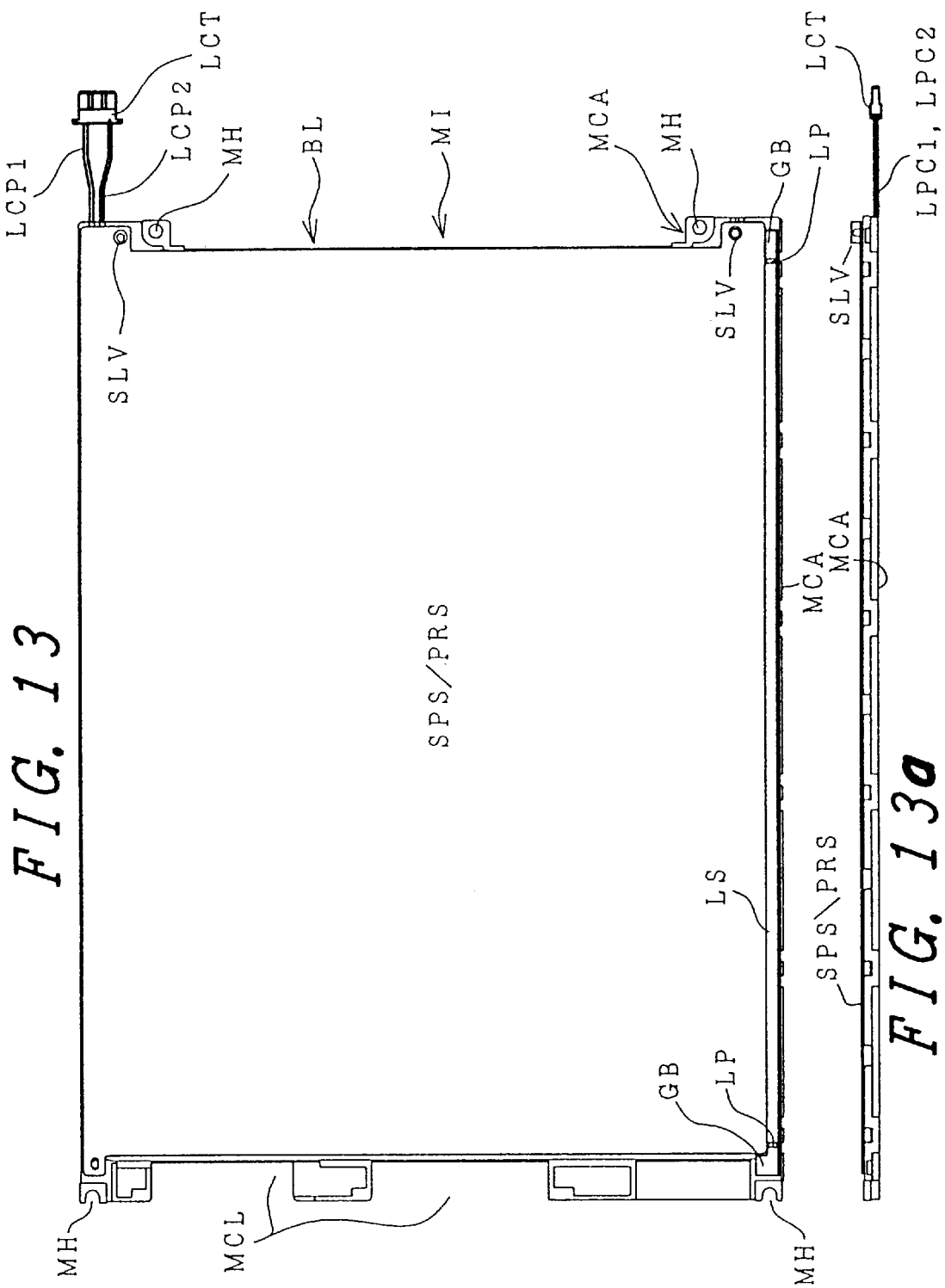
FIG. 13 illustrates the front and the front side of a back light.
Figure 14:
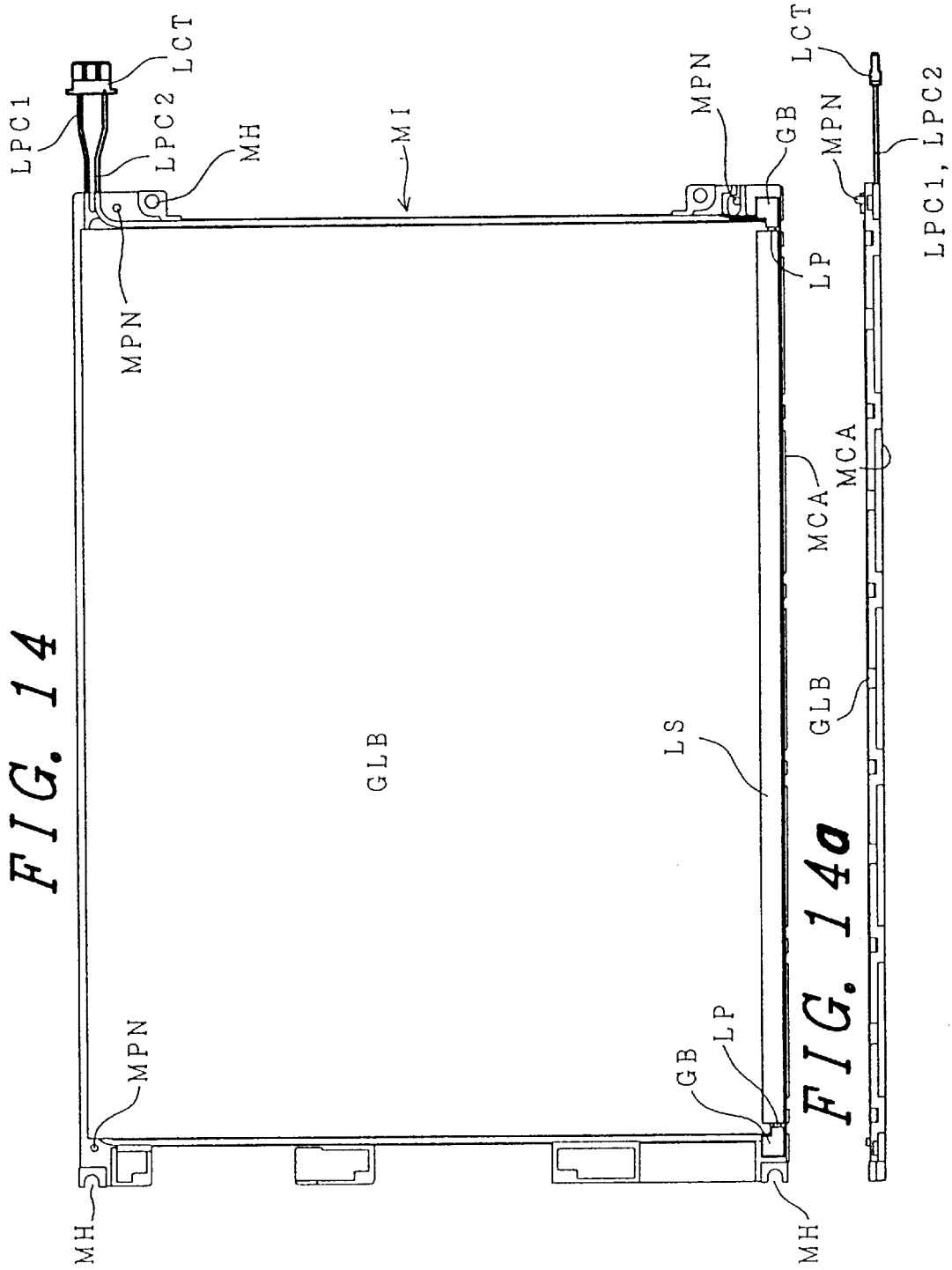
FIG. 14 illustrates the front and front side of the back light in FIG. 13 with a prism sheet and a spreading sheet removed therefrom.
Figure 15:
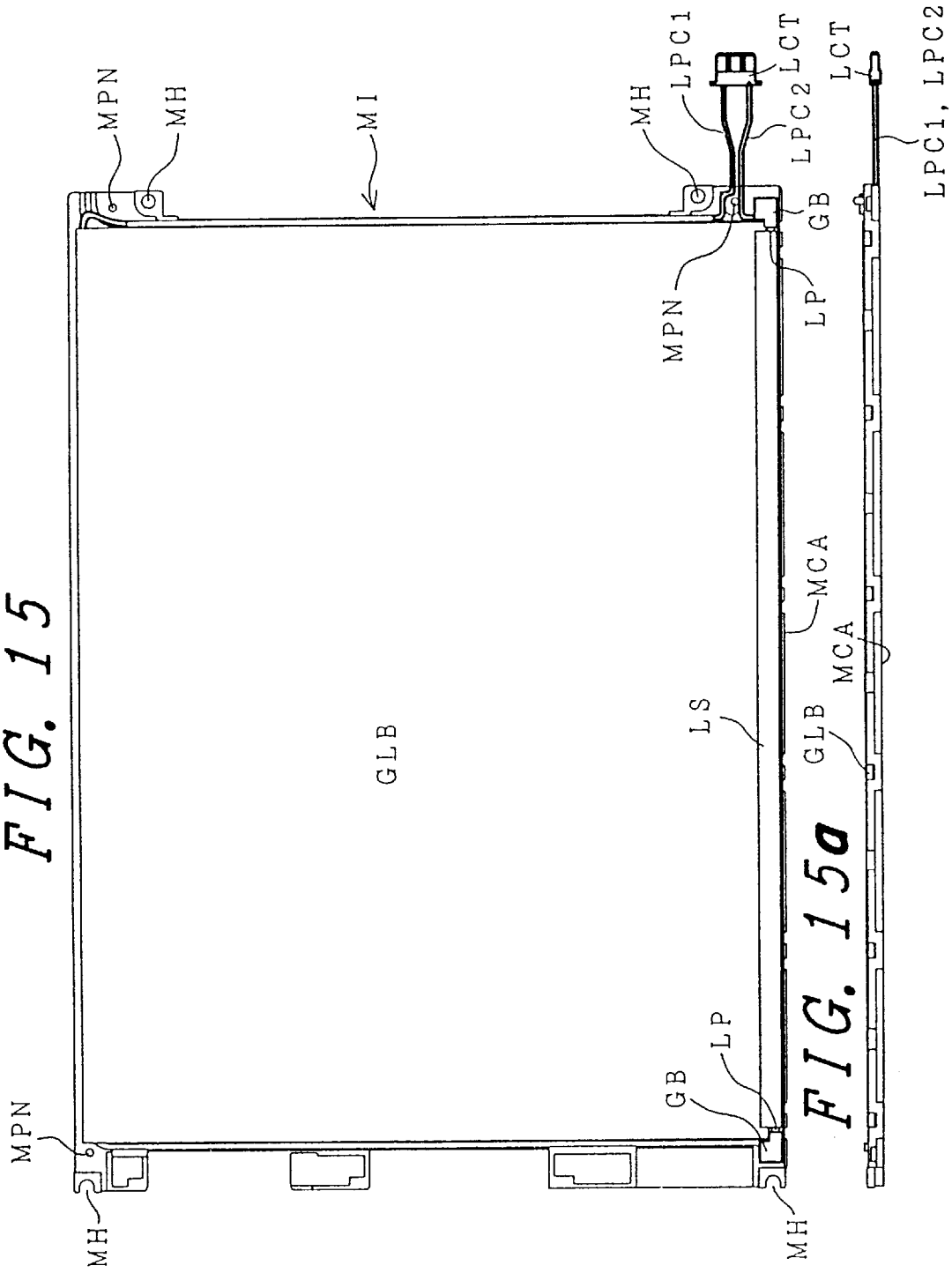
FIG. 15 is illustrations of another example of a configuration of a back light showing the front and front side thereof similar to FIG. 14.

FIG. 13 is a front view of the back light BL (the side toward the liquid crystal display element PNL). FIG. 14 is a front view of the back light in FIG. 13 with the prism sheet PRS and the spreading sheet SRS removed. FIG. 15 is a front view similar to FIG. 14 to show another example of configuration.

Lamp cables LPC (LPC1 and LPC2) of the cold-cathode fluorescent tube which is the linear light source LP are provided on a side of the liquid crystal display element PNL and are supplied with power from an inverter power supply board which is not shown through a lamp connector LCT. GB represents a rubber bush for holding the lamp cable LPC.

<Spreading Sheet SPS>

The spreading sheet SPS is placed on the light guide body GLB and diffuses light emitted from the upper surface of the light guide body GLB to irradiate the liquid crystal display element PNL uniformly.

<Prism Sheet PRS>

In the present example of configuration, the prism sheet PRS is constituted by two sheets which are placed on the spreading sheet SPS, and the prism sheets whose lower surface is a smooth surface and whose upper surface is a prism surface are disposed in an overlapping relationship such that their prism grooves are orthogonal. The prism sheets PRS converge light from the spreading sheet SPS toward the liquid crystal display element PNL to improve the luminance of the back light BL. This makes it possible to reduce the power consumption of the back light and to reduce the size and weight of the liquid crystal display module.

Two small holes SLV for fixing are provided at the end of one side of each of the spreading sheet SPS and the prism sheets PRS in positions which coincide with each other when the sheets are installed; pin-shaped convex portions MPN are formed at the end of one corresponding side of the molded case MCA; and they are inserted and attached to each other through sleeves SLV to achieve positioning. For example, the sleeves SLV are constituted by elastic bodies such as silicon rubber and have an inner diameter smaller than the outer diameter of the convex portions MPN to prevent dislocation.

Figure 17:
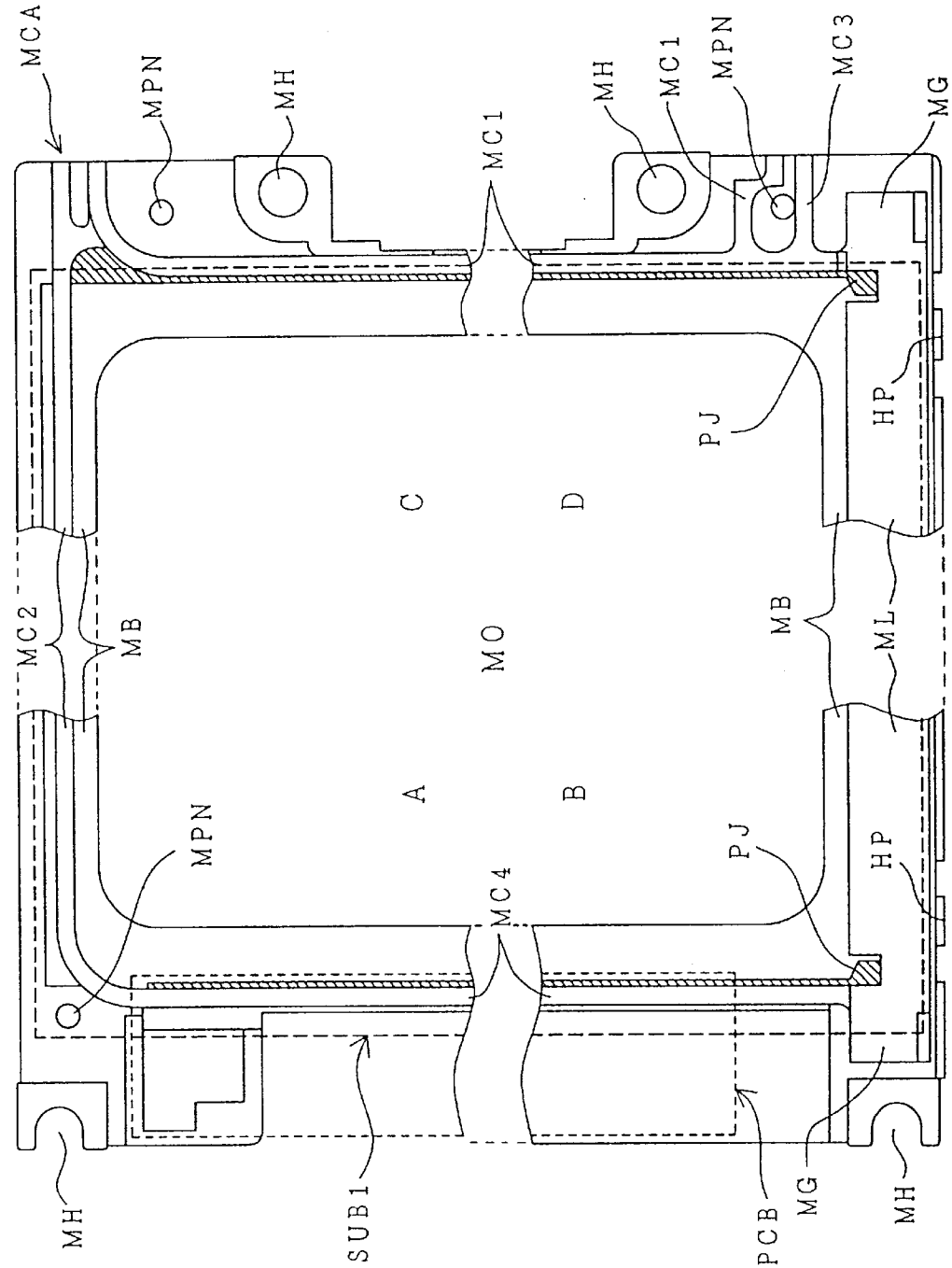
FIG. 17 is an enlarged illustration of a comer portion of the molded ease in FIG. 16.

As shown in FIG. 17, the pin-shaped convex portions MPN provided integrally with the molded case MCA at the end of one side thereof are inserted in the small holes provided on said spreading sheet SPS and prism sheets PRS at the side opposite to the linear light source LP to achieve positioning, which allows more accurate positioning.

The convex portions MPN do not increase the thickness of the liquid crystal display module because they are in positions under the gate-side flexible board FPC1 which are not coplanar with the circuit board PCB.

<Molded Case MCA>

Figure 16:
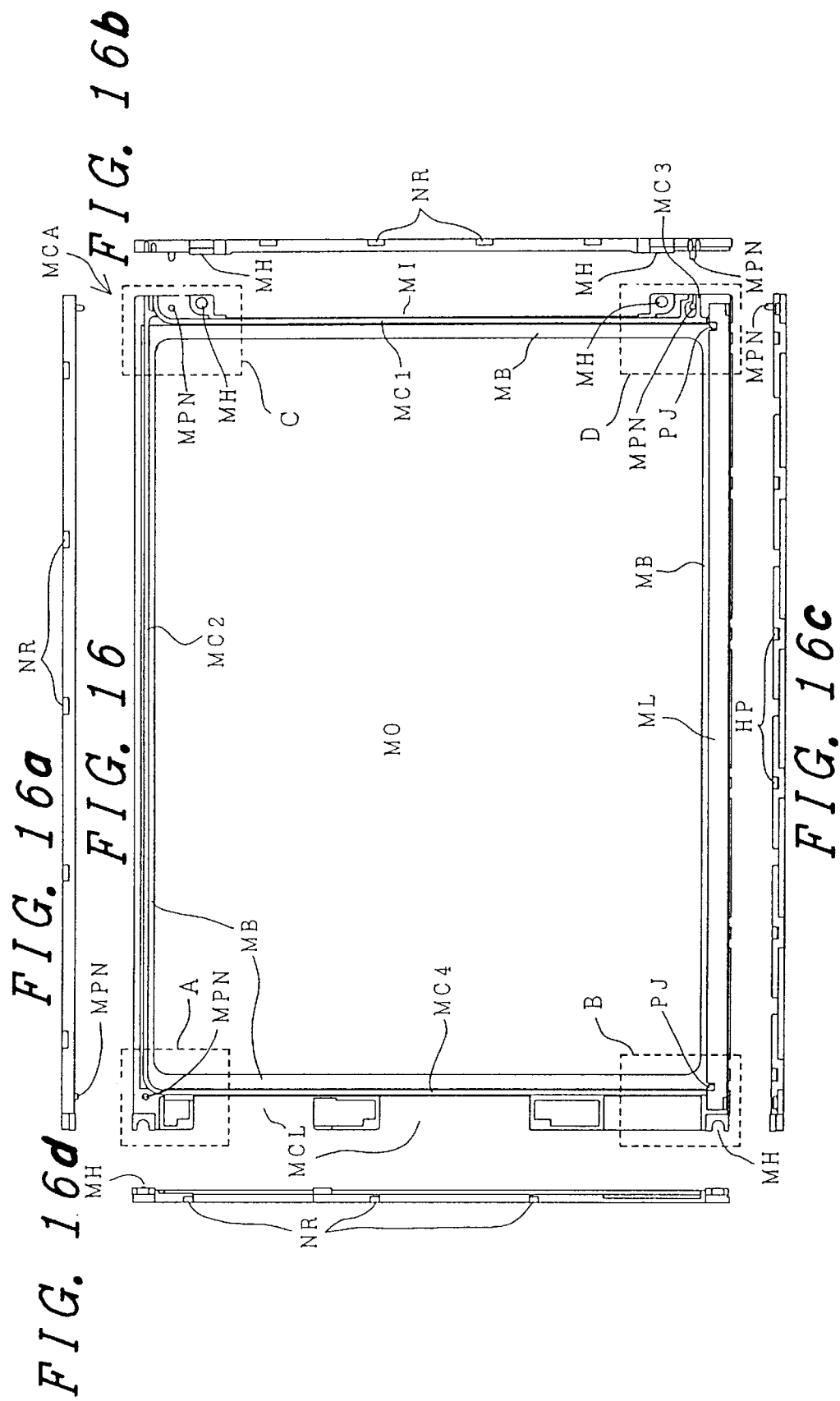
FIG. 16 illustrates a lower case (molded case).
Figure 18A:
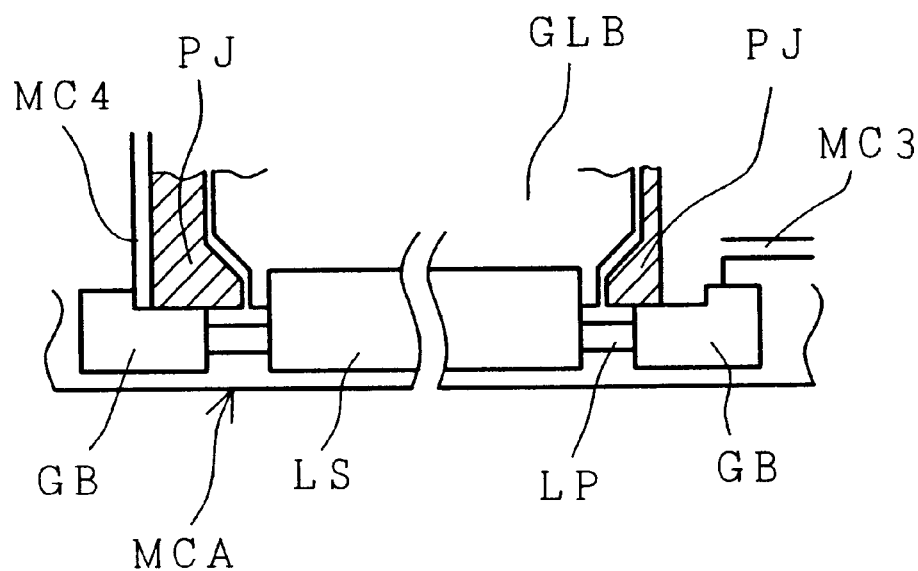
FIG. 18a, FIG. 18b and FIG. 18c illustrates the mounting of a light source reflecting sheet in a container in a molded case MCA of a light guide body GLB.
Figure 18B:
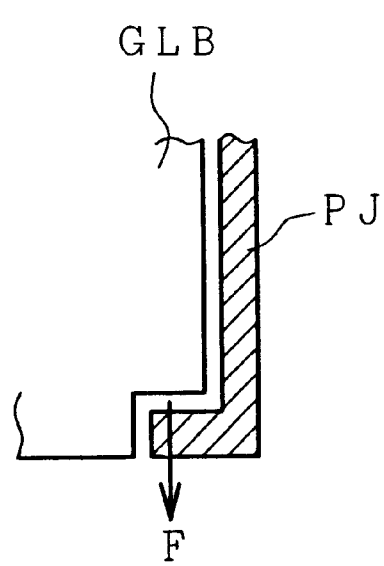

FIG. 18 illustrates the molded case MCA, and FIG. 17 shows enlarged views of the regions A, B, C and D in FIG. 16. The molded case MCA which is a lower case formed using molding is a back light containing case for holding the cold-cathode fluorescent tube LP, lamp cables LPC, light guide body GLB and the like and is fabricated from synthetic resin through integral molding utilizing a single mold.

This molded case MCA is tightly combined with the shield case SHD made of metal by actions of the fixing members and elastic body to improve the anti-vibration properties, anti-shock properties and hence the reliability of the liquid crystal display module MDL.

A large hole MO is formed on the bottom of the molded case MCA in a central region thereof excluding a frame-shaped region at the periphery, the hole occupying one-half or more of the area of said bottom. This prevents the bottom of the molded case MCA from being expanded by a force applied by the action of the rubber cushion GC between the back light BL and the molded case MCA to the bottom of the molded case MCA in the vertical direction from the upper surface to the lower surface thereof after the molded case NCA is assembled. This makes it possible to prevent any increase in the maximum thickness and to make the liquid crystal display module MDL thinner and lighter.

MCL in FIG. 17 represents cut-outs (including a cut-out for connecting the connector CT1) provided on the molded case MCA in positions associated with regions where heated components (such as a power supply circuit and a DC-DC converter DD shown in FIG. 11 and FIG. 30) of the interface circuit board PCB are mounted.

By providing cut-outs for heated portions on the circuit board PCB instead of covering them with the molded case as described above, heat radiating properties of the heated portions of the interface circuit board PCB can be improved. The integrated circuit TCON for display control can be also regarded as a heated component, and the molded case MCA may be cut out above the same.

MH in FIG. 16 represents four mounting holes for mounting the liquid crystal display module MDL to an apparatus such as a personal computer as an application. The shield case SHD is also formed with mounting holes HLD matched with the mounting holes MH of the molded case MCA to be fixed and mounted to an apparatus as an application using screws or the like.

MB in FIGS. 16 and 17 represents a retaining portion of the light guide body GLB, and PJ represents a positioning portion. MC1 4 represent containing portions for the lamp cables LPC1, 2.

<Installation of Light Guide Body GLB in Mold Case MCA>

FIG. 18 illustrates a portion where the light guide body GLB is contained in the molded case MCA; (a) is a plan view of major parts; (b) shows a conventional structure of the comer portion in (a); and (c) is a structure of the comer portion according to the present example of configuration.

As shown in FIG. 18(a), chamfered linear diagonal portions are provided at four comers of the light guide body GLB, and the molded case MCA is also formed with linear diagonal positioning portions PJ in association with the diagonal portions. Since corners have conventionally been at right angles as shown in (b), they are vulnerable to a force F in the direction of a side of the light guide body GLB (y-direction), and the positioning portions PJ can be damaged by vibration or shock applied by the light guide body GLB which is a heavy component.

Figure 18C:
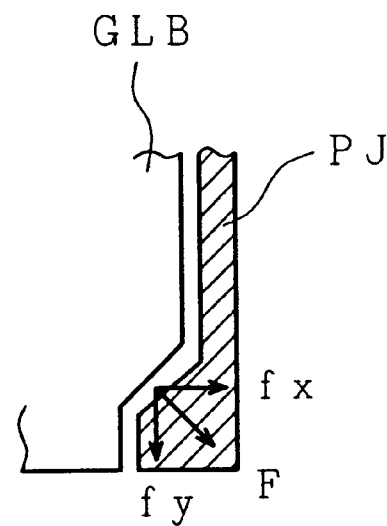

In this example of configuration, since the light guide body GLB and positioning portions PJ have a diagonal configuration as shown in FIG. 18(c), the force applied to the positioning portions PJ is dispersed in two directions fx and fy. This makes it possible to prevent damage to the positioning portions PJ, and reliability is thus improved.

21 Arrangement of Cold-Cathode Fluorescent Tube LP and Light Source Reflecting Plate LS>

As shown in FIG. 18(a), the light source reflecting plate LS bridges the light guide body GLB and the molded case MCA above the linear light source (cold-cathode fluorescent tube) LP and is fixed using a double-sided adhesive tape. A sectional structure of this portion is shown in FIG. 28.

As shown in FIG. 31, the cold-cathode fluorescent tube LP which is a linear light source is provided in the vicinity of one end face of the light guide body GLB, and the light source reflecting plate LS is fixed above the same using a double-sided adhesive tape BAT.

Figure 41:
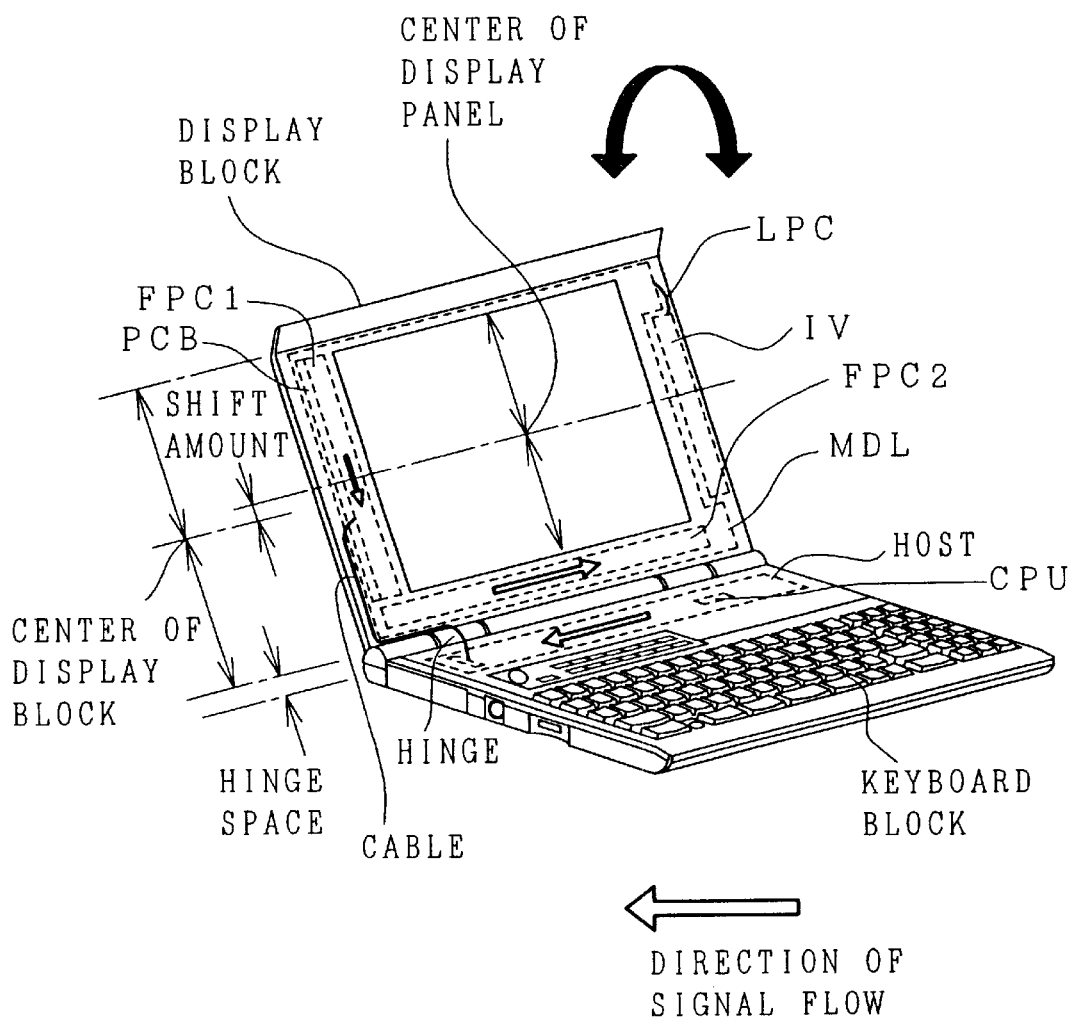
FIG. 41 is a perspective view of a notebook type personal computer or word processor in which a liquid crystal display module is mounted.
Figure 42:
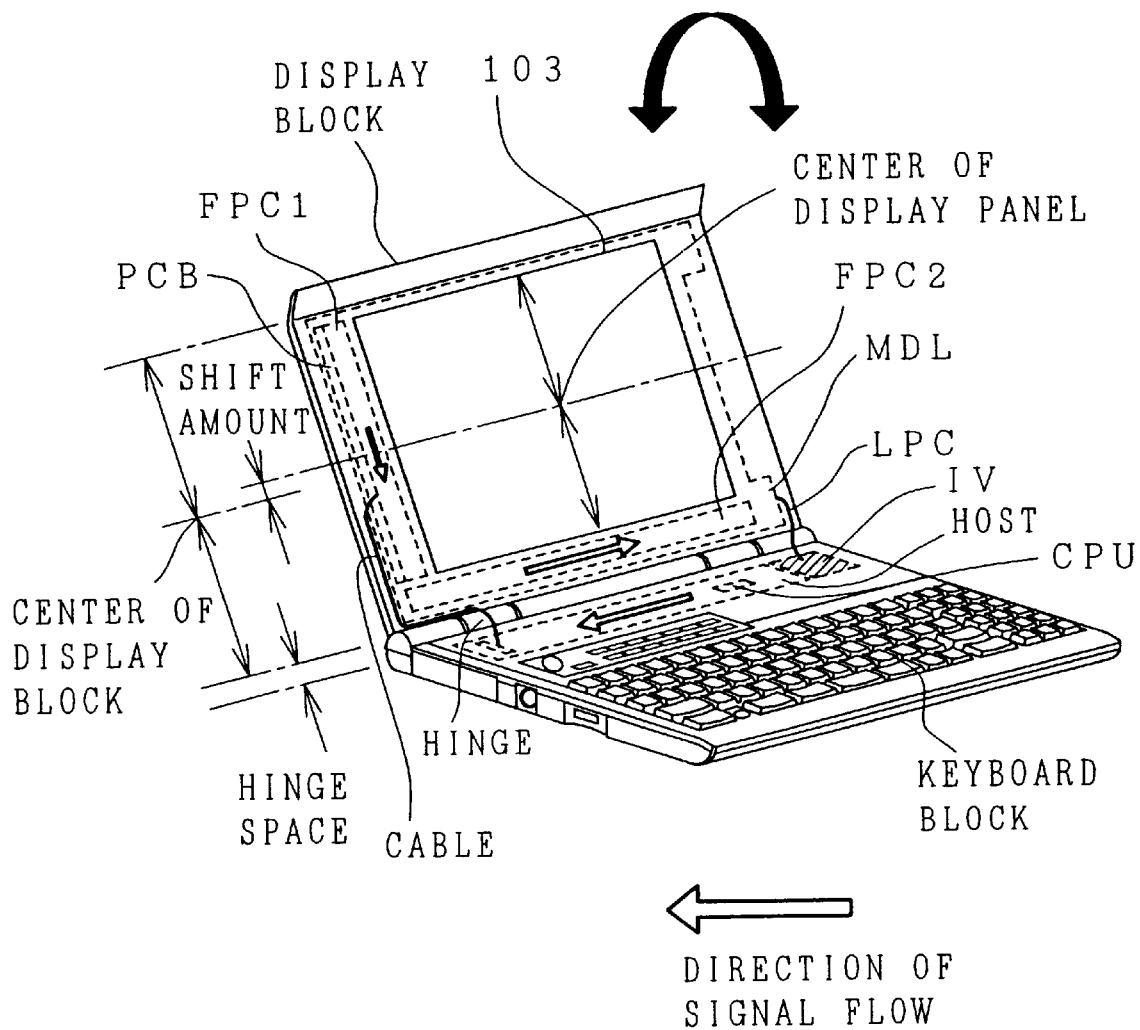
FIG. 42 is a perspective view of another notebook type personal computer or word processor in which a liquid crystal display module is mounted.

In FIGS. 13 15, the cold-cathode fluorescent tube LP forming a part of the back light BL is provided along a long side of the liquid crystal display module MDL and under the display area. Specifically, as shown in FIGS. 41 and 42, the cold-cathode fluorescent tube LP is located under a long side of the display portion when mounted on an information processing apparatus such as a personal computer or word processor. In the example shown in FIGS. 13 and 14 in which an inverter IV is provided in an inverter containing portion MI in a display portion, the lamp cable LPC1 is provided along two sides, i.e., left and upper sides of the liquid crystal display module MDL, and the lamp cable LPC2 is provided along one side, i.e., the right side. In the example shown in FIG. 15 in which the inverter IV is provided in a keyboard, the, lamp cable LPC1 is provided along three sides, i.e., left, upper and right sides of the liquid crystal display module MDL, and both of the lamp cables LPC1 and LPC2 come out from a lower right portion.

By providing the cold-cathode fluorescent tube LP under the display portion of the liquid crystal display module MDL, even when the inverter IV is provided in the keyboard portion as shown in FIG. 42, it is possible to reduce the length of the lamp cable LPC2 at the high voltage side of the cold-cathode fluorescent tube LP. This makes it possible to reduce impedance which can cause noises and changes in waveforms and to improve the activation characteristics of the cold-cathode fluorescent tube LP. When the inverter IV is provided at the keyboard, the width of the display portion can be further reduced. In addition, by providing the cold-cathode fluorescent tube LP under the display portion, reliability is improved because shock caused by opening or closing said display portion is mitigated. Furthermore, since the center of the display surface of the liquid crystal display element PNL is shifted upward, there is an advantage in that the view of a lower part of the display screen is not obscured by the hand of a user hitting the keyboard.

While the cold-cathode fluorescent tube LP is provided under a long side of the liquid crystal display element PNL in the above-described configuration, it can obviously be provided above a long side or along a short side.

FIG. 35 is a block diagram for explaining a circuit configuration of a liquid crystal display element PNL and driving circuits and the like disposed on the periphery thereof. In this configuration, a drain driver portion 103 is provided only below a thin film transistor (TFT) type liquid crystal display element PNL (TFT-LCD), and a gate driver portion 104, a controller portion 101 and a power supply portion 102 are provided on a side of the liquid crystal display element in accordance with the XGA specification formed by 800×600 pixels.

The drain driver portion 103 is mounted by folding the multi-layer flexible board described above. The interface board PCB having the controller portion 101 and power supply portion 102 mounted thereon is provided on the rear side of the gate driver portion 104 provided at the periphery on a short side of the liquid crystal display element PNL. The reason is that the limited horizontal width of the information processing apparatus required the width of the liquid crystal display module MDL forming a part of the display portion to be reduced as much as possible.

Figure 36:
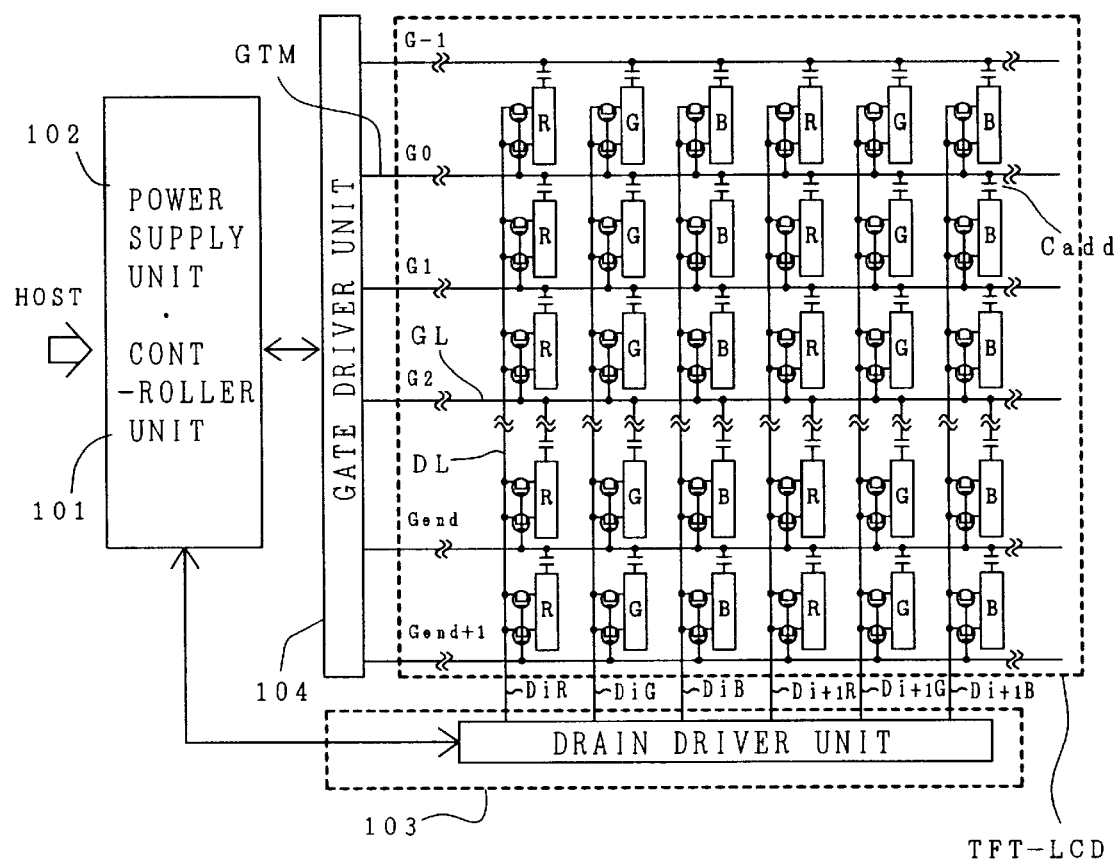
FIG. 36 is a block diagram showing an equivalent circuit of the liquid crystal display module.

As shown FIG. 36, the thin film transistors TFT are provided at intersections between two adjoining drain signal lines DL and two adjoining gate signal lines GL. The drain electrode and a gate electrode of a thin film transistor TFT are connected to a drain signal line DL and a gate signal line GL, respectively.

The source electrode of a thin film transistor TFT is connected to a pixel electrode, and a liquid crystal layer is provided between the pixel electrode and a common electrode. Therefore, a liquid crystal capacity ($C_{LC}$) is equivalently connected between the source electrodes of the thin film transistors TFT. A thin film transistors TFT conducts when a positive bias voltage is applied to the gate electrode and becomes non-conductive when a negative bias voltage is applied. A holding capacity $C_{add}$ is connected between the source electrode of a thin film transistor TFT and a gate signal line of the previous line.

In principle, a source electrode and a drain electrode are determined by a bias polarity between them, and the polarity is inverted during the operation of this liquid crystal display device. It is therefore understood that the source and drain electrodes are switched during the operation. However, the following description will proceed on an assumption that source and drain electrodes are fixed.

Figure 39:
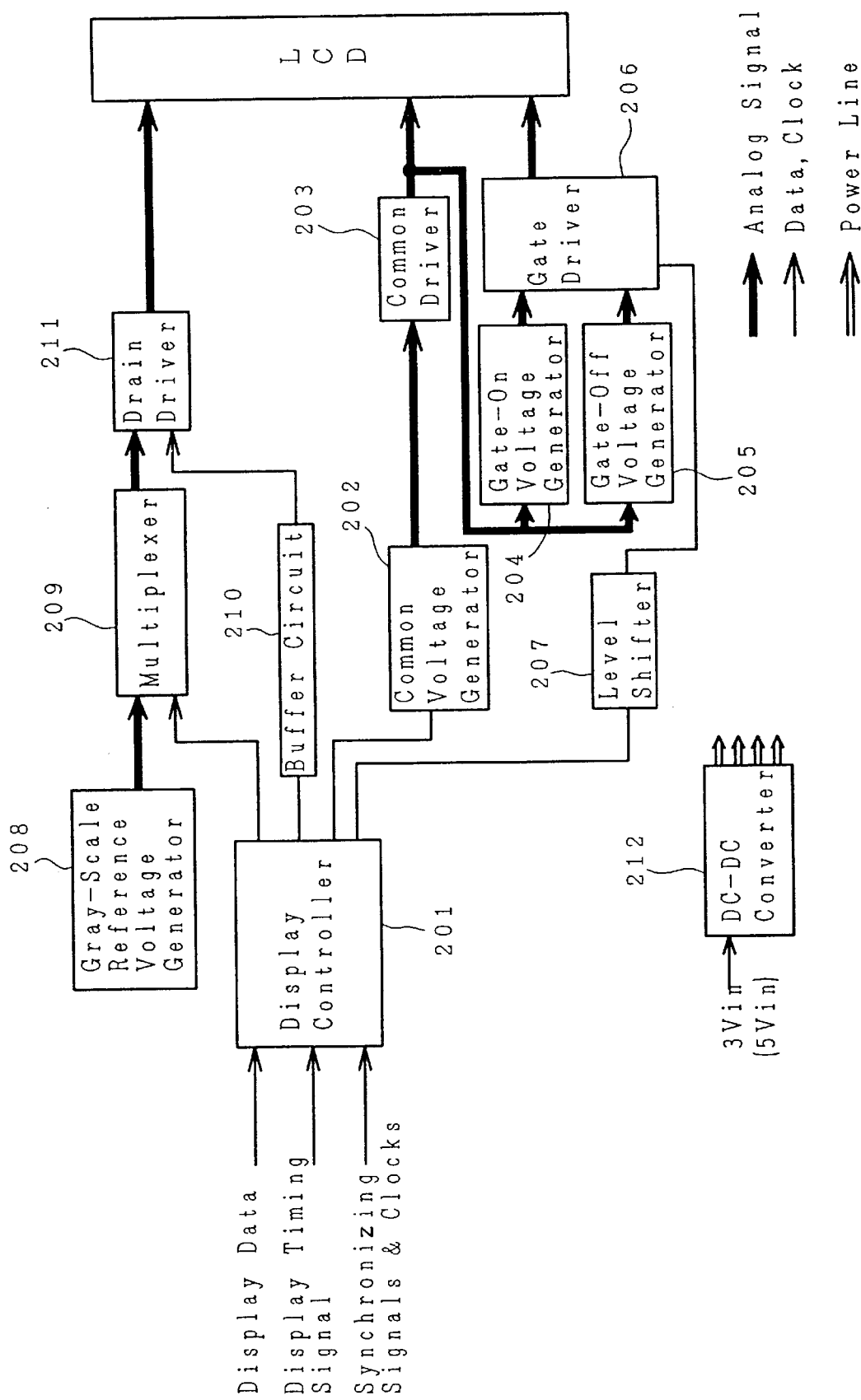
FIG. 39 is a block diagram showing a schematic configuration of each of drivers (drain drivers, gate drivers and common drivers) of the liquid crystal display element and the flow of signals.

FIG. 39 is a block diagram showing a schematic configuration of each of drivers (drain drivers, gate drivers and common drivers) of the liquid crystal display element and the flow of signals. A display control element 201 and a buffer circuit 210 are provided in the controller portion 101 shown in FIG. 35; a drain driver 211 is provided in the drain driver portion 103 shown in FIG. 35; and a gate driver 206 is provided in the gate driver portion 104 in FIG. 35.

The drain driver 211 is formed by a data latch portion for display data and an output voltage generation circuit. Further, a tone reference voltage generating portion 208, a multiplexer 209, a common voltage generating portion 202, a common driver 203, a level shift circuit 207, a gate-on voltage generating portion 204, a gate-off voltage generating portion 205 and a DC-DC converter 212 are provided in the power supply portion 102 shown in FIG. 31.

Figure 38:
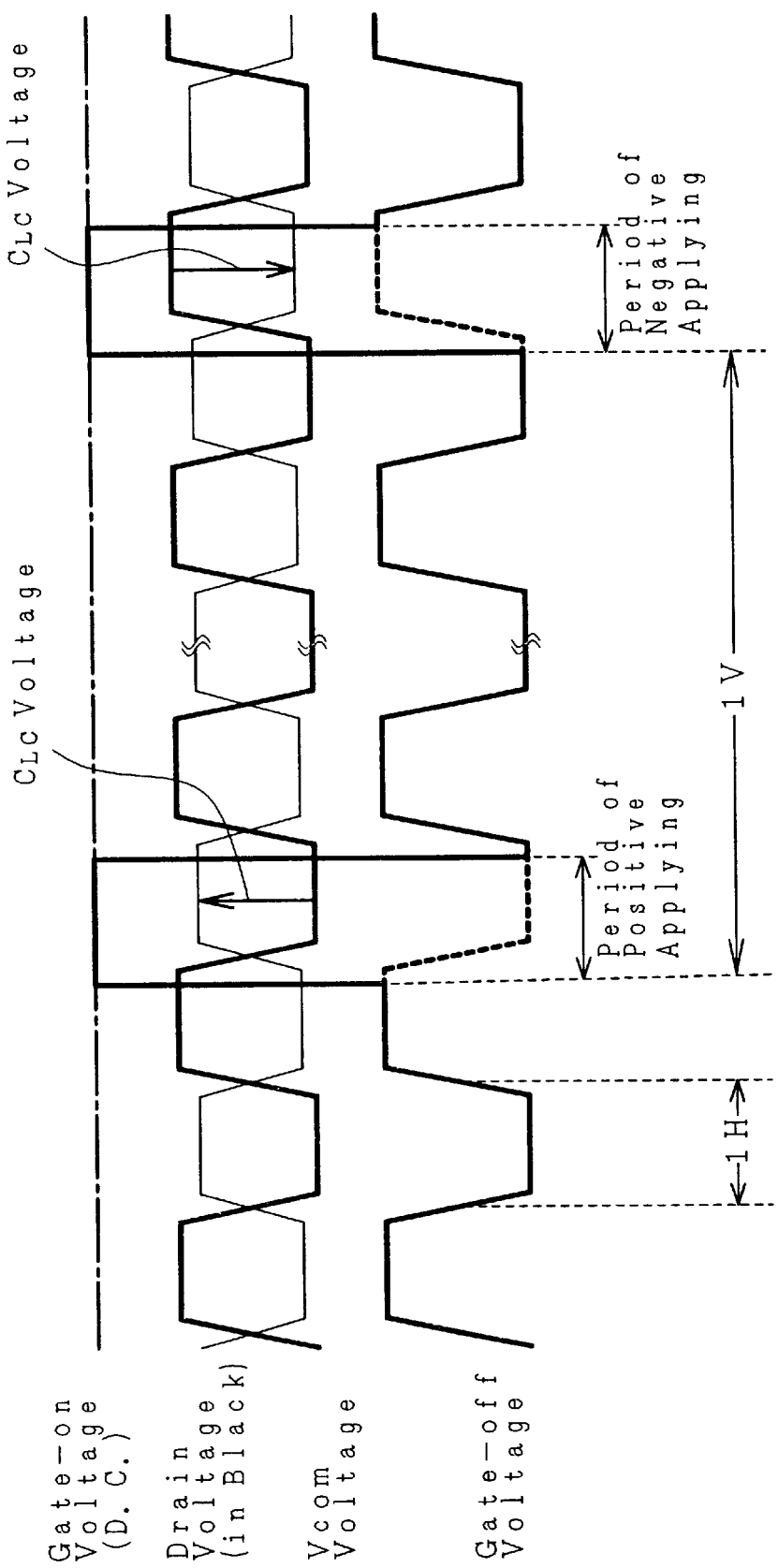
FIG. 38 shows the levels of a common voltage, a drain voltage and a gate voltage and waveforms of the same.

FIG. 38 shows the levels of a common voltage, a drain voltage and a gate voltage and waveforms of the same, and the drain waveform is a waveform during black display.

FIG. 39 illustrates the flow of display data and clock signals to the gate driver 206 and drain driver 211. FIG. 40 is a timing chart showing display data input from a main computer (host) to the display controller 201 and signals output from the display controller 201 to drain drivers and gate drivers.

The display controller 201 receives control signals from the main computer (a clock signal, a display timing signal and a synchronizing signal), generates a clock D1 (CL1), a shift clock D2 (CL2) and display data as control signals to the drain driver 211 and simultaneously generates a frame start indication signal FLM, a clock G (CL3) and display data as control signals to the gate driver 206.

A carry output from the stage preceding a drain driver 211 becomes a carry input to the succeeding drain driver 211 as it is.

As apparent from FIG. 41, the clock signal D2 (CL2) for shifting the drain drivers has the same frequency as that of a clock signal (DCLK) input from the main computer and the display data which is as high as about 40 MHz in the case of an XGA display element, in which case countermeasures against EMI are important.

<Information Processing Apparatus having Liquid Crystal Display Module MDL Mounted Thereon>

FIGS. 41 and 42 are perspective views of a notebook type personal computer or a word processor having the liquid crystal display module MDL mounted thereon. As previously described, FIG. 41 shows a case in which an inverter IV is provided in an inverter containing portion MI of the display portion, i.e., the liquid crystal display module MDL (see FIGS. 13 and 16) and FIG. 42 shows a case in which it is provided in a keyboard portion.

A signal from the information processing apparatus is first propagated from a connector located substantially in the center of an interface board PCB on the left-hand side to a display control integrated circuit element TCON to be converted into display data which in turn flows to peripheral circuits for drain drivers. Thus, by using the COG system and multi-layer flexible boards, the limitation placed on the horizontal width and outline of an information processing apparatus can be eliminated to provide a compact information processing apparatus having less power consumption.

<Planar and Sectional Configuration in the Vicinity of Driving IC Chip Mounting Portion>

Figure 24:
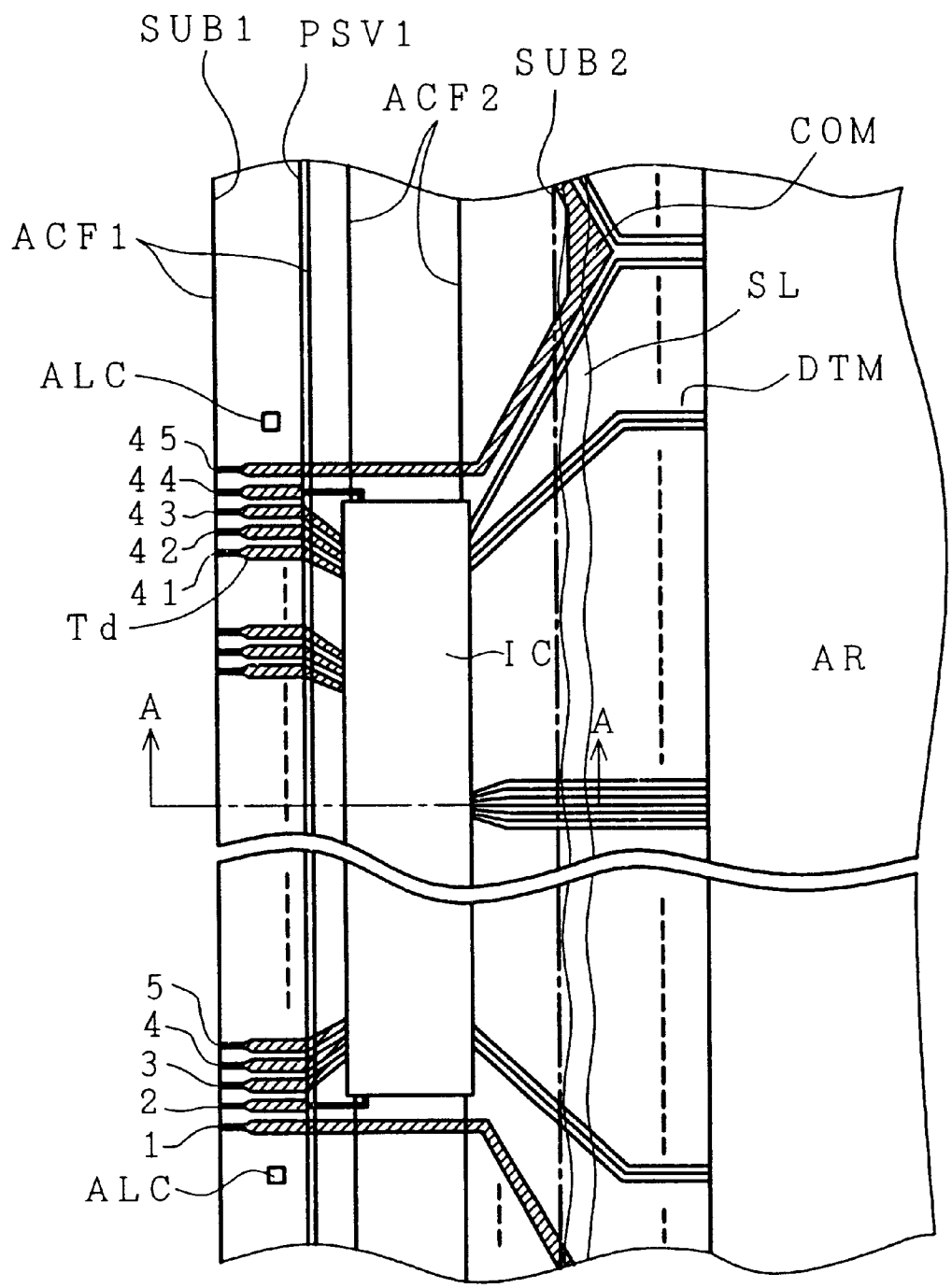
FIG. 24 illustrates a state in which the driving IC is mounted on the lower substrate of the liquid crystal display element.

FIG. 24 is an enlarged view of major parts illustrating a state in which a driving IC is mounted on a lower substrate SUB1 of a liquid crystal display element PNL. FIG. 25 is a plan view of major parts around the region of the lower substrate SUB1 of the liquid crystal display element where a drain-driving IC is mounted and around a cutting line CT1 through said substrate. FIG. 26 shows sectional views taken along the line A—A, the line B—B and the line C—C in FIG. 20. In FIG. 24, an upper substrate SUB2 indicated by alternate long and short dash lines is located above the lower substrate SUB1 in an overlapping relationship therewith, and liquid crystal LC including an effective display area AR is encapsulated using a seal pattern SL.

An electrode COM on the substrate SUB1 is wiring which is electrically connected to a common electrode pattern on the substrate SUB2 through conductive beads or silver paste. Wiring DTM (or GTM) supplies output signals from driving ICs to wiring in the effective display portion AR. Input wiring Td supplies input signals to the driving ICs. An anisotropic conductive film ACF is formed by separately applying an elongate ACF2 which is common to the region of a plurality of driving ICs arranged in a row and an elongate ACF1 which is common to the region of input wiring patterns to said plurality of driving ICs.

Figure 29:
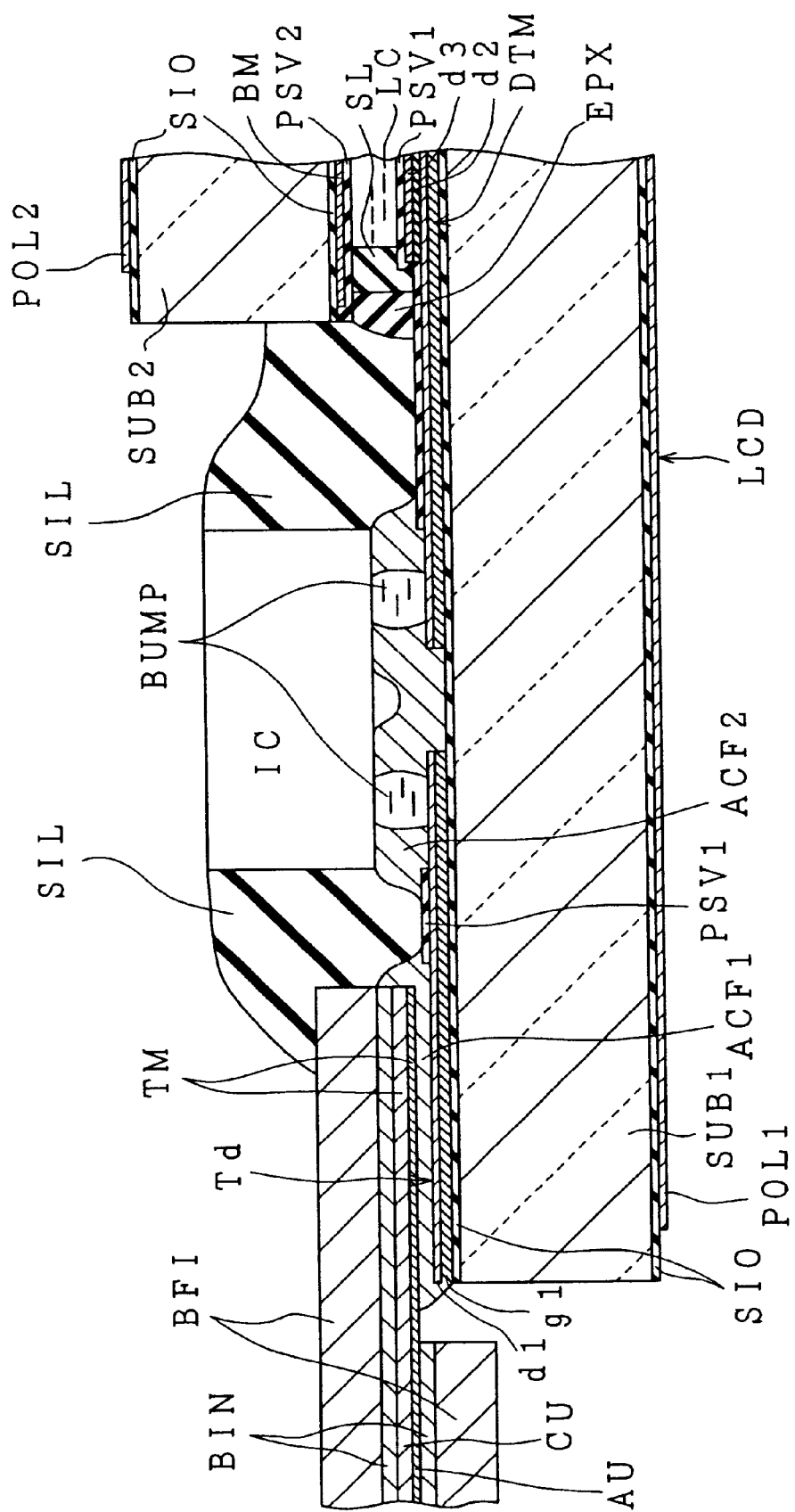
FIG. 29 is a sectional view taken along the line A—A in FIG. 24.
Figures 30A, 30B, 30C:
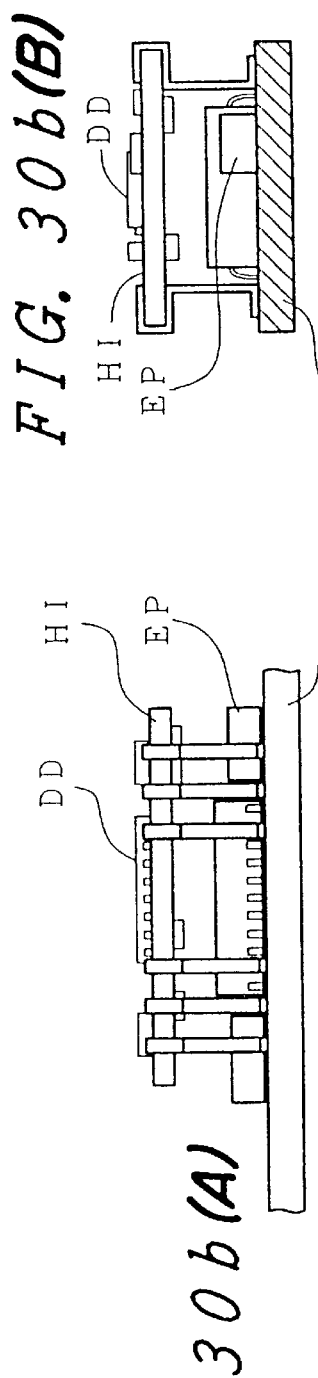
FIG. 30a is a rear view of an interface circuit board PCB.
FIG. 30b is side views of a hybrid integrated circuit HI in the frontal and lateral directions thereof.
FIG. 30c is a front view of an interface circuit board PCB.

Passivation films (protective films) PSV1 and PSV2 which are also shown in FIG. 29 cover wiring regions as much as possible to prevent electrolytic corrosion, and exposed regions are covered by an anisotropic conductive film ACF1.

Further, epoxy resin or silicon resin SIL is filled around the sides of the driving ICs (see FIG. 29) to provide multiple protection.

Referring to FIG. 38, a gate-on level waveform (DC) and a gate-off level waveform vary between 9 V and 14 V, and the gate is turned on at 10 V. The levels of a drain waveform (during black display) and the waveform of a common voltage $V_{com}$ vary between about 0 V and about 3 V. For example, since the drain waveform at the black level is varied at each horizontal period (1H), a logical process circuit performs logical inversion bit by bit and inputs the result to the drain drivers. The gate-off level waveform operates with substantially the same amplitude and phase as those of the common voltage $V_{com}$.

Figure 37:
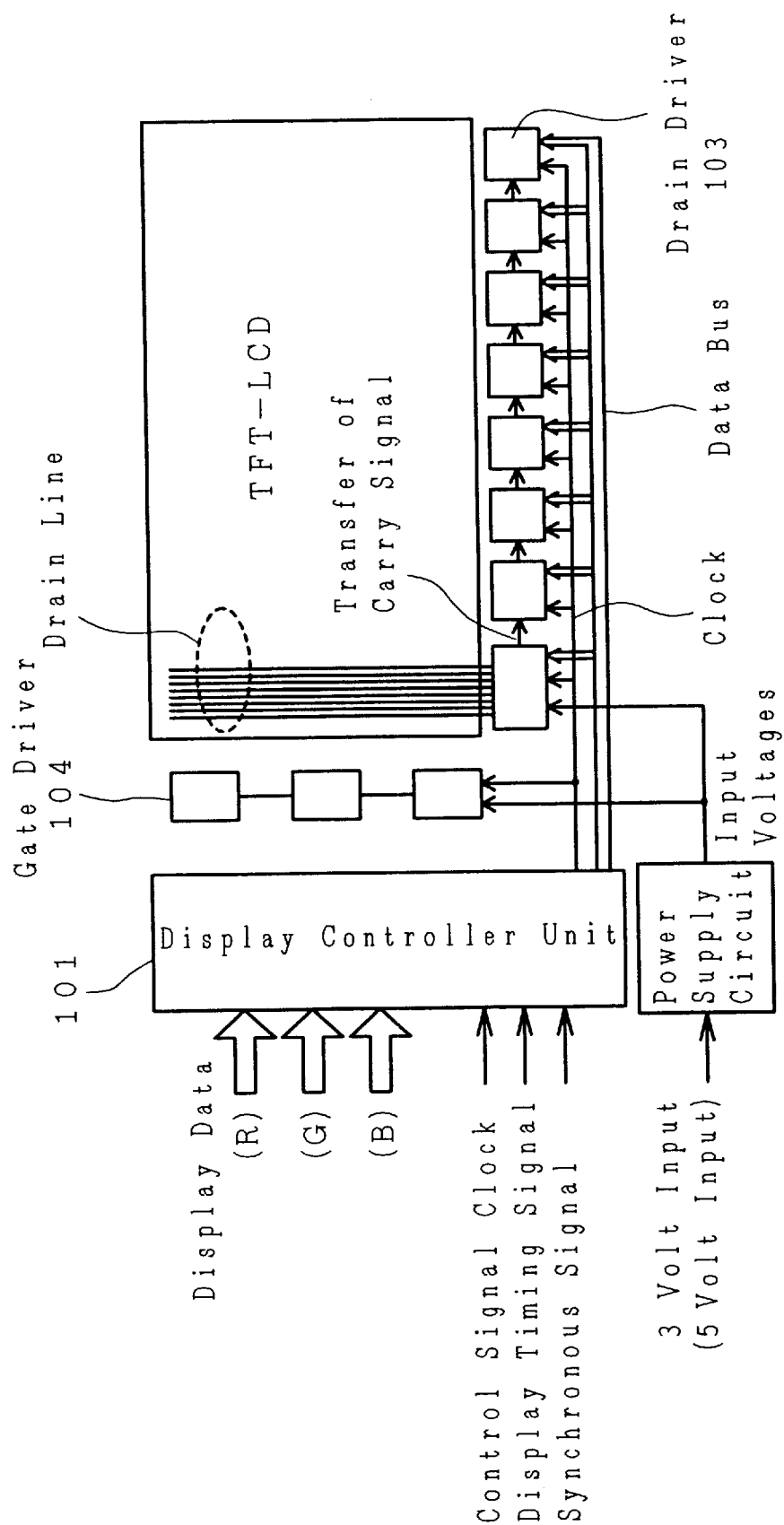
FIG. 37 illustrates the flow of display data and a clock signal to gate drivers and drain drivers.

FIG. 37 illustrates the flow of display data and clock signals to the gate driver 104 and drain driver 103. As previously described, the display controller 101 receives control signals from the main computer (a clock signal, a display timing signal and a synchronizing signal), generates a clock D1 (CL1), a shift clock D2 (CL2) and display data as control signals to the drain driver 103 and simultaneously generates a frame start indication signal FLM, a clock G (CL3) and display data as control signals to the gate driver 104.

A carry output from the stage preceding a drain driver 103 is given to a carry input to the succeeding drain driver 103 as it is.

While the present invention has been specifically described based on embodiments of the same, the present invention is not limited to the above-described embodiments and may obviously modified in various ways without departing from the principle behind the same. For example, although the above embodiments have been described as applications of the present invention to passive matrix type liquid crystal display devices, the invention may be equally applied to liquid crystal display devices of the passive matrix type and other types and may be equally applied not only to flip-chip system wherein driving ICs are directly mounted on a substrate but also to conventional systems utilizing TCP.

As described above, the present invention makes it possible to provide a liquid crystal display device in which the angle of inclination of extraction lines DTM of drain wiring having a high wiring density can be moderated as a whole and in which a normal wiring portion DTMP does not need to be expanded and the frame area can be made small.

What is claimed is:

1. A liquid crystal display device comprising:
    a generally rectangular liquid crystal display panel formed by sandwiching a liquid crystal layer between a first substrate having active elements formed thereon and a second substrate having a common electrode formed thereon;
    an interface circuit board provided along one of the short sides of said liquid crystal display panel;
    a flexible board connected to said interface circuit board at one end thereof and provided at least along one long side of said first substrate for supplying a driving signal voltage for display to said active elements;
    and a driving IC chip mounted such that it is connected to extraction lines of said active elements at output terminals thereof and to a conductor layer portion of said flexible board at input terminals thereof; wherein
    the center of the extraction lines of said active elements driven by said driving IC chip in the direction of the arrangement thereof is matched with the center of said driving IC chip in the direction parallel with the direction of the arrangement of the extraction lines of said active elements, and the center of the conductive layer portion of said flexible board connected to the input terminals of said driving IC chip in the direction parallel with the direction of the arrangement of the extraction lines of said active elements is offset from the center of said driving IC chip toward said interface circuit board.

2. A liquid crystal display device according to claim 1, characterized in that said driving IC chip is mounted on said flexible board at a position furthest from said interface circuit board.

3. A liquid crystal display device according to claim 2, characterized in that a common electrode wiring for supplying power to said common electrode is provided on said long side of said first substrate and is further from said interface circuit board than said driving IC chip.

4. A liquid crystal display device according to claim 2, characterized in that an alignment mark for defining the position of said liquid crystal display panel during assembly is provided on said long side of said first substrate and is further from said interface circuit board than said driving IC chip.

5. A liquid crystal display device comprising:
    a first substrate having a matrix of drain signal lines and gate signal lines, and a plurality of thin film transistors, each provided at respective intersections between two adjoining drain signal lines and two adjoining gate signal lines, a drain electrode and a gate electrode of each thin film transistor being connected to a drain signal line and a gate signal line, respectively, and a source electrode of said thin film transistor is connected to a pixel electrode;
    a second substrate having a common electrode formed thereon;
    a liquid crystal layer provided between said pixel electrode and said common electrode;
    an interface circuit board provided along first sides of said first substrate which having a plurality of gate terminals connected to said gate signal lines;
    a flexible board connected to said interface circuit board at one end thereof and provided at least along a second side of said first substrate for supplying a driving signal voltage for display to said drain signal lines;
    and a driving IC chip mounted such that it is connected to extraction lines of said drain signal lines at output terminals thereof and to a conductor layer portion of said flexible board at input terminals thereof; wherein
    a center of the extraction lines of said drain signal lines driven by said driving IC chip in the direction of the arrangement thereof is matched with the center of said driving IC chip in the direction parallel with the direction of the arrangement of the extraction lines of said drain signal lines, and the center of the conductive layer portion of said flexible board connected to the input terminals of said driving IC chip in the direction parallel with the direction of the arrangement of the extraction lines of said drain signal lines is offset from the center of said driving IC chip toward said interface circuit board.

6. A liquid crystal display device according to claim 5, characterized in that said driving IC chip is mounted on said first substrate at a position furthest from said interface circuit board.

7. A liquid crystal display device according to claim 6, characterized in that a common electrode wiring for supplying power to said common electrode is provided on said second side of said first substrate and is further from said interface circuit board than said driving IC chip.

8. A liquid crystal display device according to claim 6, characterized in that an alignment mark for defining the position of said first substrate during assembly is provided on said second side of said first substrate and is further from said interface circuit board than said driving IC chip.

9. A liquid crystal display device comprising:
- a liquid crystal display panel having a plurality of first signal lines and a plurality of second signal lines, said first signal lines and second signal being lines arranged in a matrix shape;
- a first printed circuit board provided along a first sides of said liquid crystal display panel;
- a second printed circuit board connected to said first punted circuit board at one end thereof and provided at least along a second side of said liquid crystal display panel for supplying a driving signal voltage for display to said first signal lines; and
- a driving IC chip mounted such that it is connected to extraction lines of said first signal lines at output terminals thereof and to a conductor layer portion of said second printed circuit board at input terminals thereof; wherein
- the center of the extraction lines of said first signal lines driven by said driving IC chip in the direction of the arrangement thereof is matched with the center of aid driving IC chip in the direction parallel with the direction of the arrangement of the extraction lines of said first signal line, and the center of the conductive layer portion of said second printed circuit board connected to the input terminals of said driving IC chip in the direction parallel with the direction of the arrangement of the extraction lines of said active elements is offset from the center of said driving IC chip toward said first printed circuit board.

10. A liquid crystal display device according to claim 9, characterized in that said driving IC chip is mounted on said liquid crystal display panel at a position furthest from said first printed circuit board.

11. A liquid crystal display device according to claim 9, characterized in that an alignment mark for defining the position of said liquid crystal display panel during assembly is provided on said second side of said liquid crystal display panel and is further from said first printed circuit board than said driving IC chip.

* * * * *